US012251716B2

(12) United States Patent
Conrad

(10) Patent No.: US 12,251,716 B2
(45) Date of Patent: *Mar. 18, 2025

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,610

(22) Filed: May 17, 2024

(65) Prior Publication Data

US 2024/0299956 A1 Sep. 12, 2024

Related U.S. Application Data

(63) Continuation of application No. 18/225,641, filed on Jul. 24, 2023, now Pat. No. 12,023,690, which is a (Continued)

(51) Int. Cl.

*B04C 5/04* (2006.01)
*A47L 5/24* (2006.01)

(Continued)

(52) U.S. Cl.

CPC *B04C 5/04* (2013.01); *A47L 5/24* (2013.01); *A47L 9/1608* (2013.01);

(Continued)

(58) Field of Classification Search

CPC .... B04C 5/04; B04C 5/26; B04C 9/00; B04C 2009/004; A47L 5/24; A47L 9/1608;

(Continued)

(56) References Cited

U.S. PATENT DOCUMENTS 2,071,975 A 2/1937 Holm-Hansen et al.
2,533,057 A 12/1950 Senne (Continued)

FOREIGN PATENT DOCUMENTS

CA 1218962 A1 3/1987
CA 2086374 C 11/1996

(Continued)

OTHER PUBLICATIONS

English machine translation of CN1626025A, published on Oct. 15, 2005.

(Continued)

*Primary Examiner* — Dung H Bui

(74) *Attorney, Agent, or Firm* — Philip C. Mendes da Costa; SMART & BIGGAR LP

(57) ABSTRACT

A hand vacuum cleaner has a cyclone assembly comprising a cyclone and a dirt collection chamber. The cyclone assembly has a cyclone assembly axis extending centrally between a front end of the cyclone assembly and a rear end of the cyclone assembly. The cyclone has a horizontally extending cyclone axis and the dirt collection chamber has a lower end which is at a lower elevation than a lower end of the cyclone chamber. A line that extends in a common direction with the cyclone assembly axis intersects the dirt collection chamber at an elevation below the cyclone chamber, a pre-motor filter and a handle of the hand vacuum cleaner.

19 Claims, 42 Drawing Sheets

Related U.S. Application Data continuation of application No. 18/298,951, filed on Apr. 11, 2023, now Pat. No. 11,938,491, which is a continuation of application No. 17/719,832, filed on Apr. 13, 2022, now Pat. No. 11,673,148, which is a continuation of application No. 16/911,882, filed on Jun. 25, 2020, now Pat. No. 11,331,680, which is a continuation of application No. 16/717,495, filed on Dec. 17, 2019, now Pat. No. 11,285,495, which is a continuation-in-part of application No. 16/106,443, filed on Aug. 21, 2018, now Pat. No. 10,827,891, which is a continuation-in-part of application No. 15/391,128, filed on Dec. 27, 2016, now Pat. No. 10,258,210.

(51) Int. Cl.
*A47L 9/16* (2006.01)
*B04C 5/26* (2006.01)
*B04C 9/00* (2006.01)

(52) U.S. Cl.
CPC ............ *A47L 9/1625* (2013.01); *A47L 9/165* (2013.01); *A47L 9/1666* (2013.01); *B04C 5/26* (2013.01); *B04C 9/00* (2013.01); *B04C 2009/004* (2013.01)

(58) Field of Classification Search
CPC ...... A47L 9/1625; A47L 9/165; A47L 9/1666; A47L 9/1683; A47L 9/1633; A47L 9/122; A47L 9/125; A47L 9/149; A47L 9/1658
See application file for complete search history.

(56) References Cited

U.S. PATENT DOCUMENTS 2,542,634 A 2/1951 Davis et al.
2,559,384 A 7/1951 Anderson, Jr. et al.
2,621,756 A 12/1952 Senne
2,632,524 A 3/1953 Senne
2,913,111 A 11/1959 Rogers
2,942,691 A 6/1960 Dillon
3,015,122 A 1/1962 Cook
3,130,157 A 4/1964 Kelsall et al.
3,200,568 A 8/1965 McNeil
3,310,828 A 3/1967 Clark et al.
3,320,727 A 5/1967 Farley et al.
3,356,334 A 12/1967 Scaramucci
3,457,744 A 7/1969 Bisbing
3,530,649 A 9/1970 Porsch et al.
3,582,616 A 6/1971 Wrob
3,822,533 A 7/1974 Oranje
3,898,068 A 8/1975 McNeil
3,988,132 A 10/1976 Oranje
3,988,133 A 10/1976 Schady
4,187,088 A 2/1980 Hodgson
4,236,903 A 12/1980 Malmsten
4,373,228 A 2/1983 Dyson
4,393,536 A 7/1983 Tapp
4,443,910 A 4/1984 Fitzwater
4,573,236 A 3/1986 Dyson
4,635,315 A 1/1987 Kozak
4,826,515 A 5/1989 Dyson
4,831,685 A 5/1989 Bosyj et al.
4,836,515 A 6/1989 Franz et al.
4,905,342 A 3/1990 Ataka
5,054,157 A 10/1991 Werner et al.
5,078,761 A 1/1992 Dyson
5,129,125 A 7/1992 Gamou et al.
5,230,722 A 7/1993 Yonkers
5,267,371 A 12/1993 Soler et al.
5,287,591 A 2/1994 Rench et al.
5,309,600 A 5/1994 Weaver et al.
5,309,601 A 5/1994 Hampton et al.
5,358,290 A 10/1994 Fleet et al.
5,524,321 A 6/1996 Weaver et al.
5,715,566 A 2/1998 Weaver et al.
5,836,047 A 11/1998 Lee et al.
5,842,254 A 12/1998 Lee
5,858,038 A 1/1999 Dyson et al.
5,974,625 A 11/1999 Garner
6,058,559 A 5/2000 Yoshimi et al.
6,070,291 A 6/2000 Bair et al.
6,081,961 A 7/2000 Wang
6,098,244 A 8/2000 Conrad et al.
6,099,661 A 8/2000 Conrad
6,101,672 A 8/2000 Conrad et al.
6,123,779 A 9/2000 Conrad et al.
6,129,775 A 10/2000 Conrad et al.
6,135,708 A 10/2000 Conrad et al.
6,168,716 B1 1/2001 Conrad et al.
6,170,119 B1 1/2001 Conrad et al.
6,173,474 B1 1/2001 Conrad
6,174,127 B1 1/2001 Conrad et al.
6,183,641 B1 2/2001 Conrad et al.
6,210,469 B1 4/2001 Tokar
6,221,134 B1 4/2001 Conrad et al.
6,224,325 B1 5/2001 Conrad et al.
6,228,260 B1 5/2001 Conrad et al.
6,231,645 B1 5/2001 Conrad et al.
6,238,177 B1 5/2001 Conrad et al.
6,243,917 B1 6/2001 Conrad
6,251,296 B1 6/2001 Conrad et al.
6,256,832 B1 7/2001 Dyson
6,261,052 B1 7/2001 Conrad et al.
6,261,379 B1 7/2001 Conrad et al.
6,280,143 B1 8/2001 Parker et al.
6,295,692 B1 10/2001 Shideler
6,307,358 B1 10/2001 Conrad
6,312,594 B1 11/2001 Conrad et al.
6,328,527 B1 12/2001 Conrad et al.
6,334,234 B1 1/2002 Conrad et al.
6,344,064 B1 2/2002 Conrad
6,406,505 B1 6/2002 Oh et al.
6,434,785 B1 8/2002 Vandenbelt et al.
6,440,197 B1 8/2002 Conrad et al.
6,457,205 B1 10/2002 Conrad
6,463,622 B2 10/2002 Wright et al.
6,482,252 B1 11/2002 Conrad et al.
6,531,066 B1 3/2003 Saunders et al.
6,533,834 B2 3/2003 Conrad et al.
6,553,612 B1 4/2003 Dyson et al.
6,560,818 B1 5/2003 Hasko
6,581,239 B1 6/2003 Dyson et al.
6,596,046 B2 7/2003 Conrad et al.
6,599,338 B2 7/2003 Oh et al.
6,599,340 B2 7/2003 Conrad et al.
6,623,539 B2 9/2003 Lee et al.
6,736,873 B2 5/2004 Conrad et al.
6,740,144 B2 5/2004 Conrad et al.
6,746,500 B1 6/2004 Park et al.
6,782,583 B2 8/2004 Oh
6,782,585 B1 8/2004 Conrad et al.
6,810,558 B2 * 11/2004 Lee ...................... A47L 9/1658 55/459.3
6,833,015 B2 12/2004 Oh et al.
6,848,146 B2 2/2005 Wright et al.
6,874,197 B1 4/2005 Conrad et al.
6,902,596 B2 6/2005 Conrad et al.
7,131,165 B2 11/2006 Wright et al.
7,146,681 B2 12/2006 Wright et al.
7,160,346 B2 1/2007 Park
7,222,303 B2 5/2007 Oren et al.
7,222,393 B2 5/2007 Kaffenberger et al.
7,247,181 B2 7/2007 Hansen et al.
7,278,181 B2 10/2007 Harris et al.
7,329,294 B2 2/2008 Conrad
7,335,242 B2 2/2008 Oh
7,370,387 B2 5/2008 Walker et al.
7,377,008 B2 5/2008 Park et al.
7,381,234 B2 6/2008 Oh
7,386,916 B2 6/2008 Bone
7,448,363 B1 11/2008 Rasmussen et al.

(56) References Cited

U.S. PATENT DOCUMENTS 7,485,164 B2 2/2009 Jeong et al.
7,488,362 B2 2/2009 Jeong et al.
7,540,894 B2 6/2009 Ni
7,547,338 B2 6/2009 Kim et al.
7,581,286 B2 9/2009 Choi
7,584,522 B1 9/2009 Weeter et al.
7,594,296 B2 9/2009 Park
7,597,730 B2 10/2009 Yoo et al.
7,604,675 B2 10/2009 Makarov et al.
7,624,475 B2 12/2009 Choi
7,645,311 B2 1/2010 Oh et al.
7,686,858 B2 3/2010 Oh
7,740,675 B2 6/2010 Conrad
7,749,293 B2 7/2010 Conrad
7,776,120 B2 8/2010 Conrad
7,803,207 B2 9/2010 Conrad
7,811,345 B2 10/2010 Conrad
7,867,308 B2 1/2011 Conrad
7,882,592 B2 2/2011 Hwang et al.
7,887,612 B2 2/2011 Conrad
7,922,794 B2 4/2011 Morphey
7,941,895 B2 5/2011 Conrad
7,976,597 B2 * 7/2011 Smith .................. A47L 9/1625
15/352
7,979,953 B2 7/2011 Yoo
8,015,659 B2 9/2011 Conrad et al.
8,032,981 B2 10/2011 Yoo
8,032,983 B2 10/2011 Griffith et al.
8,100,999 B2 1/2012 Ashbee et al.
8,127,398 B2 3/2012 Conrad
8,146,201 B2 4/2012 Conrad
8,151,407 B2 4/2012 Conrad
8,166,607 B2 5/2012 Conrad
8,176,596 B2 5/2012 Conrad
8,176,597 B2 * 5/2012 Stein .................... A47L 9/1658
55/424
8,191,203 B2 6/2012 Yoo
8,192,515 B2 6/2012 Conrad
8,292,979 B2 10/2012 Conrad
8,296,900 B2 10/2012 Conrad
8,347,455 B2 1/2013 Dyson et al.
8,349,428 B2 1/2013 Conrad
8,359,705 B2 1/2013 Conrad
8,370,993 B2 2/2013 Conrad
8,375,508 B2 2/2013 Conrad
8,444,731 B2 5/2013 Gomiciaga-Pereda et al.
8,448,291 B2 5/2013 Conrad
8,468,646 B2 6/2013 Yoo
8,479,358 B2 7/2013 Conrad
8,484,799 B2 7/2013 Conrad
8,486,170 B2 7/2013 Conrad et al.
8,510,907 B2 8/2013 Conrad
8,528,160 B2 9/2013 Conrad
8,533,904 B2 9/2013 Conrad
8,561,257 B2 10/2013 Conrad
8,567,005 B2 10/2013 Conrad
8,578,550 B2 11/2013 Conrad
8,578,553 B2 11/2013 Conrad
8,590,102 B2 11/2013 Conrad
8,607,407 B2 12/2013 Conrad
8,621,709 B2 1/2014 Conrad
8,640,303 B2 * 2/2014 Conrad ................ A47L 9/1683
55/459.1
8,640,304 B2 2/2014 Conrad
8,646,147 B2 2/2014 Conrad
8,659,184 B2 2/2014 Conrad
8,677,554 B2 3/2014 Conrad
8,677,558 B2 3/2014 Conrad
8,713,751 B2 5/2014 Conrad
8,769,767 B2 7/2014 Conrad
8,813,305 B2 8/2014 Conrad
8,834,209 B2 9/2014 Conrad
8,863,352 B2 10/2014 Conrad
8,869,344 B2 10/2014 Conrad
8,869,345 B2 10/2014 Conrad
8,869,348 B2 10/2014 Conrad
8,875,340 B2 11/2014 Conrad
8,875,342 B2 11/2014 Conrad
9,027,198 B2 5/2015 Conrad
9,027,203 B2 5/2015 Conrad et al.
9,066,642 B2 6/2015 Conrad
9,119,513 B2 9/2015 Conrad
9,161,666 B2 10/2015 Conrad
9,161,669 B2 10/2015 Conrad
9,167,944 B2 10/2015 Conrad
9,204,769 B2 * 12/2015 Conrad .................. A47L 9/106
9,204,773 B2 12/2015 Conrad
9,215,960 B2 12/2015 Conrad
9,226,633 B2 1/2016 Conrad et al.
9,227,151 B2 1/2016 Conrad
9,227,201 B2 1/2016 Conrad
9,232,881 B2 1/2016 Conrad
9,238,235 B2 1/2016 Conrad
9,295,995 B2 3/2016 Conrad
9,314,138 B2 4/2016 Conrad
9,314,139 B2 4/2016 Conrad et al.
9,320,401 B2 4/2016 Conrad
9,326,652 B2 5/2016 Conrad
9,364,127 B2 6/2016 Conrad
9,427,122 B2 8/2016 Conrad et al.
9,427,126 B2 8/2016 Conrad
9,433,332 B2 9/2016 Conrad
9,451,852 B2 9/2016 Conrad
9,451,855 B2 9/2016 Conrad
9,456,721 B2 10/2016 Conrad
9,492,045 B2 11/2016 Conrad
9,526,394 B2 12/2016 Conrad
9,572,463 B2 2/2017 Conrad
9,591,952 B2 3/2017 Conrad
9,591,958 B2 3/2017 Conrad
9,775,484 B2 10/2017 Conrad
9,801,513 B2 10/2017 Conrad et al.
9,820,621 B2 11/2017 Conrad et al.
10,022,027 B2 7/2018 Conrad
10,076,183 B2 9/2018 Conrad et al.
10,149,587 B2 12/2018 Conrad et al.
10,159,393 B2 12/2018 Conrad
10,165,912 B2 1/2019 Conrad
10,201,260 B2 2/2019 Conrad et al.
10,214,349 B2 2/2019 Conrad
10,251,519 B2 4/2019 Conrad
10,271,704 B2 * 4/2019 Conrad ................ A47L 9/1633
10,357,136 B2 7/2019 Conrad
10,537,216 B2 1/2020 Conrad
10,537,219 B2 1/2020 Conrad et al.
10,568,477 B2 2/2020 Conrad
10,575,693 B2 3/2020 Conrad
10,667,663 B2 6/2020 Conrad
10,687,679 B2 6/2020 Conrad et al.
10,729,294 B2 8/2020 Conrad et al.
10,791,890 B2 10/2020 Conrad
10,791,896 B2 10/2020 Conrad
10,828,650 B2 11/2020 Conrad
10,888,205 B2 1/2021 Conrad et al.
10,932,634 B2 3/2021 Conrad
10,959,588 B2 3/2021 Conrad et al.
11,013,378 B2 5/2021 Conrad
11,108,254 B2 8/2021 Conrad
11,135,602 B2 10/2021 Conrad
11,154,169 B2 10/2021 Conrad
11,198,085 B2 12/2021 Conrad et al.
11,213,179 B2 1/2022 Conrad
11,246,462 B2 2/2022 Conrad
11,285,495 B2 3/2022 Conrad
11,318,482 B2 5/2022 Conrad
11,478,116 B2 10/2022 Conrad
11,478,117 B2 10/2022 Conrad et al.
11,534,041 B2 12/2022 Conrad
11,534,043 B2 12/2022 Conrad
11,571,097 B2 2/2023 Conrad
11,612,290 B2 3/2023 Conrad
11,793,374 B2 10/2023 Conrad
11,839,343 B2 12/2023 Conrad et al.
11,857,142 B2 1/2024 Conrad

(56) References Cited

U.S. PATENT DOCUMENTS 11,950,745 B2 4/2024 Conrad et al.
2001/0027587 A1 10/2001 Conrad et al.
2002/0011053 A1 1/2002 Oh
2002/0062531 A1 5/2002 Oh
2002/0112315 A1 8/2002 Conrad
2002/0134059 A1 9/2002 Oh
2002/0134238 A1 9/2002 Conrad et al.
2002/0162188 A1 11/2002 Harmen
2002/0178535 A1 12/2002 Oh et al.
2002/0178698 A1 12/2002 Oh et al.
2002/0178699 A1 12/2002 Oh
2003/0046910 A1 3/2003 Lee et al.
2003/0066273 A1 4/2003 Choi et al.
2003/0158238 A1 8/2003 Hale et al.
2003/0159411 A1 8/2003 Hansen et al.
2003/0201754 A1 10/2003 Conrad
2004/0010885 A1 1/2004 Hitzelberger et al.
2004/0025285 A1 2/2004 McCormick et al.
2004/0112022 A1 6/2004 Vuijk
2004/0163201 A1 8/2004 Murphy et al.
2004/0194251 A1 10/2004 Overvaag et al.
2004/0216263 A1 11/2004 Best et al.
2004/0216264 A1* 11/2004 Shaver ...................... A47L 9/02 15/344
2004/0216266 A1 11/2004 Conrad
2005/0198769 A1 9/2005 Lee et al.
2005/0252179 A1 11/2005 Oh et al.
2006/0037172 A1 2/2006 Choi
2006/0042038 A1 3/2006 Arnold et al.
2006/0042206 A1 3/2006 Arnold et al.
2006/0080947 A1 4/2006 Lee et al.
2006/0090290 A1 5/2006 Lau
2006/0123590 A1 6/2006 Fester et al.
2006/0137304 A1 6/2006 Jeong et al.
2006/0137305 A1 6/2006 Jung
2006/0137306 A1 6/2006 Jeong et al.
2006/0137309 A1 6/2006 Jeong et al.
2006/0137314 A1 6/2006 Conrad et al.
2006/0156699 A1 7/2006 Kim
2006/0162298 A1 7/2006 Oh et al.
2006/0162299 A1 7/2006 North
2006/0168922 A1 8/2006 Oh
2006/0168923 A1 8/2006 Lee et al.
2006/0196004 A1 9/2006 Conrad
2006/0207055 A1 9/2006 Ivarsson et al.
2006/0207231 A1 9/2006 Arnold
2006/0230715 A1 10/2006 Oh et al.
2006/0230723 A1 10/2006 Kim et al.
2006/0230724 A1 10/2006 Han et al.
2006/0230726 A1 10/2006 Oh et al.
2006/0236663 A1 10/2006 Oh
2006/0278081 A1 12/2006 Han et al.
2007/0012002 A1 1/2007 Oh et al.
2007/0012003 A1 1/2007 Oh et al.
2007/0039120 A1 2/2007 Choi
2007/0067944 A1 3/2007 Kitamura et al.
2007/0079473 A1 4/2007 Min et al.
2007/0079584 A1 4/2007 Kim et al.
2007/0079585 A1 4/2007 Oh et al.
2007/0079587 A1 4/2007 Kim
2007/0084160 A1* 4/2007 Kim ...................... A47L 9/1625 55/345
2007/0084161 A1 4/2007 Yoo
2007/0095028 A1 5/2007 Kim et al.
2007/0095029 A1 5/2007 Min et al.
2007/0095030 A1 5/2007 Oh
2007/0130895 A1* 6/2007 Boeck ................... A47L 9/1683 55/429
2007/0226947 A1 10/2007 Kang
2007/0251048 A1 11/2007 Choi
2007/0271724 A1 11/2007 Hakan et al.
2007/0289085 A1 12/2007 Yoo
2007/0289089 A1 12/2007 Yacobi
2007/0289264 A1 12/2007 Oh
2008/0040883 A1 2/2008 Beskow et al.
2008/0047091 A1 2/2008 Nguyen
2008/0083085 A1 4/2008 Genn
2008/0134460 A1 6/2008 Conrad
2008/0134462 A1 6/2008 Jansen et al.
2008/0172821 A1 7/2008 Kang et al.
2008/0172992 A1 7/2008 Conrad
2008/0172995 A1 7/2008 Conrad
2008/0178416 A1 7/2008 Conrad
2008/0178418 A1 7/2008 Conrad
2008/0178420 A1 7/2008 Conrad
2008/0179133 A1 7/2008 Conrad
2008/0184893 A1 8/2008 Oh et al.
2008/0190080 A1 8/2008 Oh et al.
2008/0196195 A1 8/2008 Conrad
2008/0196196 A1 8/2008 Conrad
2008/0196366 A1 8/2008 Conrad
2008/0209666 A1 9/2008 Conrad
2008/0216281 A1 9/2008 Conrad
2009/0031522 A1 2/2009 Yoo et al.
2009/0044371 A1 2/2009 Yoo et al.
2009/0113659 A1 5/2009 Jeon et al.
2009/0144929 A1 6/2009 Yoo
2009/0144932 A1 6/2009 Yoo
2009/0241284 A1 10/2009 Mayes et al.
2009/0282639 A1 11/2009 Dyson et al.
2009/0307864 A1 12/2009 Dyson
2010/0005611 A1 1/2010 Hong et al.
2010/0043170 A1 2/2010 Ni
2010/0045215 A1 2/2010 Hawker et al.
2010/0071153 A1 3/2010 Genn
2010/0083459 A1 4/2010 Beskow et al.
2010/0095476 A1 4/2010 Kim et al.
2010/0162515 A1 7/2010 Stephens
2010/0175217 A1 7/2010 Conrad
2010/0175219 A1 7/2010 Soen et al.
2010/0223752 A1 9/2010 Conrad
2010/0229322 A1 9/2010 Conrad
2010/0229323 A1 9/2010 Conrad
2010/0229325 A1 9/2010 Conrad
2010/0229326 A1 9/2010 Conrad
2010/0229328 A1* 9/2010 Conrad ................... A47L 9/165 15/347
2010/0229334 A1 9/2010 Conrad
2010/0229335 A1 9/2010 Conrad
2010/0229336 A1 9/2010 Conrad
2010/0229338 A1 9/2010 Conrad
2010/0242222 A1 9/2010 Conrad
2010/0251507 A1 10/2010 Conrad
2010/0293745 A1 11/2010 Coburn
2011/0023262 A1 2/2011 Conrad
2011/0056045 A1* 3/2011 Sepke ................... A47L 9/1666 15/347
2011/0219567 A1 9/2011 Conrad
2011/0219573 A1 9/2011 Conrad
2011/0219579 A1 9/2011 Conrad
2011/0289719 A1 12/2011 Han et al.
2011/0314629 A1 12/2011 Conrad
2012/0000030 A1 1/2012 Conrad
2012/0159734 A1 6/2012 Fujiwara
2012/0222239 A1 9/2012 Conrad
2012/0222245 A1 9/2012 Conrad
2012/0272472 A1 11/2012 Conrad
2013/0091662 A1* 4/2013 Smith ................... A47L 9/1683 15/353
2013/0104335 A1 5/2013 Conrad
2013/0283561 A1* 10/2013 Miefalk .................... A47L 5/32 15/323
2014/0137363 A1* 5/2014 Wilson .................. A47L 9/1625 15/347
2014/0137364 A1* 5/2014 Stickney ................... A47L 5/24 15/347
2014/0237764 A1 8/2014 Conrad
2014/0237768 A1 8/2014 Conrad
2016/0174786 A1* 6/2016 Conrad ................... A47L 5/225 15/329
2016/0367094 A1 12/2016 Conrad
2017/0071426 A1* 3/2017 Krebs ..................... A47L 9/102
2017/0079491 A1* 3/2017 Dimbylow ................ A47L 5/28
2017/0280959 A1* 10/2017 Nam ......................... A47L 5/24

(56) References Cited

U.S. PATENT DOCUMENTS

| | | | | |
|---|---|---|---|---|
| 2017/0290477 | A1* | 10/2017 | Conrad | A47L 5/28 |
| 2019/0090701 | A1* | 3/2019 | Tonderys | A47L 5/24 |
| 2019/0183304 | A1* | 6/2019 | Yuen | A47L 9/165 |
| 2019/0343356 | A1* | 11/2019 | Kim | A47L 5/24 |
| 2020/0305671 | A1 | 10/2020 | Conrad | |
| 2021/0085147 | A1* | 3/2021 | Yu | A47L 9/0081 |
| 2021/0228032 | A1 | 7/2021 | Conrad | |
| 2021/0401246 | A1 | 12/2021 | Conrad | |
| 2022/0142440 | A1 | 5/2022 | Conrad | |
| 2022/0151446 | A1 | 5/2022 | Conrad et al. | |
| 2023/0118892 | A1 | 4/2023 | Conrad | |
| 2023/0263350 | A1 | 8/2023 | Conrad et al. | |
| 2023/0348169 | A1 | 11/2023 | Conrad | |
| 2024/0016351 | A1 | 1/2024 | Conrad | |
| 2024/0138634 | A1 | 5/2024 | Conrad | |
| 2024/0180373 | A1 | 6/2024 | Conrad et al. | |
| 2024/0358212 | A1 | 10/2024 | Conrad | |

FOREIGN PATENT DOCUMENTS

| | | | |
|---|---|---|---|
| CA | 2275675 | A1 | 12/1999 |
| CA | 2288544 | A1 | 5/2000 |
| CA | 2289060 | A1 | 5/2000 |
| CA | 2258392 | A1 | 7/2000 |
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2258428 | A1 | 7/2000 |
| CA | 2330801 | A1 | 7/2001 |
| CA | 2412881 | A1 | 12/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2241644 | A1 | 12/2007 |
| CA | 2675723 | A1 | 6/2008 |
| CA | 2658005 | A1 | 9/2010 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658381 | A1 | 9/2010 |
| CA | 2658397 | A1 | 9/2010 |
| CA | 2658497 | A1 | 9/2010 |
| CA | 2658643 | A1 | 9/2010 |
| CA | 2658644 | A1 | 9/2010 |
| CA | 2658651 | A1 | 9/2010 |
| CA | 2659212 | A1 | 9/2010 |
| CA | 2674056 | A1 | 9/2010 |
| CA | 2674761 | A1 | 9/2010 |
| CA | 2678119 | A1 | 9/2010 |
| CA | 2755305 | A1 | 9/2010 |
| CA | 2755307 | A1 | 9/2010 |
| CA | 2730689 | A1 | 9/2011 |
| CA | 2574291 | C | 8/2013 |
| CA | 2677530 | C | 1/2014 |
| CN | 2524655 | Y | 12/2002 |
| CN | 2534954 | Y | 2/2003 |
| CN | 1626025 | A | 10/2005 |
| CN | 1765283 | A | 5/2006 |
| CN | 1806741 | A | 7/2006 |
| CN | 1895148 | A | 1/2007 |
| CN | 100998484 | A | 7/2007 |
| CN | 101015436 | A | 8/2007 |
| CN | 101061932 | A | 10/2007 |
| CN | 101095604 | A | 1/2008 |
| CN | 201101488 | Y | 8/2008 |
| CN | 101288572 | A | 10/2008 |
| CN | 101357051 | A | 2/2009 |
| CN | 101448447 | A | 6/2009 |
| CN | 101822506 | A | 9/2010 |
| CN | 201683850 | U | 12/2010 |
| CN | 101631494 | B | 4/2012 |
| CN | 202699035 | U | 1/2013 |
| CN | 203724037 | U | 7/2014 |
| DE | 3734355 | C2 | 6/1989 |
| DE | 10110581 | C2 | 11/2003 |
| DE | 69907201 | T2 | 2/2004 |
| DE | 60012203 | T2 | 8/2005 |
| DE | 60105004 | T2 | 8/2005 |
| DE | 60201666 | T2 | 6/2006 |
| DE | 202006017010 | U1 | 2/2007 |
| DE | 60211663 | T2 | 5/2007 |
| DE | 102007011457 | A1 | 10/2007 |
| DE | 112006003479 | T5 | 12/2008 |
| DE | 112007001314 | T5 | 4/2009 |
| DE | 112010001135 | T5 | 8/2012 |
| DE | 202012101457 | U1 | 8/2012 |
| DE | 112011104642 | T5 | 10/2013 |
| DE | 102012211246 | A1 | 1/2014 |
| EP | 0489468 | A1 | 6/1992 |
| EP | 0887040 | A1 | 12/1998 |
| EP | 1674009 | A2 | 6/2006 |
| EP | 1771104 | B1 | 9/2008 |
| EP | 966912 | B1 | 3/2010 |
| EP | 2201881 | A1 | 6/2010 |
| EP | 2049000 | B1 | 6/2011 |
| EP | 2201875 | B1 | 4/2013 |
| EP | 1629758 | B1 | 10/2013 |
| FR | 2812531 | B1 | 11/2004 |
| GB | 2163703 | A | 3/1986 |
| GB | 2163703 | B | 1/1988 |
| GB | 2365324 | B | 7/2002 |
| GB | 2458243 | B | 4/2012 |
| JP | 2000140533 | A | 5/2000 |
| JP | 2004121722 | A | 4/2004 |
| JP | 2005040246 | A | 2/2005 |
| JP | 2005087508 | A | 4/2005 |
| JP | 2005211350 | A | 8/2005 |
| JP | 2009261501 | A | 11/2009 |
| JP | 2010081968 | A | 4/2010 |
| JP | 2010227287 | A | 10/2010 |
| KR | 1020040088978 | A | 10/2004 |
| KR | 20060112420 | A | 11/2006 |
| WO | 9619294 | A1 | 6/1996 |
| WO | 0010718 | A1 | 3/2000 |
| WO | 0078546 | A1 | 12/2000 |
| WO | 2004069021 | A1 | 8/2004 |
| WO | 2005089618 | A3 | 2/2006 |
| WO | 2006026414 | A3 | 8/2007 |
| WO | 2007104138 | A1 | 9/2007 |
| WO | 2008009883 | A1 | 1/2008 |
| WO | 2008009888 | A1 | 1/2008 |
| WO | 2008009890 | A1 | 1/2008 |
| WO | 2007084699 | A3 | 2/2008 |
| WO | 2008017802 | A1 | 2/2008 |
| WO | 2008070966 | A1 | 6/2008 |
| WO | 2008070980 | A1 | 6/2008 |
| WO | 2008135708 | A1 | 11/2008 |
| WO | 2009026709 | A1 | 3/2009 |
| WO | 2010102396 | A1 | 9/2010 |
| WO | 2010102410 | A1 | 9/2010 |
| WO | 2010102411 | A1 | 9/2010 |

OTHER PUBLICATIONS

English machine translation of CN1895148A, published on Jan. 17, 2007.
English machine translation of CN100998484, published on Jul. 18, 2007.
English machine translation of CN101015436, published on Aug. 15, 2007.
English machine translation of CN101061932, published on Oct. 31, 2007.
English machine translation of CN101095604, published on Jan. 2, 2008.
English machine translation of CN101288572, published on Oct. 22, 2008.
English machine translation of CN101448447, published on Jun. 3, 2009.

(56) References Cited

OTHER PUBLICATIONS

English machine translation of CN101822506, published on Sep. 8, 2010.
English machine translation of CN201683850, published on Dec. 29, 2010.
English machine translation of CN203724037, published on Jul. 23, 2014.
English machine translation of DE10110581, published on Nov. 13, 2003.
English machine translation of DE60012203, published on Aug. 18, 2005.
English machine translation of DE60105004, published on Aug. 16, 2005.
English machine translation of DE60201666, published on Jun. 1, 2006.
English machine translation of DE60211663, published on May 10, 2007.
English machine translation of DE69907201, published on Feb. 5, 2004.
English machine translation of DE102007011457, published on Oct. 25, 2007.
English machine translation of DE102012211246, published on Jan. 2, 2014.
English machine translation of DE112006003479, published on Dec. 18, 2008.
English machine translation of DE112007001314, published on Apr. 23, 2009.
English machine translation of DE112010001135, published on Aug. 2, 2012.
English machine translation of DE112011104642, published on Oct. 2, 2013.
English machine translation of DE202006017010, published on Feb. 8, 2007.
English machine translation of DE202012101457, published on Aug. 16, 2012.
English machine translation of JP2004121722, published on Apr. 22, 2004.
English machine translation of JP2005040246, published on Feb. 17, 2005.
English machine translation of JP2005211350, published on Aug. 11, 2005.
English machine translation of JP2009261501, published on Nov. 12, 2009.
English machine translation of JP2010081968, published on Apr. 15, 2010.
English machine translation of KR1020040088978, published on Oct. 20, 2004.
English machine translation of KR20060112420, published on Nov. 1, 2006.
English machine translation of CN101357051A published on Feb. 4, 2009.
English machine translation of CN101631494B published on Apr. 25, 2012.
English machine translation of CN1765283A published on May 23, 2006.
English machine translation of CN1806741A published on Jul. 26, 2006.
English machine translation of CN201101488Y published on Aug. 20, 2008.
English machine translation of CN202699035U published on Jan. 30, 2013.
English machine translation of CN2524655Y published on Dec. 11, 2002.
English machine translation of CN2534954Y published on Feb. 12, 2003.
English machine translation of DE3734355C2 published on Jun. 29, 1989.
English machine translation of FR2812531B1 published on Nov. 5, 2004.
English machine translation of JP2000140533A published on May 23, 2000.
English machine translation of JP2005087508A published on Apr. 7, 2005.
English machine translation of JP2005040246A published on Feb. 17, 2005.
English machine translation of JP2010227287A published on Oct. 14, 2010.
Makita Cordless Cleaner Handy Vac II, Model 4071, Instructions Manual, dated at least as early as Oct. 1993.

* cited by examiner

SURFACE CLEANING APPARATUS

CROSS-REFERENCE TO RELATED APPLICATIONS

This application is a continuation of co-pending U.S. application Ser. No. 18/225,641, filed on Jul. 24, 2023, which is a continuation of U.S. application Ser. No. 18/298,951, filed on Apr. 11, 2023 and issued as U.S. Pat. No. 11,938,491 on Mar. 26, 2024, which itself is a continuation of U.S. application Ser. No. 17/719,832, filed on Apr. 13, 2022 and issued as U.S. Pat. No. 11,673,148 on Jun. 13, 2023, which itself is a continuation of U.S. application Ser. No. 16/911,882, filed on Jun. 25, 2020 and issued as U.S. Pat. No. 11,331,680 on May 17, 2022, which itself is a continuation of U.S. application Ser. No. 16/717,495, filed Dec. 17, 2019 and issued as U.S. Pat. No. 11,285,495 on Mar. 29, 2022, which itself is a continuation-in-part of U.S. application Ser. No. 16/106,443, filed Aug. 21, 2018 and issued as U.S. Pat. No. 10,827,891 on Nov. 10, 2020, which itself is a continuation-in-part of U.S. application Ser. No. 15/391,128, filed Dec. 27, 2016 and issued as U.S. Pat. No. 10,258,210 on Apr. 16, 2019, the entirety of each of which is incorporated herein by reference.

FIELD

The present subject matter of the teachings described herein relates generally to a hand carryable surface cleaning apparatus. In a preferred embodiment, the hand carryable surface cleaning apparatus comprises a handheld vacuum cleaner. In addition, this application also relates to a multi-stage cyclone design which may be used in a hand carryable surface cleaning apparatus.

BACKGROUND

The following is not an admission that anything discussed below is part of the prior art or part of the common general knowledge of a person skilled in the art.

Various types of surface cleaning apparatus are known. Surface cleaning apparatus include vacuum cleaners. Currently, a vacuum cleaner typically uses at least one cyclonic cleaning stage. More recently, cyclonic hand vacuum cleaners have been developed. See for example, U.S. Pat. No. 7,931,716 and US 2010/0229328. Each of these discloses a hand vacuum cleaner which includes a cyclonic cleaning stage. U.S. Pat. No. 7,931,716 discloses a cyclonic cleaning stage utilizing two cyclonic cleaning stages wherein both cyclonic stages have cyclone axis of rotation that extends vertically. US 2010/0229328 discloses a cyclonic hand vacuum cleaner wherein the cyclone axis of rotation extends horizontally and is co-axial with the suction motor. In addition, hand carriable cyclonic vacuum cleaners are also known (see U.S. Pat. Nos. 8,146,201 and 8,549,703).

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with a first aspect of the teachings described herein, a multistage cyclone construction comprises a first stage cyclone and a second stage cyclone that is at least partially nested, and may be fully nested, in the first stage cyclone, wherein the second stage cyclone has multiple air inlets and has an axial cyclone length that is shorter than the axial cyclone length of the first stage cyclone. An advantage of this design is that a compact cyclone assembly may be provided which may be advantageously used in a hand vacuum cleaner. Provided a smaller cyclone assembly for a hand vacuum cleaner reduces the size of the hand vacuum cleaner enabling a smaller design which may be more maneuverable, may enable cleaning closer to a corner and may have a better hand weight.

In accordance with this aspect, there is provided a hand vacuum cleaner comprising:

(a) a first stage cyclone having a first stage cyclone chamber, a first stage cyclone air inlet, a first stage cyclone air outlet and a first stage longitudinal cyclone axis about which the air rotates in the first stage cyclone chamber, the first stage cyclone chamber having a length in a direction of the first stage longitudinal cyclone axis; and, (b) a second stage cyclone downstream from the first stage cyclone and at least substantially nested in the first stage cyclone, the second stage cyclone having a second stage cyclone chamber, a plurality of second stage cyclone air inlets, a second stage cyclone air outlet and a second stage longitudinal cyclone axis about which the air rotates in the second stage cyclone chamber, the second stage cyclone chamber having a length in a direction of the second stage longitudinal cyclone axis, wherein the length of the second stage cyclone chamber is shorter than the length of the first stage cyclone chamber.

In some embodiments, the second stage cyclone chamber may be fully nested in the first stage cyclone chamber.

In some embodiments, the hand vacuum cleaner may further comprise a first stage dirt collection chamber which is external to the first stage cyclone chamber and receives dirt from the first stage cyclone chamber via a first stage dirt outlet.

In some embodiments, the first stage dirt outlet may be provided in a sidewall of the first stage cyclone.

In some embodiments, the hand vacuum cleaner may further comprise a hand vacuum cleaner air inlet conduit having a direction of flow and the first and second stage longitudinal cyclone axis may be generally parallel to the direction of flow.

In some embodiments, the air inlet conduit may be located above the first stage longitudinal cyclone axis.

In some embodiments, the hand vacuum cleaner air inlet conduit may be located above the first stage cyclone.

In some embodiments, the hand vacuum cleaner may further comprise a first stage dirt collection chamber which is external to the first stage cyclone chamber and receives dirt from the first stage cyclone chamber via a first stage dirt outlet. The first stage dirt collection chamber may be below the first cyclone chamber when the hand vacuum cleaner is in use.

In some embodiments, the hand vacuum cleaner may further comprise a first stage dirt collection chamber which is external to the first stage cyclone chamber. The first stage dirt collection chamber, the first stage cyclone chamber and the second stage cyclone chamber may be openable concurrently.

In some embodiments, the hand vacuum cleaner may further comprise a first stage dirt collection chamber which is external to the first stage cyclone chamber and a second stage dirt collection chamber. The first stage dirt collection chamber, the first stage cyclone chamber and the second stage dirt collection chamber may be openable concurrently.

In some embodiments, the hand vacuum cleaner may further comprise a first stage dirt collection chamber which is external to the first stage cyclone chamber and a second stage dirt collection chamber. The first stage dirt collection chamber, the first stage cyclone chamber, the second stage cyclone and the second stage dirt collection chamber may be openable concurrently.

In some embodiments, the second stage cyclone may include 4 to 8 second stage cyclone air inlets.

In some embodiments, the combined cross-sectional area of the second stage cyclone air inlets in a direction transverse to a flow direction therethrough may be about equal to a cross sectional area of the second stage cyclone air outlet in a direction transverse to a flow direction therethrough.

In some embodiments, the combined cross-sectional area of the second stage cyclone air inlets in a direction transverse to a flow direction therethrough may be about equal to a cross sectional area of the first stage cyclone air inlet in a direction transverse to a flow direction therethrough.

In some embodiments, each of the first and second stage cyclones may have a front end and a rear and the first and second stage cyclone air inlets are located at the same end.

In some embodiments, the second stage cyclone air may be is located at an end of the second stage cyclone that is opposed to the end having the plurality of second stage cyclone air inlets.

In some embodiments, the suction motor may have a suction motor axis that may intersect the first stage cyclone chamber.

In some embodiments, the hand vacuum cleaner may have a handle. When the hand vacuum cleaner is in use, the handle ay have an upper end and a lower end and one of the ends ay be attached to a body housing the suction motor.

In some embodiments, the hand vacuum cleaner may include a handle and when the hand vacuum cleaner is in use, the handle may have an upper end that is attached to a body housing the suction motor.

In some embodiments, the hand vacuum cleaner may include a battery compartment positioned on a front side of the handle.

In accordance with a second broad aspect of the teachings described herein, which may be used alone or in combination with any other aspects, a cyclone construction utilizes dual nested cyclones, wherein the second stage cyclone may be partially or fully nested in the first stage cyclone, wherein a screen is positioned around the exterior of the second stage cyclone to define an air flow path that extends along at least a substantial portion of the length of the second stage cyclone, e.g., 70% or more, 80% or more, 90% or more or 95% or more of the length of the second stage cyclone. The screen may have openings which enable the air circulating in the first stage cyclone to maintain a similar direction of rotation in the annular space between the screen and the second stage cyclone.

An advantage of this design is that the annular space between the screen and the second stage cyclone may define a flow channel extending along a substantial portion of the axial length of the second stage cyclone. Accordingly, the screen enables air interior of the screen to travel to the second stage cyclone inlet or inlets without interacting with the air circulating in the first stage cyclone. Further, by enabling the air to maintain a similar direction of rotation in the annular space, the air will be circulating when it encounters the second stage cyclone inlet or inlets thereby enabling the circulation in the second stage cyclone to be enhanced.

The cross sectional area of the annular space in a direction transverse to the longitudinal axis of the second stage cyclone may be proximate the cross sectional area of one or more of the first stage cyclone inlet or inlets, the second stage cyclone inlet or inlets and the second stage cyclone outlets in the direction of flow of those inlets and outlets. By providing a similar cross sectional flow area, the flow of air through the annular space to the second stage cyclone air inlet or inlets need not create back pressure. Preferably, the cross sectional area of the annular space in a direction transverse to the longitudinal axis of the second stage cyclone may be ±15%, ±10% or ±5% of the cross sectional area of one or more of the first stage cyclone inlet or inlets, the second stage cyclone inlet or inlets and the second stage cyclone outlets in the direction of flow of those inlets and outlets.

In accordance with this second aspect, there is provided a hand vacuum cleaner having a front end and a rear end, the hand vacuum cleaner comprising:

(a) a first stage cyclone having a first stage cyclone chamber, a first stage cyclone air inlet, a first stage cyclone air outlet and a first stage longitudinal cyclone axis about which the air rotates in the first stage cyclone chamber, the first stage cyclone chamber having a length in a direction of the first stage longitudinal cyclone axis;

(b) a second stage cyclone downstream from the first stage cyclone and at least substantially nested in the first stage cyclone, the second stage cyclone having a second stage cyclone chamber, a second stage cyclone air inlet, a second stage cyclone air outlet and a second stage longitudinal cyclone axis about which the air rotates in the second stage cyclone chamber, the second stage cyclone chamber having a length in a direction of the second stage longitudinal cyclone axis; and, (c) a screen positioned laterally outwardly from the second stage cyclone and defining a passage positioned between an inner side of the screen and the outer wall of the second stage cyclone, the screen extending axially at least about 70% of a length of the second stage cyclone chamber.

In some embodiments, the screen may extend axially at least about 80% of a length of the second stage cyclone chamber, or at least about 90% of a length of the second stage cyclone chamber.

In some embodiments, the second stage cyclone may have a second stage dirt collection chamber located at one axial end of the second stage cyclone chamber and the screen may extend axially from a position proximate the second stage dirt collection chamber to an opposed axial end of the second stage cyclone chamber.

In some embodiments, the passage may have a cross sectional area in a direction transverse to air flow therethrough and the cross sectional area of the passage may be about equal to a cross sectional area of the first stage cyclone air inlet in a direction transverse to a flow direction therethrough.

In some embodiments, the passage may have a cross sectional area in a direction transverse to air flow therethrough and the cross sectional area of the passage may be about equal to a cross sectional area of the second stage cyclone air outlet in a direction transverse to a flow direction therethrough.

In some embodiments, the second stage cyclone may have a plurality of second stage cyclone air inlets and the passage may have a cross sectional area in a direction transverse to air flow therethrough. A combined cross-sectional area of the second stage cyclone air inlets in a direction transverse to a flow direction therethrough may be about equal to the cross sectional area of the passage in a direction transverse to air flow therethrough.

In some embodiments, the second stage cyclone air inlet may be located at an end of the passage and may be provided in a sidewall of the second stage cyclone chamber.

In some embodiments, the second stage cyclone air inlet may include a vane extending into the passage and, in a direction of air flow along the vane, having a downstream end located at the sidewall of the second stage cyclone chamber.

In some embodiments, the screen may be made of metal.

In accordance with this second aspect, there is also provided a vacuum cleaner comprising:

(a) a first stage cyclone having a first stage cyclone chamber, a first stage cyclone air inlet, a first stage cyclone air outlet and a first stage longitudinal cyclone axis about which the air rotates in a rotational direction in the first stage cyclone chamber;

(b) a second stage cyclone downstream from the first stage cyclone and at least substantially nested in the first stage cyclone, the second stage cyclone having a second stage cyclone chamber, a second stage cyclone air inlet, a second stage cyclone air outlet and a second stage longitudinal cyclone axis about which the air rotates in the second stage cyclone chamber; and, (c) a screen positioned laterally outwardly from the second stage cyclone and defining a passage positioned between an inner side of the screen and the outer wall of the second stage cyclone wherein the second stage cyclone air inlet is located at an end of the passage and directs air into the second stage cyclone chamber in the rotational direction.

In some embodiments, the second stage cyclone air inlet may be provided in a sidewall of the second stage cyclone chamber.

In some embodiments, the second stage cyclone air inlet may include a vane located in the passage and, in a direction of air flow along the vane, having an upstream end located proximate the screen and a downstream end located proximate the second stage cyclone chamber.

In some embodiments, the vane may be integrally formed as part of a sidewall of the second stage cyclone chamber.

In some embodiments, the second stage cyclone may have plurality of second stage cyclone air inlets each of which comprises a vane.

In some embodiments, the screen may be made of metal, and may have screen a plurality of openings at least some of which extend in about the direction of rotation.

In some embodiments, a second stage outlet screen may have a plurality of openings at least some of which extend in about the direction of rotation.

In accordance with a third broad aspect of the teachings described herein, that may be used alone or in combination with other aspects, an air inlet passage for a cyclone is provided. The air inlet passage has walls which define a generally linear and preferably linear flow path. A projection of the flow path extends from the end of the cyclone inlet to a portion of the sidewall of the cyclone and may pass through the interior volume of the cyclone exterior of the cyclone air outlet (i.e., a vortex finder). Accordingly air directed into the cyclone by a tangential cyclone air inlet may be directed to circulate or cyclone within the cyclone without contacting the cyclone air outlet. It has also been determined that improved circulation or separation efficiency may be obtained by constructing one and preferably both walls of the inlet passage to be generally linear or linear instead of arcuate.

In some embodiments the air inlet commences (has an inlet end) in an annular channel exterior to the cyclone, such as an annular flow channel between a screen surrounding a cyclone and the cyclone itself. Such a construction may be used if the cyclone is nested inside an outer cyclone and therefore may comprise a second stage cyclone. The inlet may therefore comprise a generally linear or linear wall that extends in a downstream flow direction to a downstream opening in a sidewall of the cyclone. The upstream wall of the opening may be the sidewall of the opening through the sidewall of the cyclone which extends generally linearly or linearly.

In accordance with this third aspect, there is provided a vacuum cleaner comprising:

(a) an outer first stage cyclone having a first stage cyclone chamber, a first stage cyclone air inlet and a first stage longitudinal cyclone axis about which the air rotates in the first stage cyclone chamber;

(b) an inner second stage cyclone downstream from the inner first stage cyclone, the second stage cyclone having a second stage cyclone chamber, a second stage cyclone air inlet port, a second stage cyclone air outlet and a second stage longitudinal cyclone axis about which the air rotates in the second stage cyclone chamber;

(c) a screen positioned laterally outwardly from the second stage cyclone and defining a passage positioned between an inner side of the screen and the outer wall of the second stage cyclone wherein air exiting the outer first stage cyclone enters the passage and flow towards the second stage cyclone air inlet port; and, (d) a directing member located in the passage, the directing member having, in the rotational direction, a directing surface facing towards the flow of air in the passage, the directing surface extending from an upstream end located in the passage and a downstream end located proximate the second stage cyclone air inlet port wherein the directing surface extends generally linearly.

In some embodiments, the second stage cyclone air inlet port may have an upstream edge and a downstream edge spaced from the upstream edge around a periphery of the second stage cyclone chamber by a second stage inlet port width. The directing member may have a length from the upstream end to the downstream end that is greater than the second stage inlet port width.

In some embodiments, the second stage cyclone air inlet port may have an upstream edge and a downstream edge and a face of the upstream edge extends generally linearly.

In some embodiments, the second stage cyclone air outlet may include a flow conduit spaced radially inwardly from an inner surface of the second stage cyclone to define a flow region therebetween. The directing member and the face of the upstream side may define an inlet passage that extends generally linearly. The inlet passage may have a longitudinal flow axis and an extension of the face in the direction parallel to the longitudinal flow axis may extend through the flow region in the absence of intersecting the flow conduit.

In some embodiments, the inlet passage may have a cross sectional area in a direction transverse to the longitudinal flow axis and the flow region may have a cross sectional area in a radial direction that is greater than the cross sectional area of the inlet passage.

In some embodiments, the directing member may extend part way across the passage whereby the upstream end is spaced from the outer wall of the passage.

In some embodiments, the downstream end may be located at the second stage cyclone air inlet port.

In some embodiments, the directing member may be integrally formed as part of the sidewall of the second stage cyclone chamber.

In some embodiments, the directing member may extend to the outer wall of the passage.

In some embodiments, the downstream end may be located at the second stage cyclone air inlet port.

In accordance with this third aspect, there is also provided vacuum cleaner comprising:

(a) a cyclone chamber having a cyclone air inlet port provided in a sidewall of the cyclone chamber, a cyclone air outlet and a longitudinal cyclone axis about which the air rotates in the cyclone chamber in a rotational direction;

(b) an air inlet passage having inner and outer passage walls which extend axially along the cyclone, the passage having a width between the inner and outer passage walls in a direction transverse to cyclone axis; and, (c) a directing member located in the air inlet passage, the directing member having a directing surface facing towards the flow of air in the air inlet passage the directing member having, in the rotational direction, an upstream end located in the air inlet passage and a downstream end located proximate the cyclone air inlet port wherein the directing surface extends generally linearly.

In some embodiments, the cyclone air inlet port may have an upstream edge and a downstream edge and the directing member may have a length from the upstream edge to the downstream end that is greater than a width of the cyclone air inlet port from the upstream side to the downstream side.

In some embodiments, the directing member may extend part way across the passage whereby the upstream end is spaced from the outer wall of the passage.

In some embodiments, the downstream end may be located at the cyclone air inlet port.

In some embodiments, the directing member may be integrally formed as part of the sidewall of the cyclone chamber.

In some embodiments, the cyclone air inlet port may have an upstream edge and a downstream edge and a face of the upstream side may extend generally linearly.

In some embodiments, the cyclone air outlet may include a flow conduit spaced radially inwardly from an inner surface of the cyclone to define a flow region therebetween. The directing member and the face of the upstream edge may define an inlet passage that extends generally linearly. The inlet passage may have a longitudinal flow axis and an extension of the face in a direction parallel to the flow axis may extend through the flow region in the absence of intersecting the flow conduit.

In some embodiments, the inlet passage may have a cross sectional area in a direction transverse to the longitudinal flow axis and the flow region may have a cross sectional area in a radial direction that is greater than the cross sectional area of the inlet passage.

In some embodiments, the directing member may extend to the outer wall of the passage.

In some embodiments, the downstream end may be located at the cyclone air inlet port.

In some embodiments, the directing member may be integrally formed as part of the sidewall of the cyclone chamber.

In some embodiments, the cyclone air inlet port may be provided in a sidewall of the cyclone chamber.

In some embodiments, the cyclone chamber may have plurality of cyclone air inlet ports each of which may include a directing member.

In some embodiments, the inner passage wall may be a sidewall of the cyclone chamber and the outer passage wall may include a screen.

In accordance with a fourth broad aspect of the teachings described herein, which may be used alone or in combination with other aspects, a hand vacuum cleaner may include a cyclone assembly having dual nested cyclonic stages in series wherein at least one end of the cyclone stages is openable to provide access to portions of each of the first and second cyclonic stages. For example, two, three or all of the first stage cyclone chamber, the first stage dirt collection chamber, the second stage cyclone chamber and the second stage dirt collection chamber may be concurrently openable by opening the end of the cyclone assembly. An advantage of this design is that the emptying of the cyclone assembly may be simplified. Further, the cyclone assembly may be emptied without removing the cyclone assembly from the main body of the hand vacuum cleaner.

In accordance with this fourth aspect, there is provided a hand vacuum cleaner having, the hand vacuum cleaner comprising:

(a) a cyclone assembly having a front end and a rear end, the cyclone assembly comprising:

(b) a first stage cyclone having a first stage cyclone chamber and a first stage dirt collection chamber, the first stage cyclone having a first stage cyclone air inlet, a first stage cyclone air outlet and a first stage longitudinal cyclone axis about which the air rotates in the first stage cyclone chamber; and, (c) a second stage cyclone downstream from the first stage cyclone and at least partially nested in the first stage cyclone, the second stage cyclone having a second stage cyclone chamber and a second stage dirt collection chamber, the second stage cyclone having a second stage cyclone chamber, a second stage cyclone air inlet, a second stage cyclone air outlet and a second stage longitudinal cyclone axis about which the air rotates in the second stage cyclone chamber, wherein the cyclone assembly has an openable end comprising at least one of the front end and the rear end, the openable end is moveable and closes the first stage cyclone chamber, the first stage dirt collection chamber, the second stage cyclone chamber and the second stage dirt collection chamber, whereby, when the openable end is opened, the first stage cyclone chamber, the first stage dirt collection chamber, the second stage cyclone chamber and the second stage dirt collection chamber are each opened.

In some embodiments, the first stage dirt collection chamber may be external to the first stage cyclone chamber.

In some embodiments, the first stage cyclone chamber may have a sidewall dirt outlet.

In some embodiments, the second stage dirt collection chamber may be axially spaced from the second stage cyclone chamber and may be separated therefrom by a moveably mounted second stage cyclone chamber end wall which is moveable concurrently with the openable end.

In some embodiments, the second stage cyclone chamber axis may intersect the second stage dirt collection chamber.

In some embodiments, the moveably mounted second stage cyclone chamber end wall may be axially spaced from the openable end.

In some embodiments, a moveably mounted first stage cyclone chamber end wall may be moveable concurrently with the openable end and with the second stage cyclone chamber end wall.

In some embodiments, the moveably mounted first stage cyclone chamber end wall may be axially spaced from the openable end and the second stage cyclone chamber end wall.

In some embodiments, a moveably mounted first stage cyclone chamber end wall may be moveable concurrently with the openable end.

In some embodiments, the moveably mounted first stage cyclone chamber end wall may be axially spaced from the openable end.

In some embodiments, the first stage cyclone chamber may have a moveably mounted first stage cyclone chamber end wall which is moveable concurrently with the openable end. The second stage cyclone chamber may have a moveably mounted second stage cyclone chamber end wall which is also moveable concurrently with the openable end.

In some embodiments, the moveably mounted first stage cyclone chamber end wall may be axially spaced from the openable end and the second stage cyclone chamber end wall may also be axially spaced from the openable end.

In some embodiments, the moveably mounted first stage cyclone chamber end wall may be axially spaced from the second stage cyclone chamber end wall.

In some embodiments, the moveably mounted first stage cyclone chamber end wall and the second stage cyclone chamber end wall may be mounted to the openable end by a common mount.

In some embodiments, the moveably mounted first stage cyclone chamber end wall may be spaced axially outwardly from the second stage cyclone chamber end wall and axially inwardly from the openable end. The moveably mounted first stage cyclone chamber end wall may have a larger cross sectional area than the moveably mounted second stage cyclone chamber end wall.

In some embodiments, the front end may be the openable end.

In some embodiments, the second stage dirt collection chamber may be external to the second stage cyclone chamber and the second stage cyclone chamber has a sidewall dirt outlet.

In some embodiments, the second stage dirt collection chamber may be external to the second stage cyclone chamber and may extend along at least a portion of a length of the second stage cyclone chamber towards a rear end of the second stage cyclone chamber and the openable end may be the rear end of the cyclone assembly.

In some embodiments, the second stage dirt collection chamber may be radially positioned between the first and second stage cyclone chambers.

In accordance with a fifth broad aspect of the teachings described herein, which may be used alone or in combination with other aspects, a cyclone assembly for a hand vacuum cleaner may have a front openable end or door wherein an air flow passage (e.g., a portion of the air flow passage from an inlet nozzle to the cyclone inlet) is moveable with the door. Accordingly, when the door is opened to empty one, two, three or all of the first stage cyclone chamber, the first stage dirt collection chamber, the second stage cyclone chamber and the second stage dirt collection chamber, the air flow passage may also be opened.

In accordance with this fifth aspect, there is provided a hand vacuum cleaner having, the hand vacuum cleaner comprising:

(a) an air flow path extending from a dirty air inlet to a clean air outlet and including an inlet conduit;

(b) a first stage cyclone having a first stage cyclone chamber and a first stage dirt collection region;

(c) a second stage cyclone downstream from the first stage cyclone and at least partially nested in the first stage cyclone, the second stage cyclone having a second stage cyclone chamber and a second stage dirt collection region; and, (d) an openable front end moveable between a closed position and an open position wherein, when the openable front end is in the open position, the first stage cyclone, the second stage cyclone and the inlet conduit are opened.

In some embodiments, the inlet conduit may be positioned above the second stage cyclone chamber.

In some embodiments, the dirty air inlet may be located at a front end of the inlet conduit.

In some embodiments, the inlet conduit may slideably receive a cleaning wand.

In some embodiments, the inlet conduit may be positioned above the first stage cyclone chamber.

In some embodiments, the first stage dirt collection region and the second stage dirt collection region may have a forward most end wall. A portion of the inlet conduit may be moveable with the front end. The portion of the inlet conduit may have an inward end spaced inwardly from the front end. The inward end may be positioned further inward than the forward most end wall of at least one of the first and second dirt collection regions.

In some embodiments, when the front end is opened, the first stage dirt collection region and the second stage dirt collection region may each be opened.

In some embodiments, the first stage dirt collection region may be external to the first stage cyclone chamber.

In some embodiments, the second stage dirt collection region may be external to the second stage cyclone chamber.

In some embodiments, when the front end is opened, the first stage cyclone chamber, the first stage dirt collection region and the second stage dirt collection region may each be opened.

In some embodiments, when the front end is opened, the first stage cyclone chamber, the first stage dirt collection region, the second stage cyclone chamber and the second stage dirt collection region may each be opened.

In some embodiments, the second stage dirt collection region may be external to the second stage cyclone chamber. The openable front end may have at least one wall that extends inwardly from a proximal end located at the front openable end to a distal end spaced inwardly from the proximal end. When the distal end is open, the at least one wall may define an open volume that comprises the second stage dirt collection region. The open end may sealingly abut a sidewall of the second stage cyclone when the front openable end is closed.

In some embodiments, a portion of the second stage cyclone may be positioned towards the openable end is conical in shape.

In some embodiments, when the front end is opened, the second stage cyclone chamber and the second stage dirt collection region may each be opened.

In some embodiments, an upper end of the openable front end may be pivotally mounted to the hand vacuum cleaner.

In accordance with this fifth aspect, there is also provided a hand vacuum cleaner having, the hand vacuum cleaner comprising:

(a) an air flow path extending from a dirty air inlet to a clean air outlet and including an inlet conduit;
(b) a cyclone stage having a cyclone chamber and a dirt collection region; and,
(c) an openable front end moveable between a closed position and an open position wherein, when the openable front end is in the open position, the cyclone and the inlet conduit are opened, wherein the inlet conduit is positioned above the cyclone chamber In some embodiments, the dirty air inlet may be located at a front end of the inlet conduit.

In some embodiments, the inlet conduit may slideably receive a cleaning wand.

In some embodiments, the dirt collection region may have a forward most end wall. A portion of the inlet conduit may be moveable with the front end. The portion of the inlet conduit may have an inward end spaced inwardly from the front end and positioned further inward than the forward most end wall of the dirt collection regions.

In some embodiments, the cyclone chamber may have an openable end wall that is mounted to the openable front end wall. The cyclone chamber may be opened when the openable front end is opened.

In some embodiments, an additional cyclonic stage may have a cyclone chamber and a dirt collection region. When the front end is opened, the dirt collection region of the cyclone stage and the dirt collection region of the additional cyclone stage may each be opened.

In some embodiments, the dirt collection region of the cyclone stage may be external to the cyclone chamber of the cyclone stage.

In some embodiments, the dirt collection region of the additional cyclone stage may be external to the cyclone chamber of the additional cyclone stage.

In some embodiments, an additional cyclonic stage may have a dirt collection region. When the front end is opened, the cyclone chamber of the cyclone stage, the dirt collection region of the cyclone stage and the dirt collection region of the additional cyclonic stage may each be opened.

In some embodiments, an additional cyclonic stage may have a cyclone chamber and a dirt collection region. When the front end is opened, the cyclone chamber of the cyclone stage, the dirt collection region of the cyclone stage, the cyclone chamber of the additional cyclonic stage and the dirt collection region of the additional cyclonic stage may each be opened.

In some embodiments, the dirt collection region may be external to the cyclone chamber. The openable front end may have at least one wall that extends inwardly from a proximal end located at the front openable end to a distal end spaced inwardly from the proximal end. When the distal end is open, the at least one wall may define an open volume that comprises the dirt collection region and the open end may sealingly abut a sidewall of the cyclone when the front openable end is closed.

In some embodiments, a portion of the cyclone positioned towards the openable end may be conical in shape.

In some embodiments, when front end is opened, the cyclone chamber and the dirt collection region may each be opened.

In some embodiments, an upper end of the openable front end may be pivotally mounted to the hand vacuum cleaner.

In accordance with a sixth broad aspect of the teachings described herein, which may be used alone or in combination with another aspect, a hand vacuum cleaner is provided with a dual stage cyclone assembly, which may be a dual stage nested cyclone assembly, having an openable end. The openable end opens and closes a dirt collection region as the openable end is opened and closed. The openable end closes the dirt collection region by abutting a sidewall of the dirt collection region. An advantage of this aspect is that alternate configurations of cyclone assembly may be used. Further, this aspect may enable the dirt collection region which is so opened and closed to be located closer to a pivot point of the openable end.

In accordance with this sixth aspect, there is provided a hand vacuum cleaner having, the hand vacuum cleaner comprising:

(a) an air flow path extending from a dirty air inlet to a clean air outlet and including an inlet conduit;
(b) a first stage cyclone having a first stage cyclone chamber and a first stage dirt collection region;
(c) a second stage cyclone downstream from the first stage cyclone and at least partially nested in the first stage cyclone, the second stage cyclone having a second stage cyclone chamber and a second stage dirt collection chamber external to the second stage cyclone chamber; and,
(d) an openable end moveable between a closed position and an open position, the openable end comprising a portion of the second stage dirt collection chamber, wherein, when the openable end is in the open position, the second stage dirt collection chamber is opened and when the openable end is the closed positon, the openable end contacts a sidewall of the second stage cyclone chamber and the second stage dirt collection region is closed In some embodiments, the openable end may have at least one wall that extends inwardly from a proximal end located at the openable end to a distal end spaced inwardly from the proximal end. When the distal end is open, the at least one wall may define an open volume that comprises the second stage dirt collection chamber and the open end may sealingly abut the sidewall of the second stage cyclone when the openable end is closed.

In some embodiments, the distal end may include a gasket.

In some embodiments, the second stage cyclone chamber may have an openable end wall that is mounted to the openable end. The second stage cyclone chamber may be opened when the openable end is opened.

In some embodiments, the openable end wall of the second stage cyclone chamber may be positioned inwardly from the openable end.

In some embodiments, at least a portion of the second stage dirt collection chamber may be positioned between the openable end and the openable end wall of the second stage cyclone chamber.

In some embodiments, the openable end may include a front openable end.

In some embodiments, when the openable end is opened, the first stage dirt collection region may also be opened.

In some embodiments, the first stage dirt collection region may be a first stage dirt collection chamber that is external to the first stage cyclone chamber.

In some embodiments, when the openable end is opened, the first stage cyclone chamber and the first stage dirt collection region may also be opened.

In some embodiments, when the openable end is opened, the first stage cyclone chamber, the first stage dirt collection region and the second stage cyclone chamber may also be opened.

In some embodiments, a portion of the second stage cyclone positioned towards the openable end may be conical in shape.

In some embodiments, an upper end of the openable end may be pivotally mounted to the hand vacuum cleaner.

In accordance with this sixth aspect, there is also provided a hand vacuum cleaner having, the hand vacuum cleaner comprising:

(a) a cyclone having a cyclone chamber and a dirt collection chamber external to the cyclone chamber; and, (b) an openable end moveable between a closed position and an open position, the openable end comprising a portion of the dirt collection chamber, wherein, when the openable end is in the open position, the dirt collection chamber is opened and when the openable end is the closed positon, the openable end contacts a sidewall of the cyclone chamber and the dirt collection region is closed In some embodiments, the openable end may have at least one wall that extends inwardly from a proximal end located at the openable end to a distal end spaced inwardly from the proximal end, wherein when the distal end is open. The at least one wall may define an open volume that includes the dirt collection chamber and the open end may sealingly abut the sidewall of the cyclone when the openable end is closed.

In some embodiments, the distal end may include a gasket.

In some embodiments, the cyclone chamber may have an openable end wall that is mounted to the openable end. The cyclone chamber may be opened when the openable end is opened.

In some embodiments, the openable end wall of the cyclone chamber may be positioned inwardly from the openable end.

In some embodiments, at least a portion of the dirt collection chamber may be positioned between the openable end and the openable end wall of the cyclone chamber.

In some embodiments, the openable end may include a front openable end.

In some embodiments, a portion of the cyclone positioned towards the openable end may be conical in shape.

In some embodiments, an upper end of the openable end may be pivotally mounted to the hand vacuum cleaner.

In accordance with a seventh aspect, there is provided a surface cleaning apparatus comprising:

a) an air flow path extending from a dirty air inlet to a clean air outlet with a suction motor positioned in the air flow path;

b) a cyclone positioned in the air flow path, the cyclone having a cyclone chamber, a cyclone chamber sidewall, a plurality of tangential air inlets, a cyclone air outlet and a longitudinal cyclone axis about which the air rotates in the cyclone chamber, the cyclone chamber having a length in a direction of the longitudinal cyclone axis wherein air rotates in a direction of rotation in the cyclone chamber, each of the tangential air inlets comprises an inlet port provided in the cyclone chamber sidewall, each inlet port has an upstream edge and a downstream edge in the direction of rotation; and, c) an air flow passage extending parallel to the cyclone axis and upstream from the tangential air inlets, the air flow passage having a terminal end at which the plurality of tangential air inlets are located, wherein each of the tangential air inlets has a terminal end wall and a flow directing member is provided at the downstream edge of one of the air inlet ports, the flow directing member extends longitudinally from the terminal end wall and also extends into the air flow passage.

In some embodiments, the flow directing members may be generally linear.

In some embodiments, the flow directing members may be configured to induce a rotational air flow within the cyclone chamber.

In some embodiments, the flow directing members may have a directing surface that generally faces an air flow in the air flow passage.

In some embodiments, the air flow in the air flow passage may comprise a rotational flow.

In some embodiments, the air flow passage may be positioned exterior to the cyclone chamber sidewall.

In some embodiments, the cyclone may be a downstream cyclone and a portion of the air flow passage is positioned between the cyclone chamber sidewall and a screen for an upstream cyclone.

In some embodiments, the downstream cyclone may be at least partially nested in the upstream cyclone.

In some embodiments, the downstream cyclone may be fully nested in the upstream cyclone.

In some embodiments, the air flow passage may have a passage length in the longitudinal direction, the screen may have a screen length in the longitudinal direction, the downstream cyclone may have a cyclone length in the longitudinal direction and each of the passage length and the screen length may be at least 50% of the cyclone length.

In some embodiments, the cyclone may comprise 4 to 8 cyclone air inlets.

In some embodiments, a combined cross-sectional area of the cyclone air inlets in a direction transverse to a flow direction therethrough may be about equal to a cross sectional area of the cyclone air outlet in a direction transverse to a flow direction therethrough.

In some embodiments, a combined cross-sectional area of the cyclone air inlets in a direction transverse to a flow direction therethrough may be about equal to a cross sectional area of a cyclone air inlet of the upstream cyclone in a direction transverse to a flow direction therethrough.

In some embodiments, the cyclone air outlet may be located at a same end of the cyclone as the cyclone air inlets.

In accordance with an eighth aspect, a surface cleaning apparatus comprises:

a) a first stage cyclone having a first stage cyclone chamber, a first stage cyclone air inlet, a first stage cyclone air outlet and a first stage longitudinal cyclone axis about which the air rotates in the first stage cyclone chamber, the first stage cyclone air outlet comprising a longitudinally extending screen;

b) a second stage cyclone downstream from the first stage cyclone and at least substantially nested in the first stage cyclone, the second stage cyclone having a second stage cyclone chamber, a second stage cyclone chamber sidewall, a plurality of second stage tangential air inlets, a second stage cyclone air outlet and a second stage longitudinal cyclone axis about which the air rotates in the second stage cyclone chamber, the second stage cyclone chamber having a length in a direction of the longitudinal cyclone axis wherein air rotates in a direction of rotation in the cyclone chamber, each of the tangential air inlets comprises an inlet port provided in the cyclone chamber sidewall, each inlet port has an upstream edge and a downstream edge in the direction of rotation; and, c) an air flow passage positioned between the screen and the second stage cyclone chamber sidewall, the air flow passage having a terminal end at which the plurality of tangential air inlets are located, wherein each of the tangential air inlets has a flow directing member that is provided at the downstream edge of one of the air inlet ports and that extends into the air flow passage.

In some embodiments, the air flow in the air flow passage may comprise a rotational flow and the flow directing members have a directing surface that generally faces an air flow in the air flow passage.

In some embodiments, a combined cross-sectional area of the second stage tangential air inlets in a direction transverse to a flow direction therethrough may be about equal to a cross sectional area of the second stage cyclone air outlet in a direction transverse to a flow direction therethrough.

In some embodiments, a combined cross-sectional area of the second stage tangential air inlets in a direction transverse to a flow direction therethrough may be about equal to a cross sectional area of the first stage cyclone air inlet in a direction transverse to a flow direction therethrough.

In some embodiments, the second stage cyclone air outlet may be located at a same end of the second stage cyclone as the second stage tangential air inlets.

In accordance with a ninth broad aspect of the teachings described herein, which may be used alone or in combination with any other aspect or aspects, a cyclone chamber of a surface cleaning apparatus has a plurality of tangential air inlets separated by cyclone wall portions. Air is introduced into the cyclone chamber via the air inlets such that the outlet end of at least some, and optionally all, of the tangential air inlets do not face the outlet end of any other tangential air inlets. Accordingly, a projection of a first air inlet of the plurality of tangential air inlets intersects an opposed wall portion to define an opposed wall section and not the outlet end of any other tangential air inlets.

An advantage of this ninth aspect is that the efficiency of the plurality of tangential air inlets may be improved. This aspect may reduce interference between air that enters through a first air inlet and air that enters through a second air inlet that is at an opposed location to the first air inlet. The continuation of the opposed wall portion in the direction of rotation of air from the downstream edge of the opposed wall section may direct the air that has entered through the first air inlet along the direction of rotation prior to mixing with air entering through the second air inlet. Accordingly, air entering through a second opposed air inet may encounter air that has commenced a rotational flow in the cyclone chamber.

In accordance with this ninth aspect, there is provided a surface cleaning apparatus comprising:

a) an air flow path extending from a dirty air inlet to a clean air outlet with a suction motor positioned in the air flow path; and, b) a cyclone positioned in the air flow path, the cyclone having a cyclone chamber, a plurality of tangential air inlets, a cyclone air outlet and a longitudinal cyclone axis about which the air rotates in the cyclone chamber, wherein air rotates in a direction of rotation in the cyclone chamber, each of the tangential air inlets comprises an inlet port having an upstream edge and a downstream edge in the direction of rotation, each inlet port is positioned between an upstream cyclone wall portion and a downstream cyclone wall portion, wherein a first inlet port has a width between the upstream edge of the first inlet port and a downstream edge of the first inlet port and a projection of the first inlet port intersects an opposed wall portion of the cyclone chamber to define an opposed wall section, and the opposed wall portion continues in the direction of rotation from a downstream edge of the opposed wall section to a second inlet port.

In some embodiments, the second inlet port may be located at least 0.05 times the width of the first inlet port from the downstream edge of the opposed wall section.

In some embodiments, the second inlet port may be located from 0.05 to 2 times the width of the first inlet port from the downstream edge of the opposed wall section.

In some embodiments, at least some of the air inlet ports may have a flow directing member provided at the downstream edge thereof.

In some embodiments, the flow directing members may be generally linear.

In some embodiments, the projection of the first inlet may be in a direction parallel to the flow directing member of the first inlet.

In some embodiments, the surface cleaning apparatus may further comprise a header surrounding the air inlet ports and the flow directing members extend into the header.

In accordance with a tenth broad aspect of the teachings described herein, which may be used along or in combination with any other aspect or aspects, a cyclone chamber of a surface cleaning apparatus has a plurality of tangential air inlets. At least some of the air inlets have a flow straightener, the flow straightener being an extension of a wall defining the tangential air inlet. This tenth aspect may improve the efficiency of the plurality of tangential air inlets and allow alternate configurations of cyclone design.

In accordance with this tenth aspect, there is provided a surface cleaning apparatus comprising:

a) an air flow path extending from a dirty air inlet to a clean air outlet with a suction motor positioned in the air flow path;

b) a cyclone positioned in the air flow path, the cyclone having a cyclone chamber, a plurality of tangential air inlets at a cyclone air inlet end of the cyclone chamber, a cyclone air outlet and a longitudinal cyclone axis about which the air rotates in the cyclone chamber, wherein air rotates in a direction of rotation in the cyclone chamber, each of the tangential air inlets comprises an inlet port having an upstream edge and a downstream edge in the direction of rotation, each inlet port is positioned between an upstream cyclone wall portion and a downstream cyclone wall portion; and, c) a header surrounding the air inlet ports, wherein at least some of the air inlets have a flow straightener, wherein each flow straightener is an extension of a wall defining a tangential air inlet.

In some embodiments, the flow straighteners may extend in a direction of flow of air through the tangential air inlet.

In some embodiments, the flow straighteners may be located in the header.

In some embodiments, a flow directing member may be provided at the downstream edge of at least some of the air inlet ports and the flow straighteners are provided on the radial outer end of the flow directing members.

In some embodiments, the flow directing members may extend generally linearly and the flow straighteners comprise a generally linear extension of the flow directing members.

In some embodiments, the cyclone air inlet end may comprise an inlet end wall, and the flow directing members extend from the inlet end wall into the header.

In some embodiments, the flow directing members may extend generally linearly and the flow straighteners comprise a generally linear extension of the end wall.

In some embodiments, the header may have a header end wall that is spaced from and faces the inlet end wall.

In some embodiments, a flow directing member may be provided at the downstream edge of at least some of the air inlet ports and the flow straighteners are provided on the radial inner end of the flow directing members.

In some embodiments, the flow straighteners may extend in a direction of flow of air through the tangential air inlet.

In some embodiments, the flow straighteners may be located at the upstream edge of the inlet ports.

In some embodiments, an additional flow straightener may be provided on the radial inner end of the flow directing members.

DRAWINGS

The drawings included herewith are for illustrating various examples of articles, methods, and apparatuses of the teaching of the present specification and are not intended to limit the scope of what is taught in any way.

Figure 32:
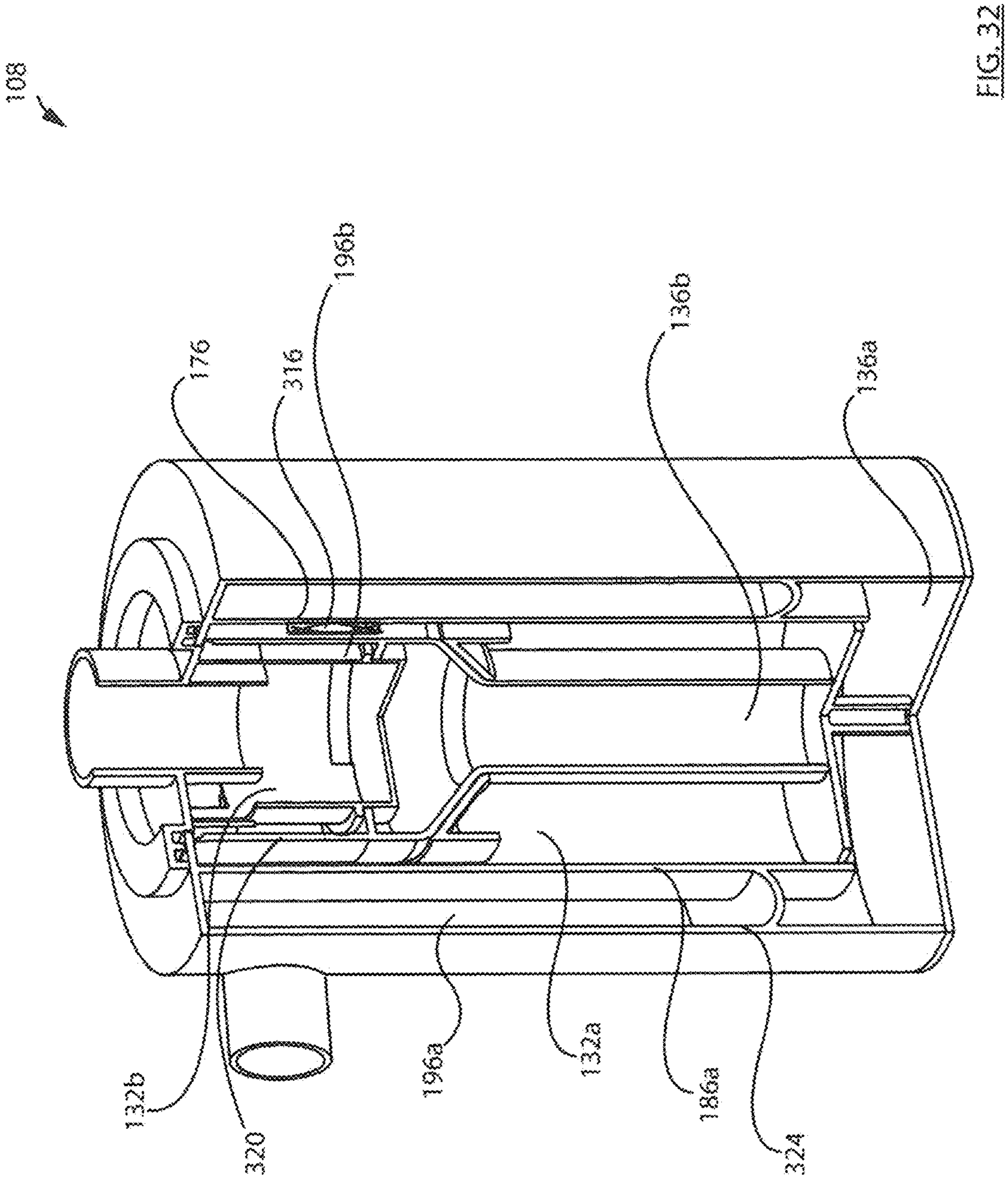
FIG. 32 is a cut-away view of an air treatment member in accordance with another embodiment.
Figure 33:
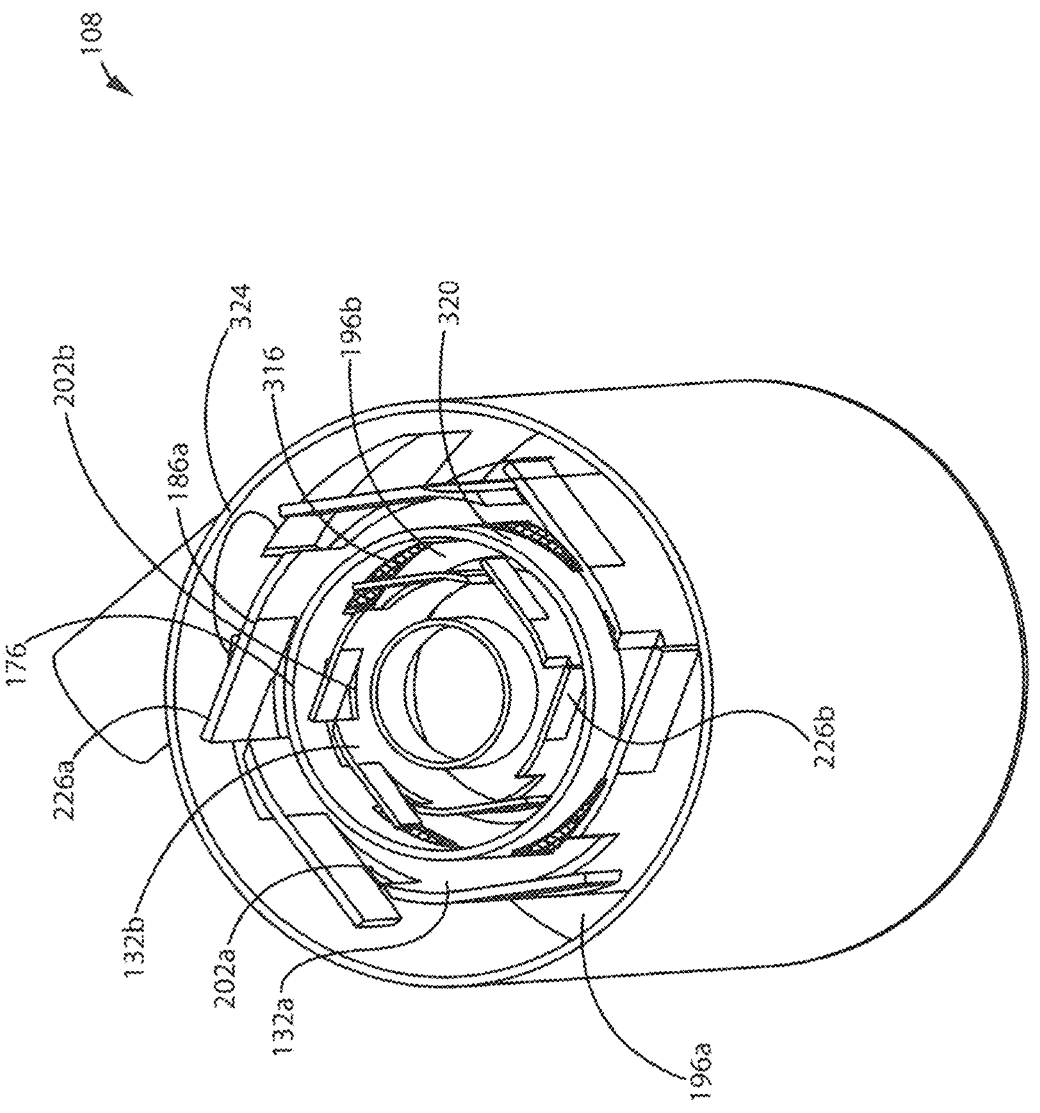
Figure 34:
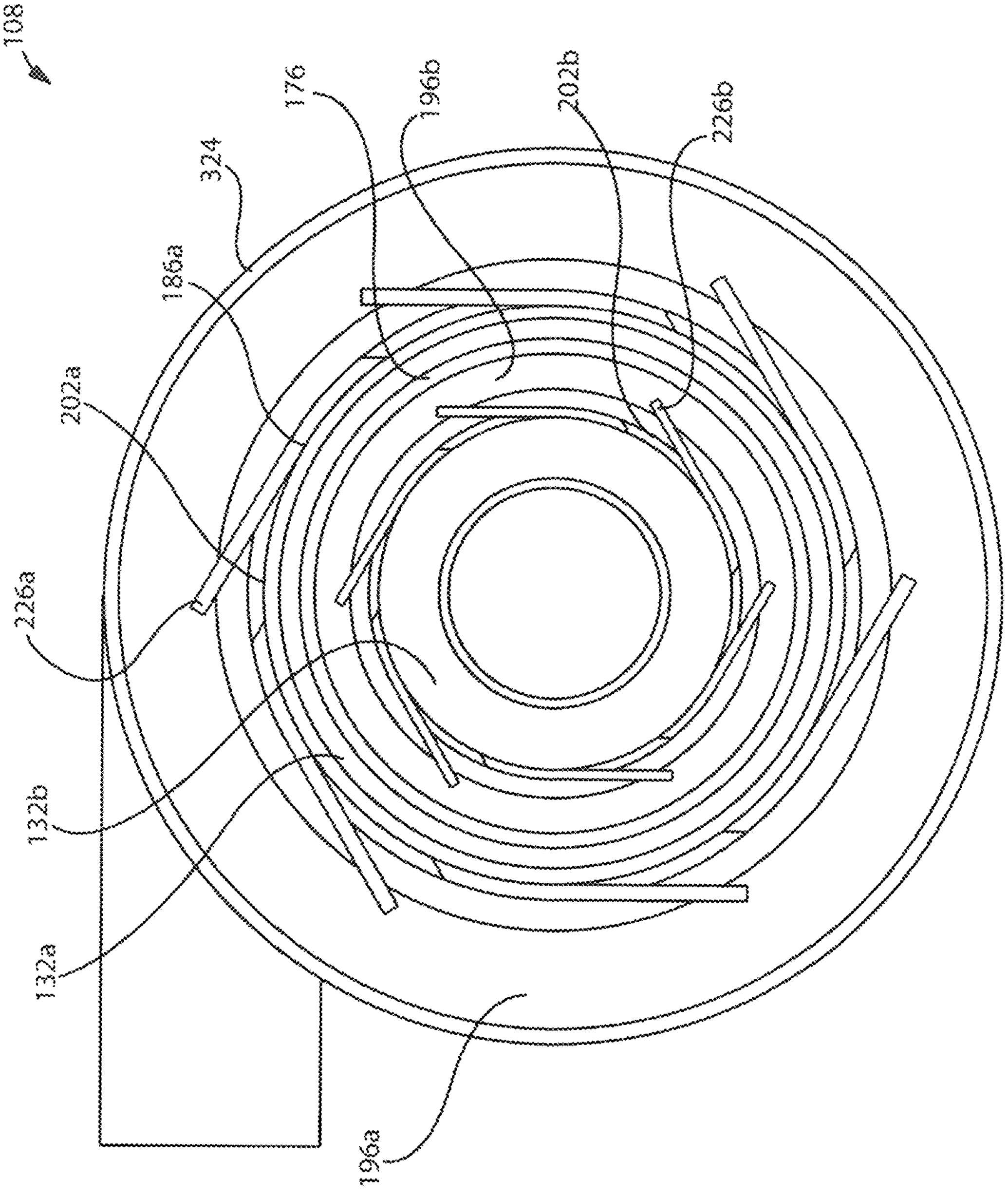
Figure 35:
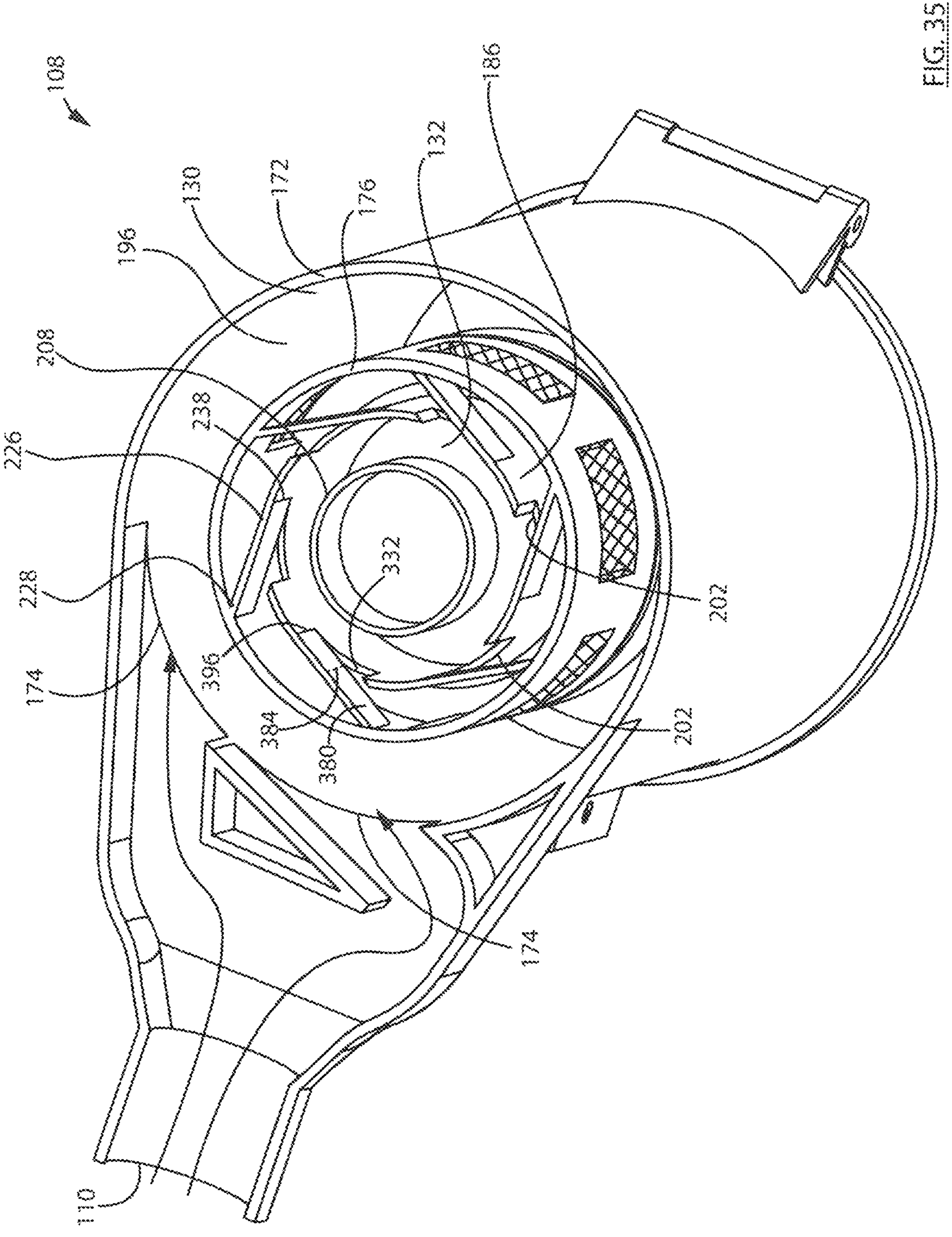
Figure 36:
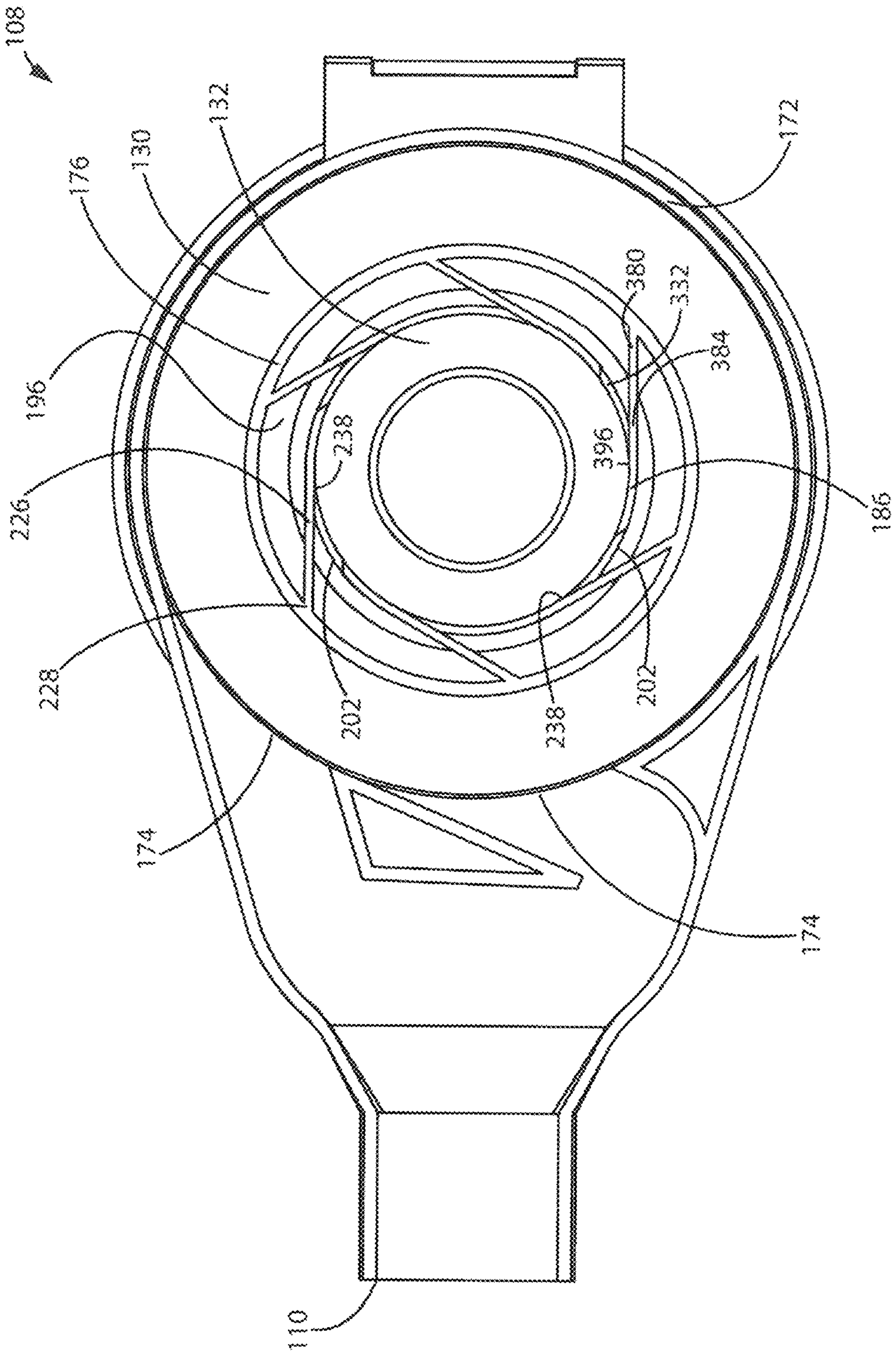
Figure 37:
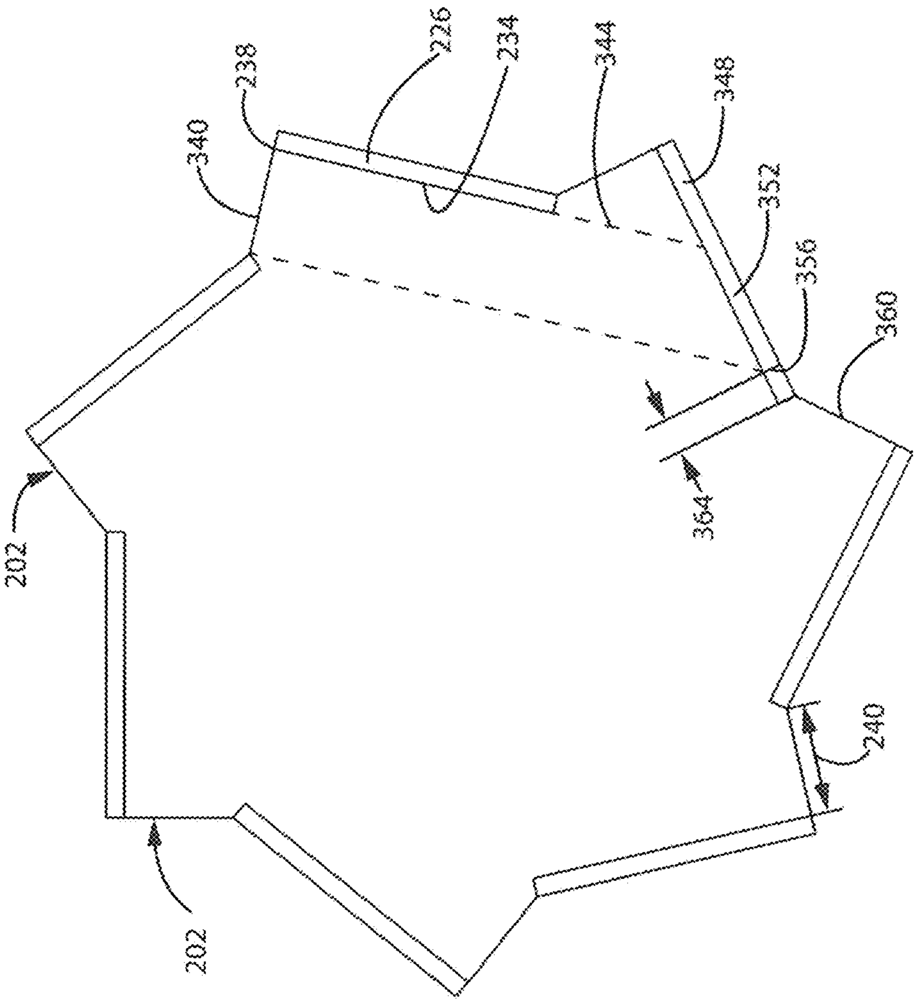
Figure 38:
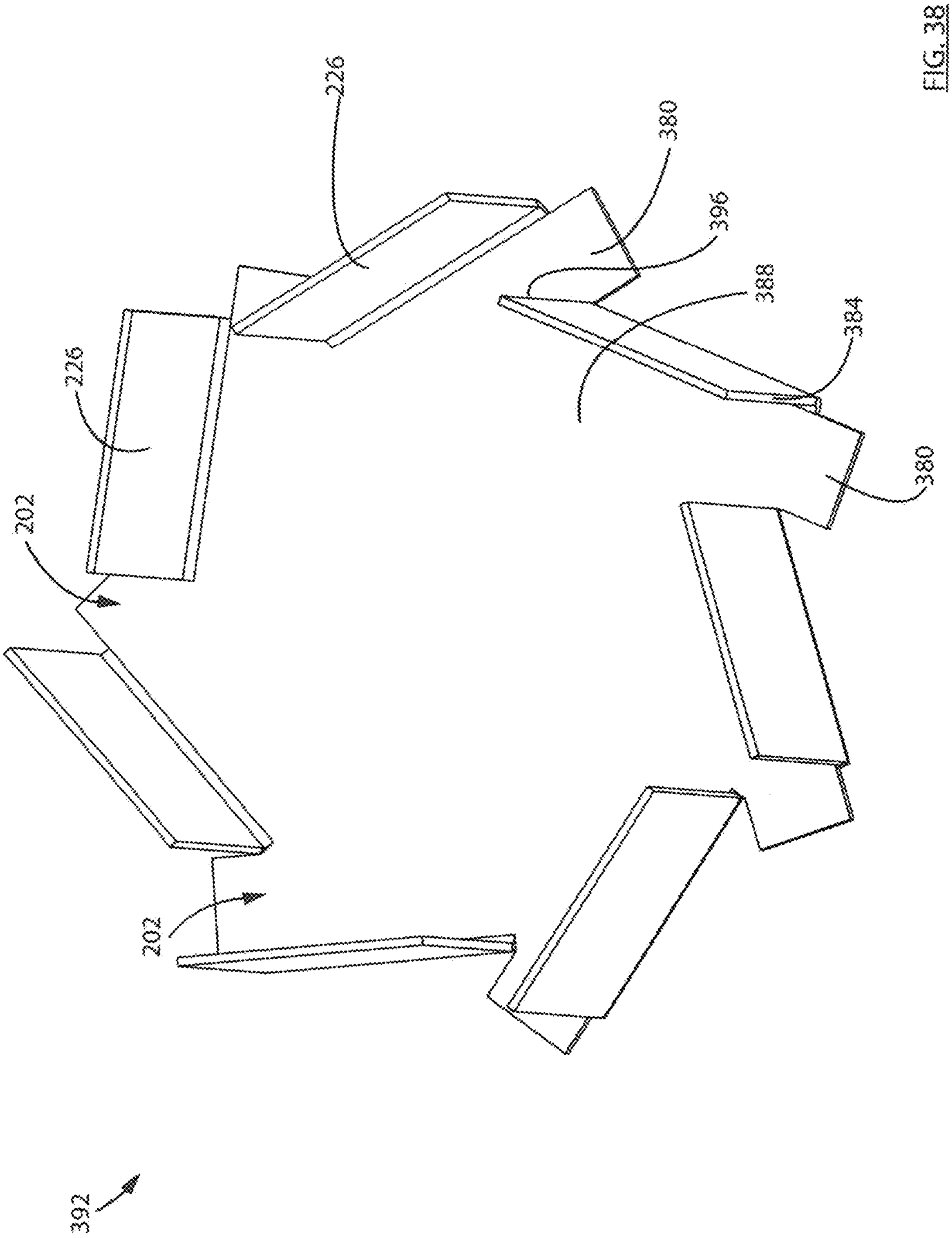
Figure 39:
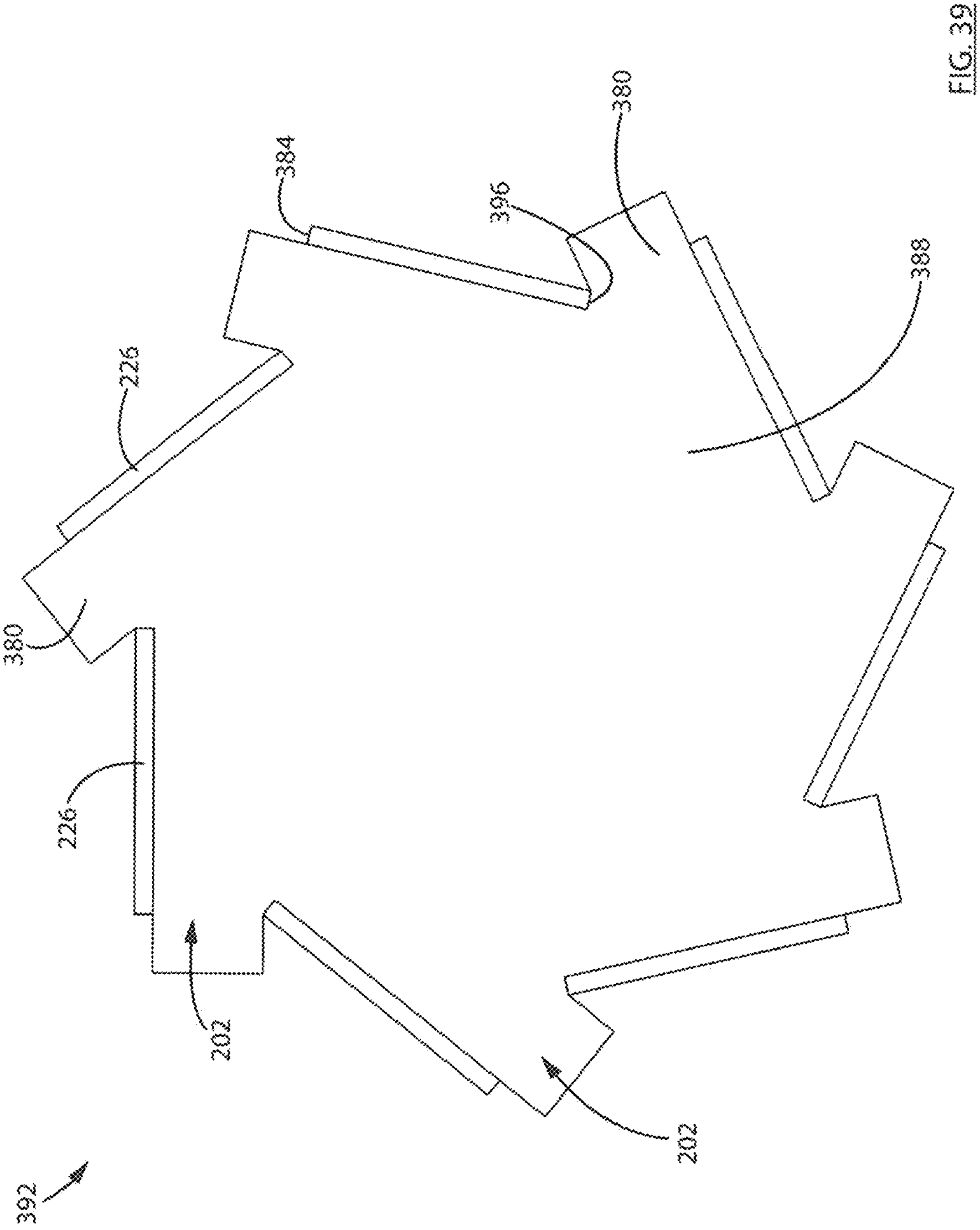
Figure 40:
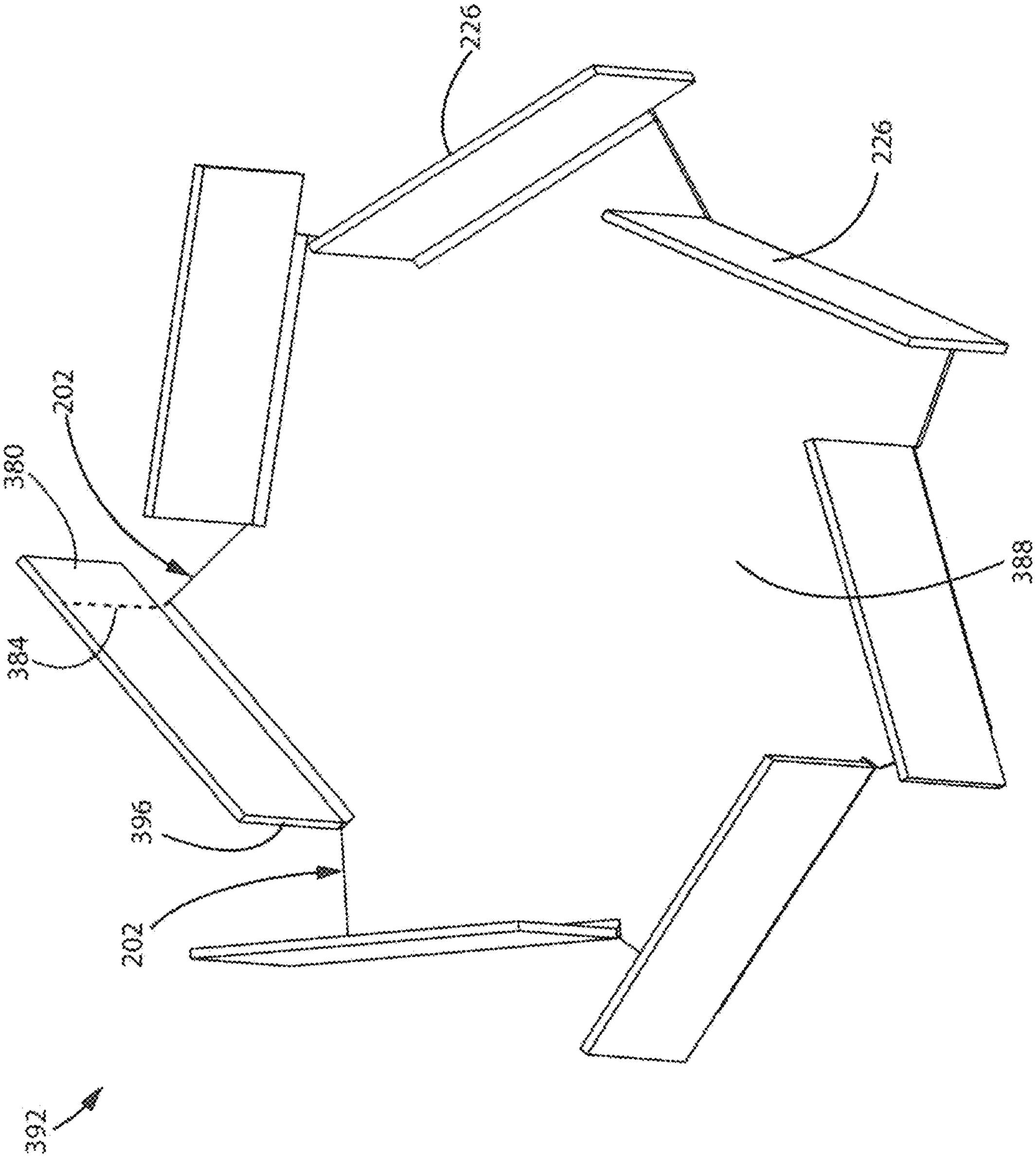
Figure 41:
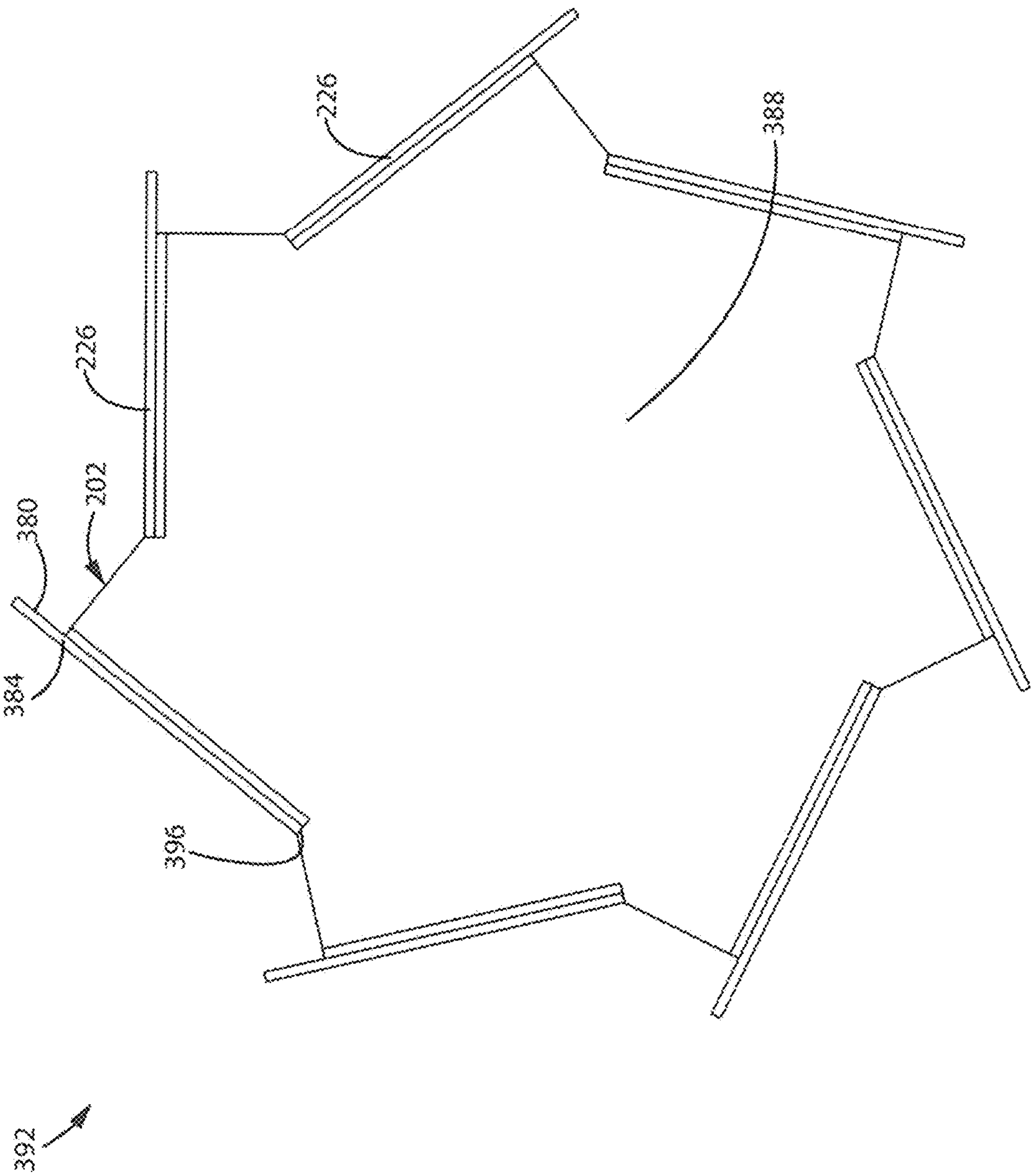
Figure 42:
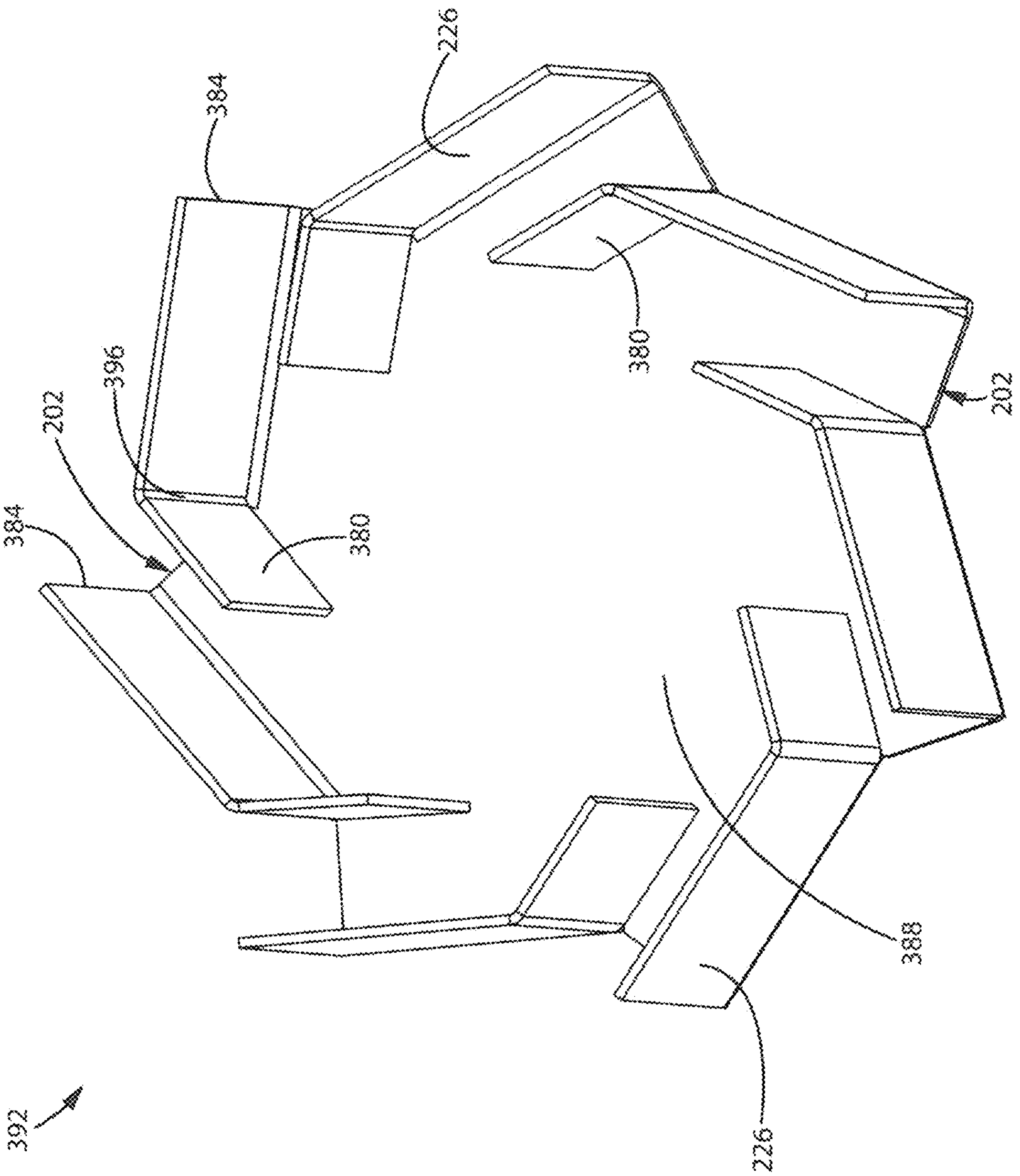
Figure 43:
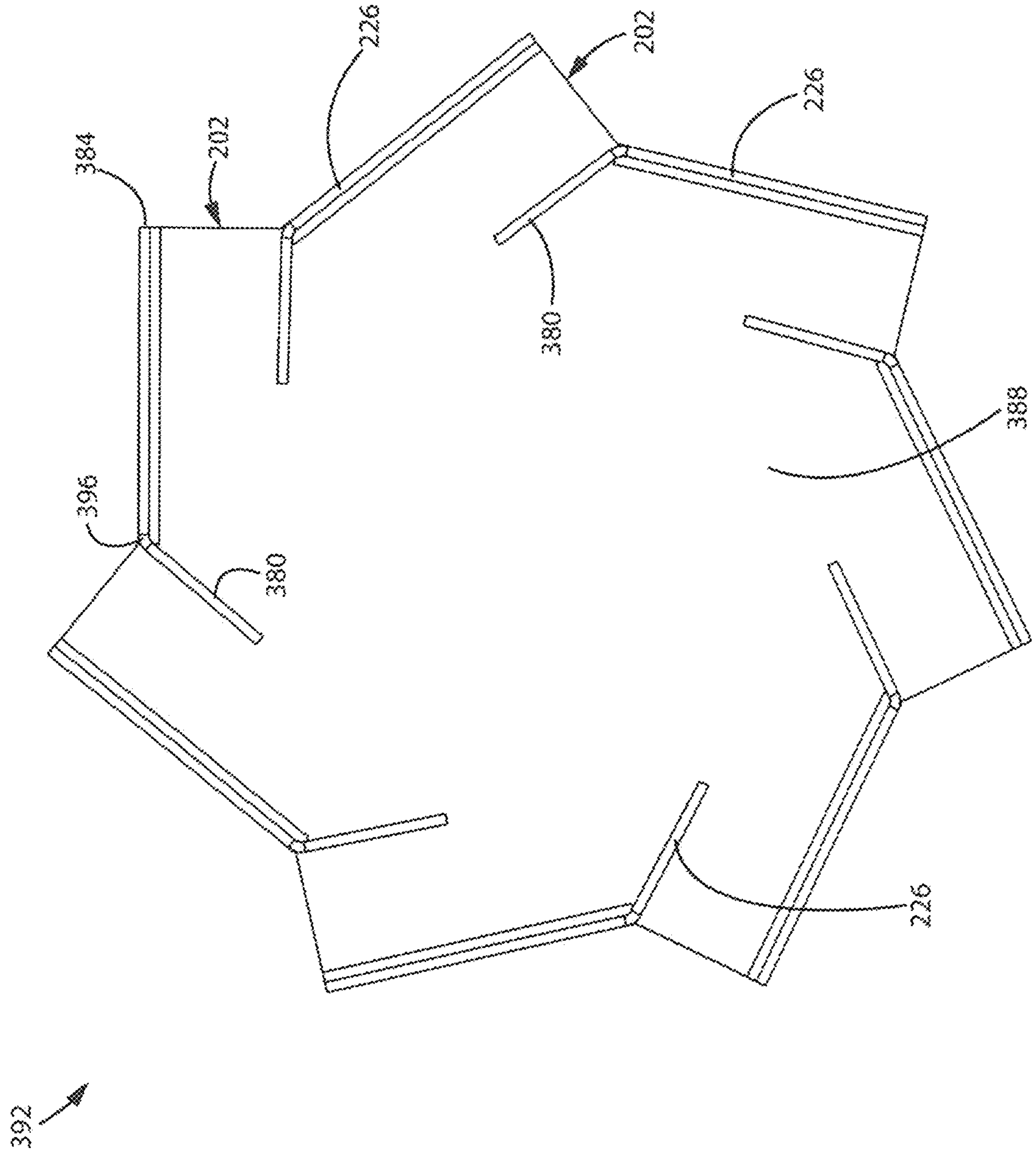
Figure 44:
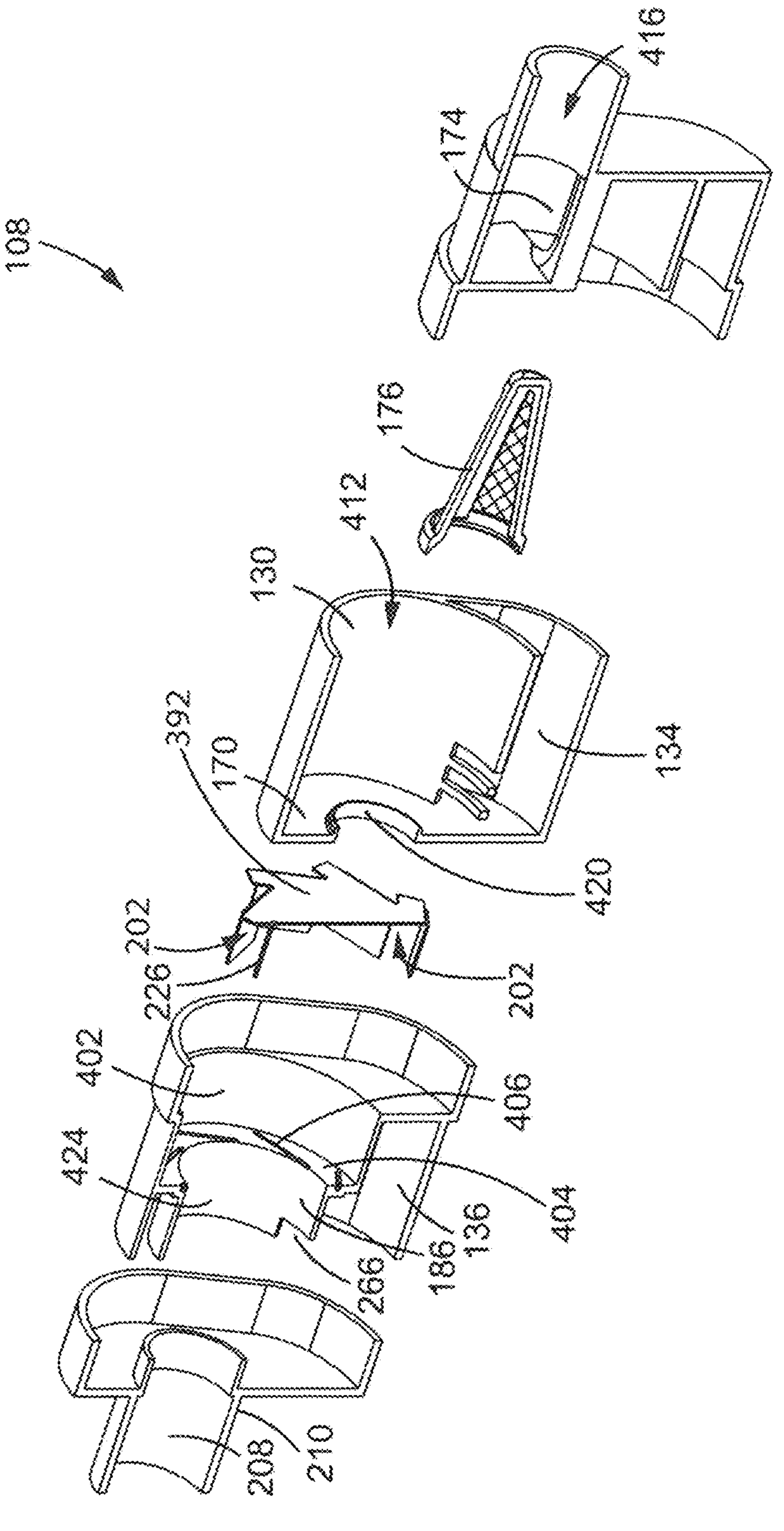
Figure 45:
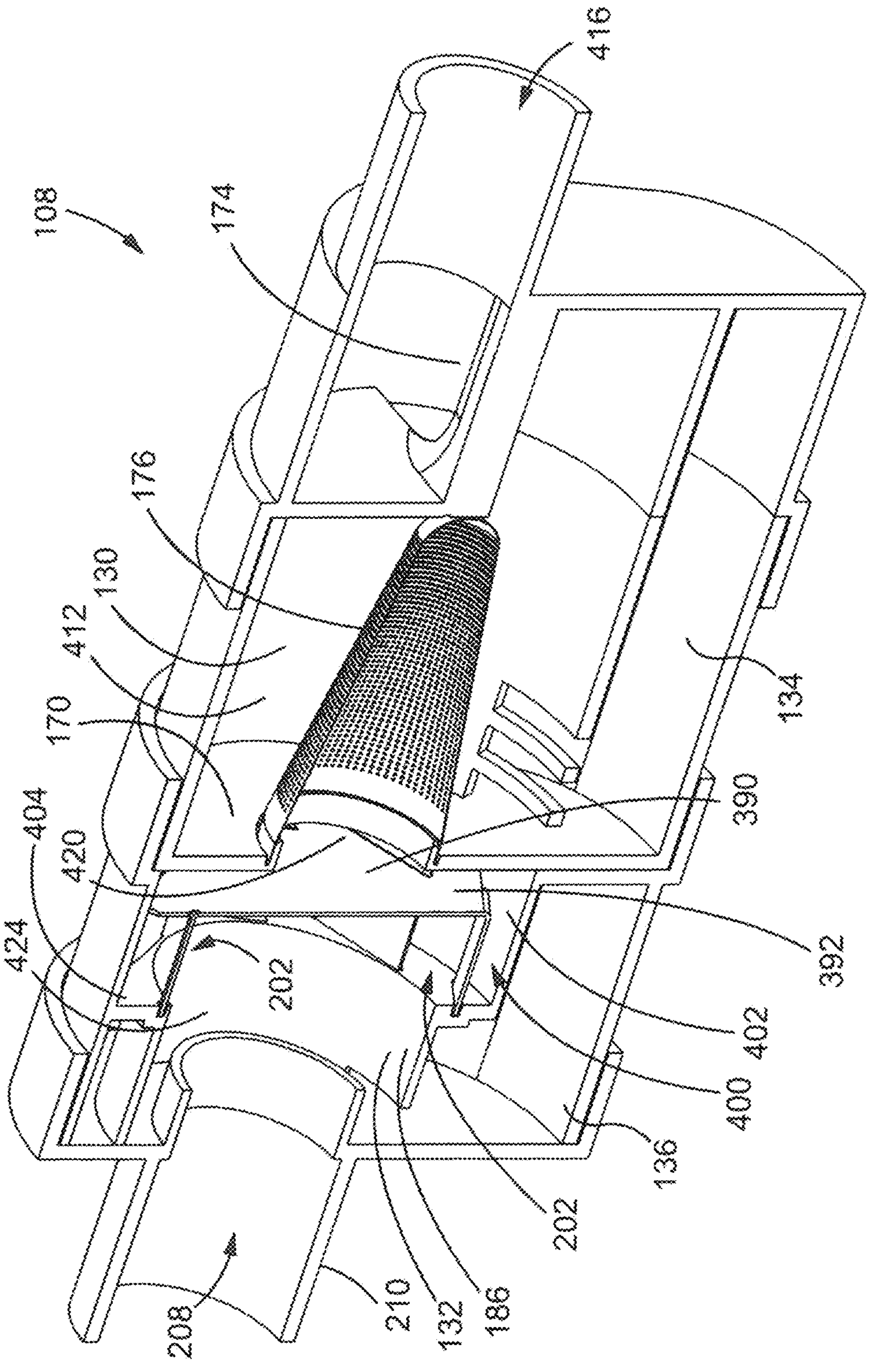

FIG. 33 perspective is a cross-sectional view of the air treatment member of FIG. 32;

FIG. 34 is a top plan cross-sectional view of the air treatment member of FIG. 32;

FIG. 35 is a perspective cross-sectional view of an air treatment member in accordance with another embodiment;

FIG. 36 is a top plan cross-sectional view of the air treatment member of FIG. 35;

FIG. 37 is a bottom plan view of an embodiment of an inlet body that is usable with a hand vacuum cleaner;

FIG. 38 is a bottom perspective view of another embodiment of an inlet body that is usable with a vacuum cleaner;

FIG. 39 is a bottom plan view of the inlet body of FIG. 38;

FIG. 40 is a bottom perspective view of another embodiment of an inlet body that is usable with a vacuum cleaner;

FIG. 41 is a bottom plan view of the inlet body of FIG. 40;

FIG. 42 is bottom perspective view of another embodiment of an inlet body that is usable with a vacuum cleaner;

FIG. 43 is a bottom plan view of the inlet body of FIG. 42;

FIG. 44 is an exploded perspective cross sectional view of an embodiment of a cyclone assembly that is usable with a vacuum cleaner; and, FIG. 45 is a perspective cross sectional view of the cyclone assembly of FIG. 44.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

General Description of a Surface Cleaning Apparatus

Referring to FIGS. 1-8, a first embodiment of a surface cleaning apparatus 100 is shown. The following is a general discussion of this embodiment which provides a basis for understanding several of the features which are discussed herein. As discussed in detail subsequently, each of the features may be used in other embodiments In the embodiment illustrated, the surface cleaning apparatus 100 is a hand-held vacuum cleaner, which is commonly referred to as a "hand vacuum cleaner" or a "handvac". As used herein, a hand-held vacuum cleaner or hand vacuum cleaner or handvac is a vacuum cleaner that can be operated generally one-handedly to clean a surface while its weight is held by the same one hand. This is contrasted with upright and canister vacuum cleaners, the weight of which is supported by a surface (e.g. floor below) during use. Optionally, surface cleaning apparatus 100 may be removably mountable on a base so as to form, for example, an upright vacuum cleaner, a canister vacuum cleaner, a stick vacuum cleaner or stick vac, a wet-dry vacuum cleaner and the like.

Optionally, the hand vacuum 100 can be mounted to a base so as to form, for example, an upright vacuum cleaner, a canister vacuum cleaner, a stick vac, a wet-dry vacuum cleaner and the like. For example, the base of the surface cleaning apparatus may include a surface cleaning head and an elongate wand that can be connected to the hand vacuum 100. In this configuration, the surface cleaning apparatus may be used to clean a floor or other surface in a manner analogous to a conventional upright-style vacuum cleaner.

Power may be supplied to the surface cleaning apparatus 100 by an electrical cord that may be connected to a standard wall electrical outlet. Alternatively, or in addition, the power source for the surface cleaning apparatus may be one or more onboard energy storage members, including, for example, one or more batteries.

Figure 1:
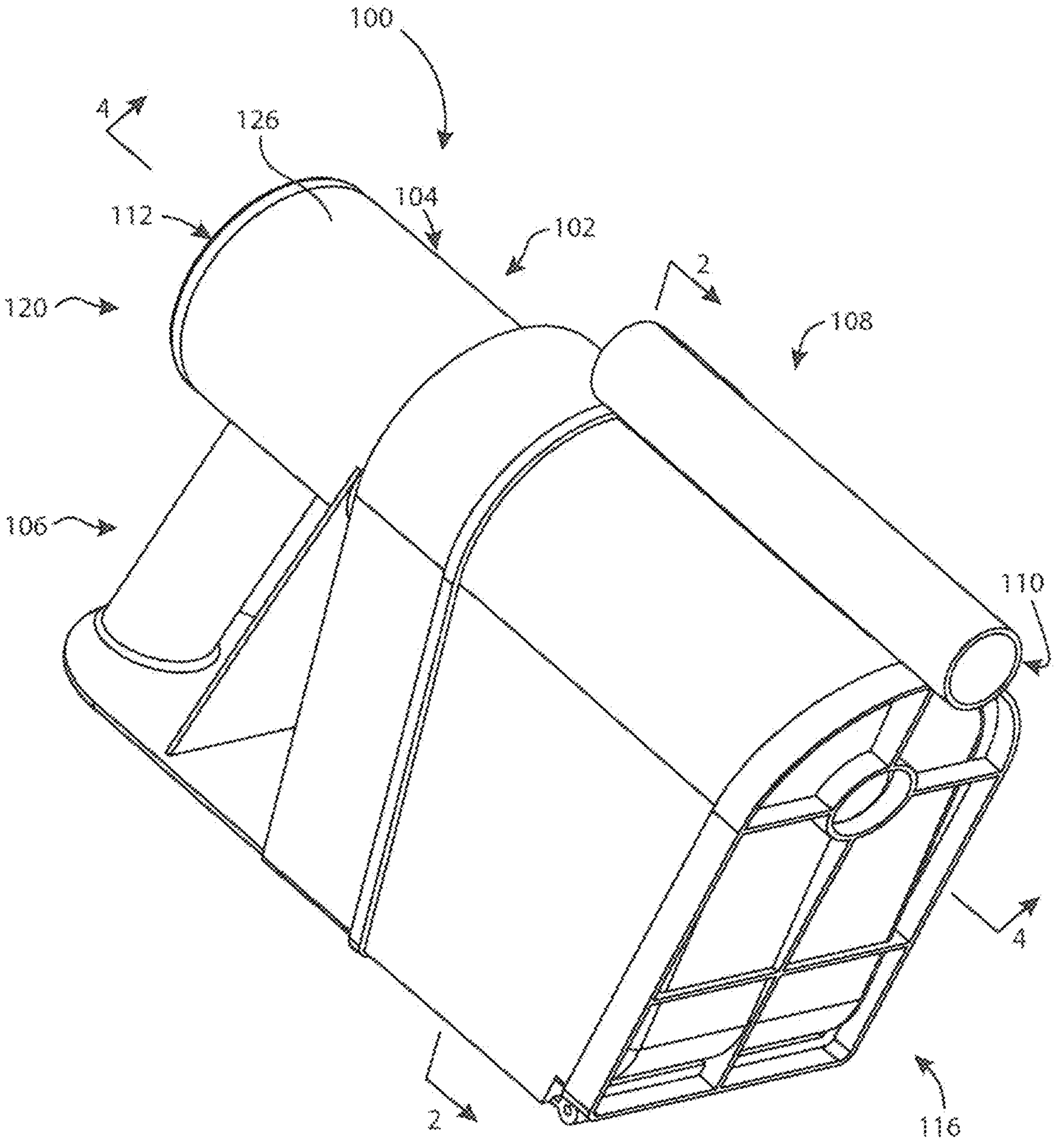
FIG. 1 is a front perspective view of one embodiment of a hand vacuum cleaner.
Figure 2:
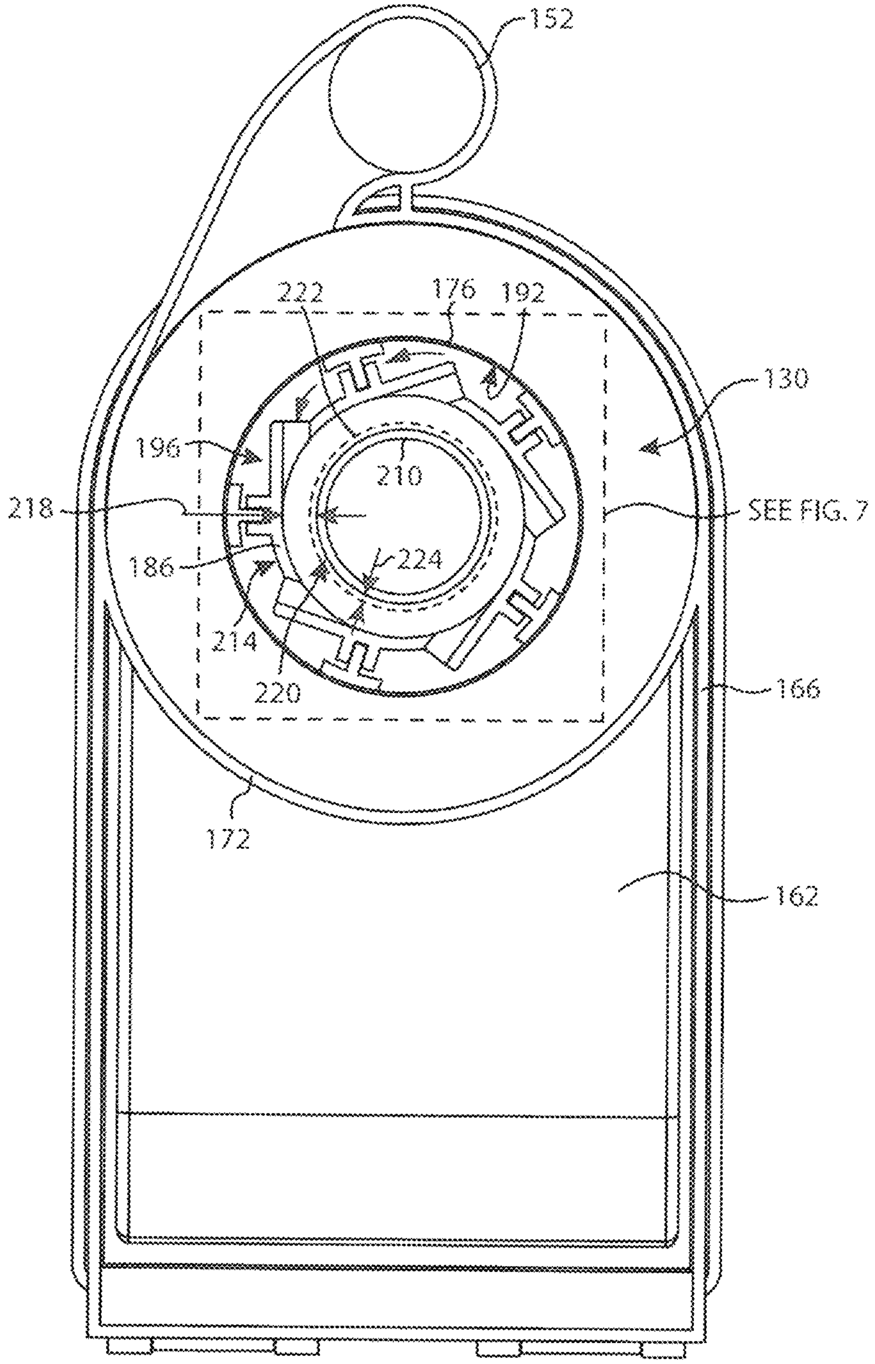
FIG. 2 is a cross-sectional end view of the hand vacuum cleaner of FIG. 1, taken along line 2-2.
Figure 3:
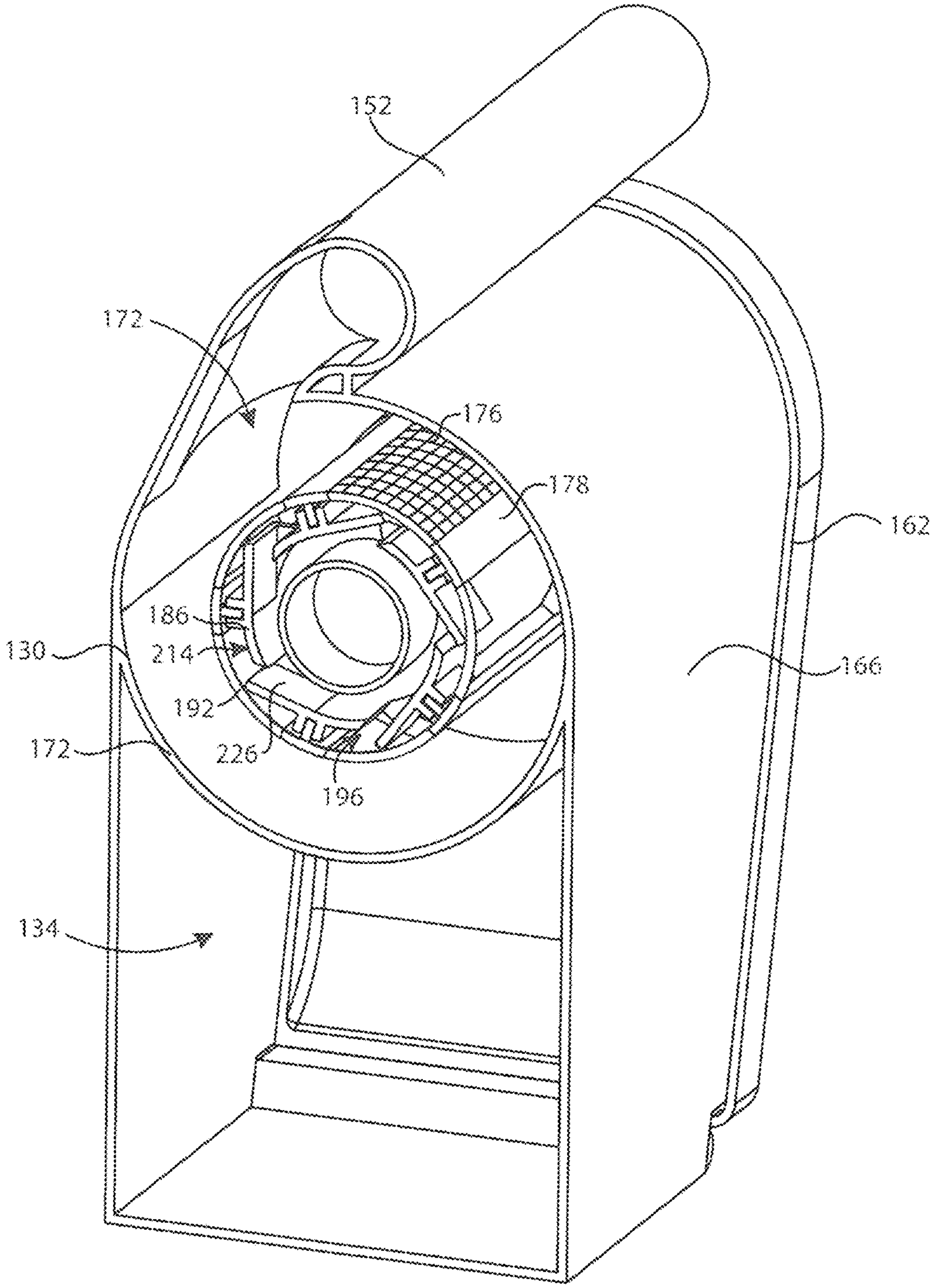
FIG. 3 is a perspective view of the cross-section of FIG. 2.
Figure 4:
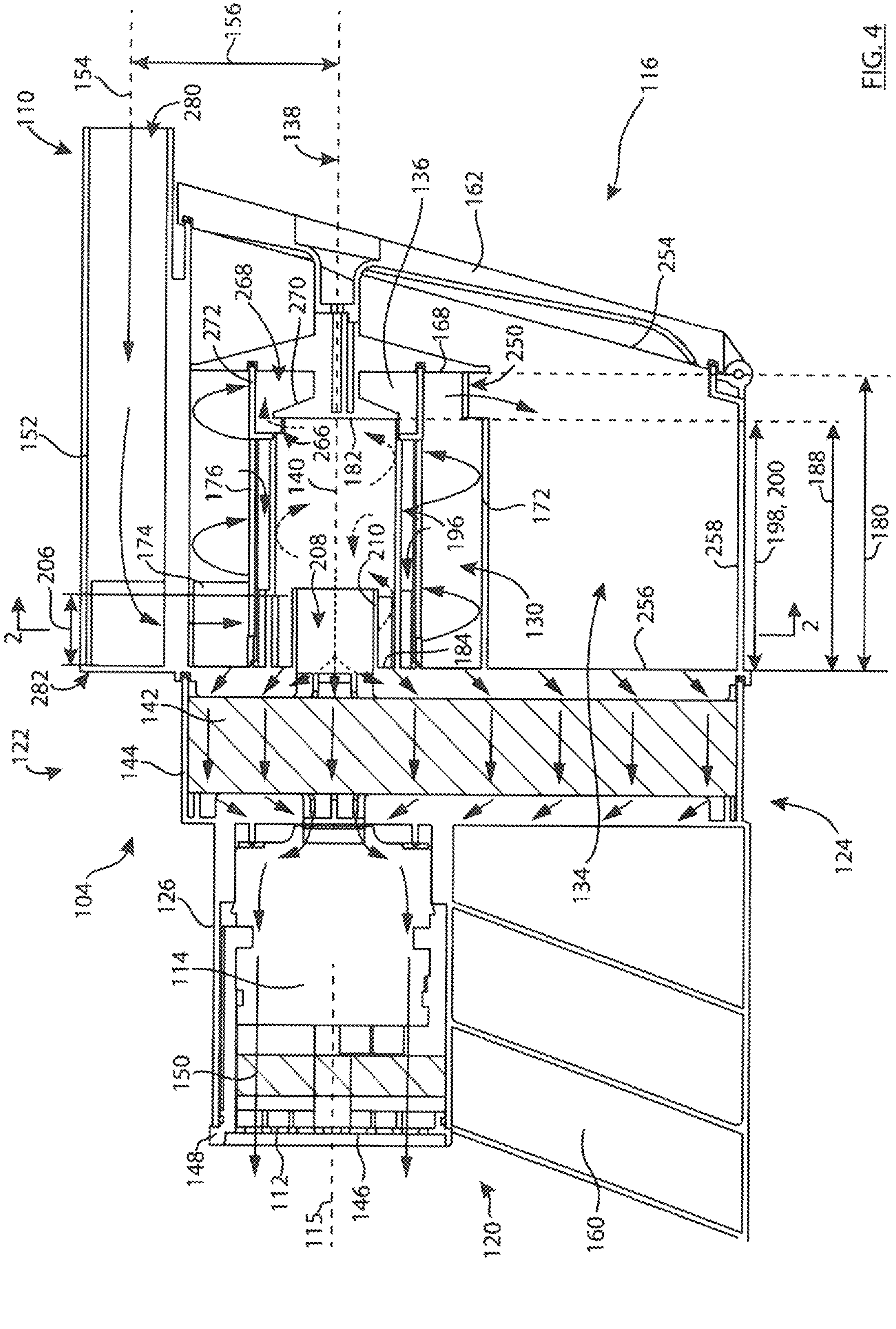
FIG. 4 is a cross-sectional side view of the hand vacuum cleaner of FIG. 1, taken along line 4-4.

As exemplified in FIGS. 1-8, the surface cleaning apparatus 100 has a main body 102 having a housing 104 and a handle 106. An air treatment member 108 is connected to the main body 102. The apparatus has a dirty air inlet 110, a clean air outlet 112 downstream from the dirty air inlet 110 and an air flow path extending therebetween, that includes the air treatment member 108. The surface cleaning apparatus 100 has a front end 116, an opposed rear end 120, an upper end 122 and a lower/bottom end 124 (FIG. 4). A suction motor 114 defines a motor axis 115 (about which the rotor rotates) and is provided to generate suction through the air flow path and is positioned within a motor housing portion 126 of the housing 104. The suction motor 114 may be upstream or downstream from the air treatment member 108, and in the exemplified embodiments is downstream.

The at least one air treatment member 108 is configured to treat the air in a desired manner, including, for example, removing dirt particles and other debris from the air flow. The air treatment member 108 may be provided upstream or downstream from the suction motor, and may be any suitable member that can treat the air. Optionally, the air treatment member 108 may include at least one cyclonic cleaning stage, and may in some instances include two or more cyclonic cleaning stages arranged in series with each other. Each cyclonic cleaning stage may include a cyclone unit that has one or more cyclone chambers (arranged in parallel with each other) and one or more dirt collection chambers, of any suitable configuration. The dirt collection chambers may be external to the cyclone chambers, or may be internal the cyclone chamber and configured as a dirt collection area or region within the cyclone chamber. Alternatively, the air treatment member may incorporate a bag, a porous physical filter media (such as foam or felt) or other air treating means.

Figure 6:
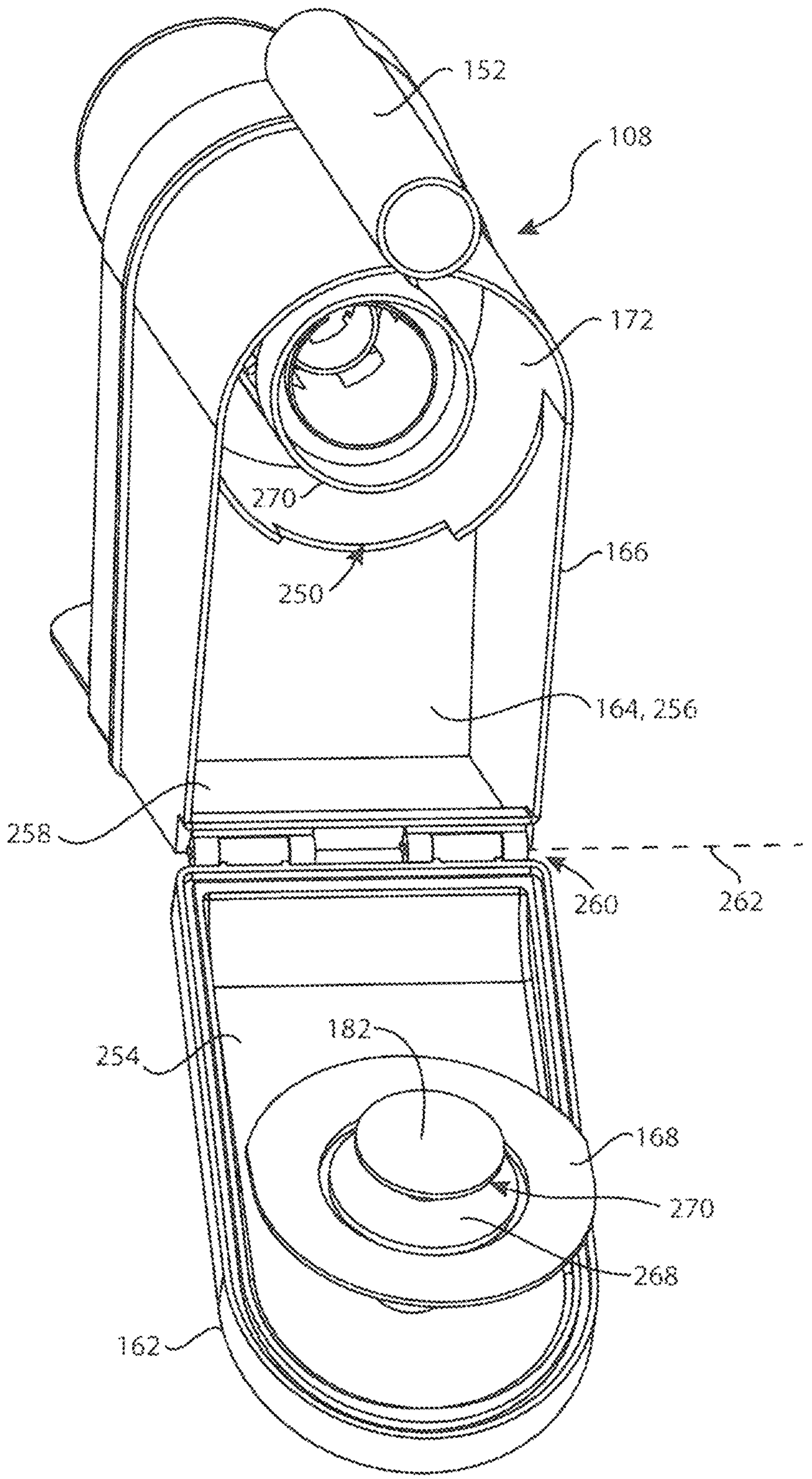
FIG. 6 is a front perspective view of the hand vacuum cleaner of FIG. 1, with an openable door in an open position.
Figure 7:
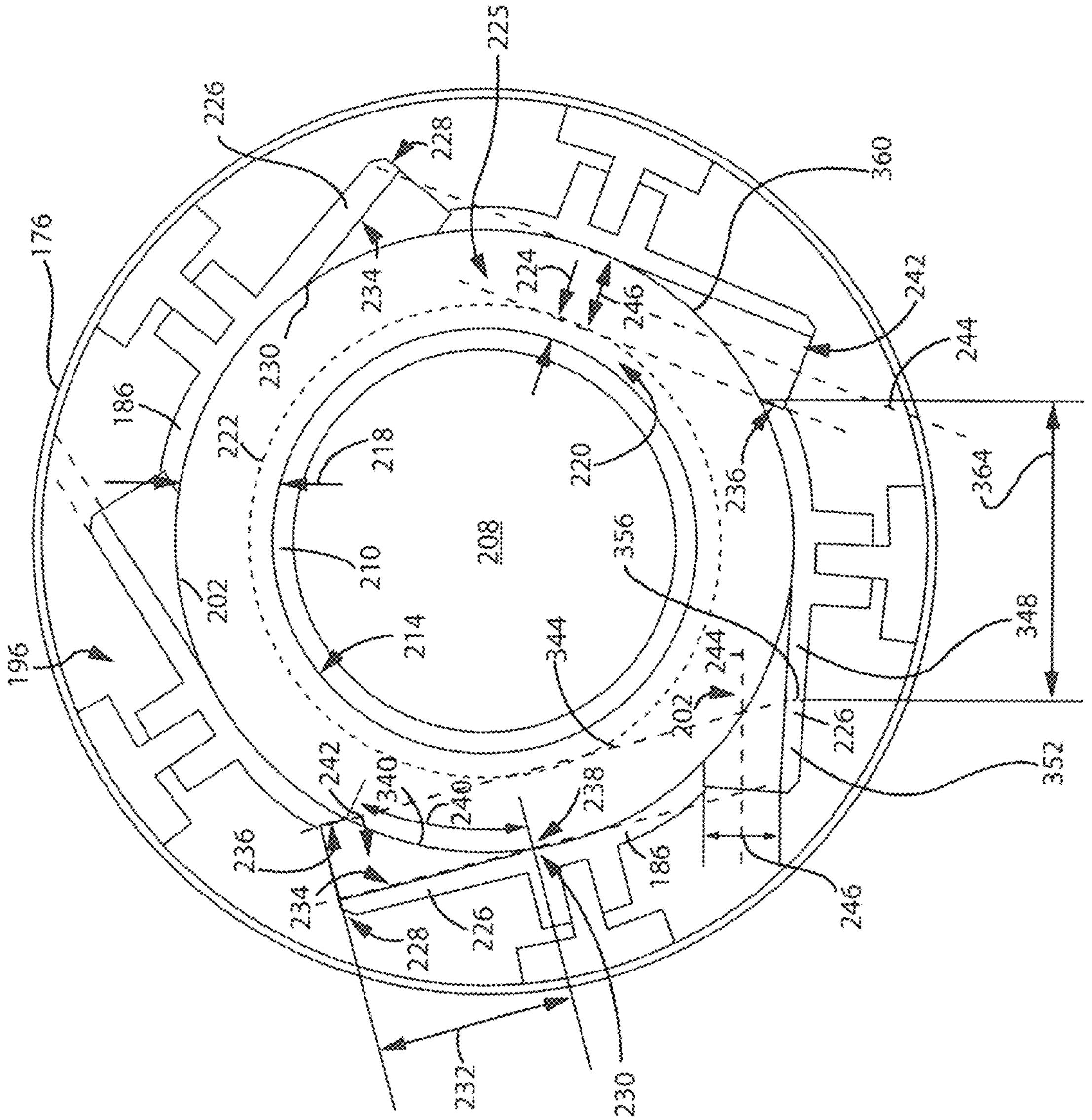
FIG. 7 is an enlarged view of a portion of FIG. 2.
Figure 8:
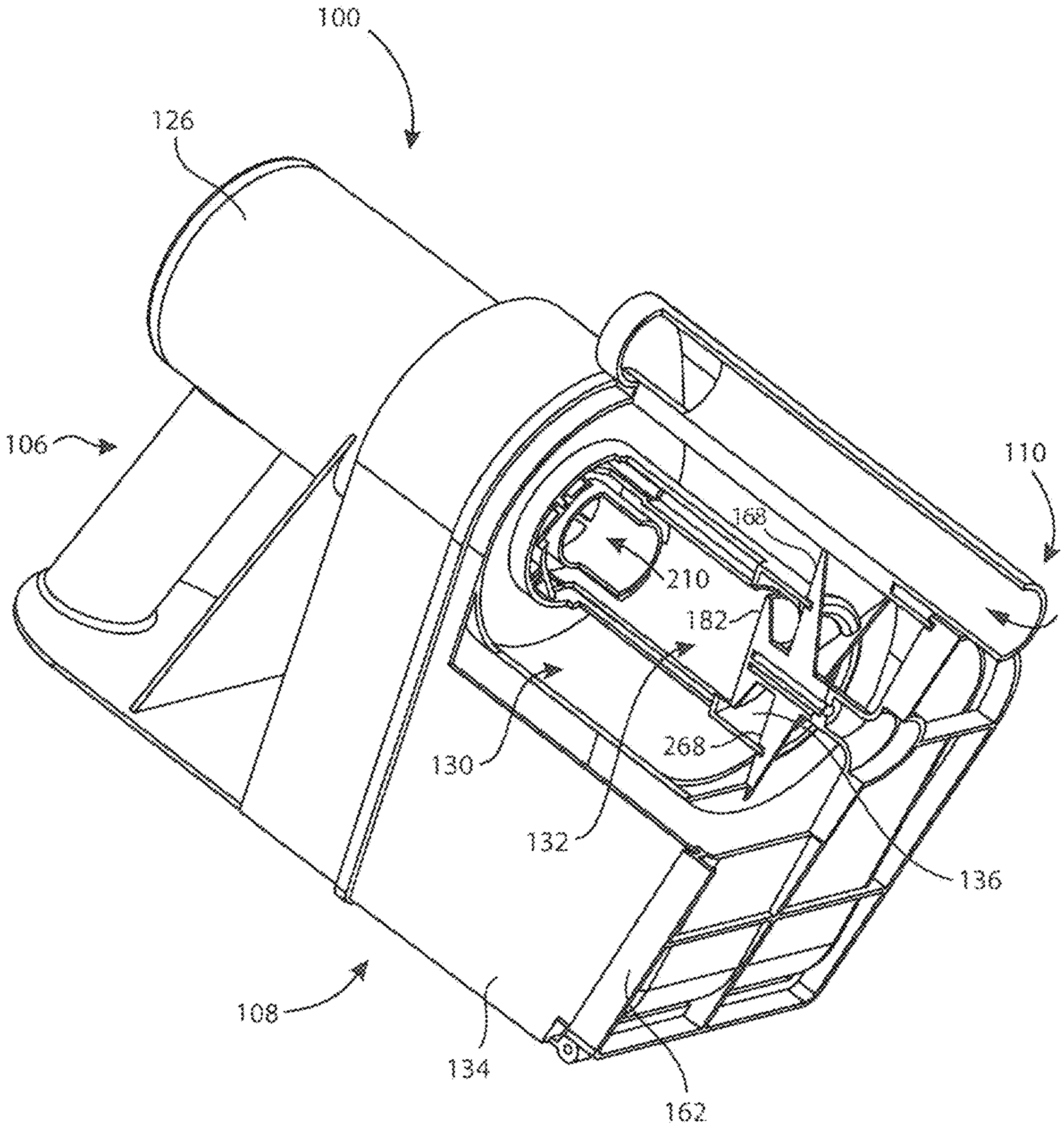
FIG. 8 is a front perspective view of the hand vacuum cleaner of FIG. 1, with a portion of the cyclone assembly cut away.
Figure 9:
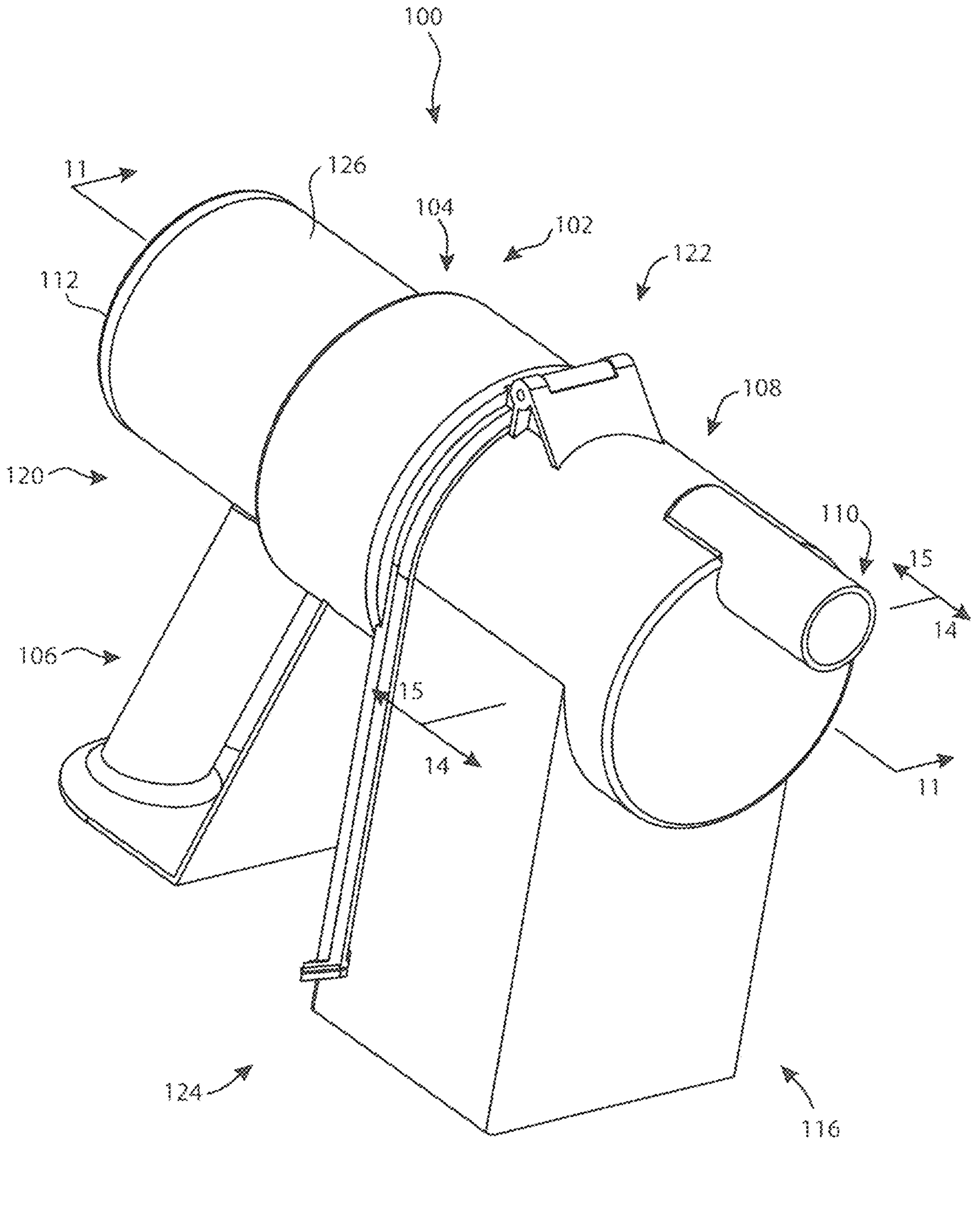
FIG. 9 is a front perspective view of another embodiment of a hand vacuum cleaner.

As exemplified in FIGS. 4 and 8, in the embodiment of FIGS. 1-8, the air treatment member 108 comprises a two-stage cyclone assembly having a first stage cyclone 130 and a second stage cyclone 132 that is arranged in series, downstream from the first stage cyclone 130. The cyclone assembly also includes, in this embodiment, a first stage dirt collection chamber 134 to receive dirt separated by the first stage cyclone 130, and a second stage dirt collection chamber 136 to receive dirt separated by the second stage cyclone 132. The first stage cyclone 130 defines a first cyclone axis 138, about which air circulates when in the first stage cyclone 130, and the second stage cyclone 132 defines a second cyclone axis 140, about which air circulates when in the second stage cyclone 132. The cyclone axes 138 and 140 may be generally parallel and, as exemplified in the illustrated embodiment (see FIG. 4) the cyclone axes 138 and 140 are both parallel and co-axial with each other. In other arrangements, the cyclone axes 138 and 140 need not be parallel or co-axial with each other.

In the embodiment of FIG. 4, the motor axis 115 is generally parallel to the cyclone axes 138 and 140 and to the inlet conduit axis 154. As exemplified, the motor axis 115 may be also positioned so that the axis 115 intersects one or more of the pre-motor filter housing 144, the first stage cyclone 130, second stage cyclone 132, front end walls 168 and 182, openable front wall 162, and front end walls 254 and 268 (as explained further herein). The motor axis 115 may be generally co-axial and, as exemplified, may be co-axial with the cyclone axes 138 and 140. This may help provide a desirable hand feel to a user.

The cyclone chambers 130 and 132 and dirt collection chambers 134 and 136 may be of any configuration suitable for separating dirt from an air stream and collecting the separated dirt, respectively. The cyclone chambers 130 and 132 may be oriented in any direction, including those described in more detail herein. For example, when surface cleaning apparatus 100 is oriented with the upper end 122 above the lower end 124, a the cyclone axes 138 and 140 may be oriented generally horizontally or horizontally as exemplified in this embodiment (FIG. 4), or alternatively may be oriented vertically, or at any angle between horizontal and vertical.

Optionally, one or more pre-motor filters may be placed in the air flow path between the air treatment member 108 and the suction motor 114. Alternatively, or in addition, one or more post-motor filters may be positioned in the air flow path between the suction motor 114 and the clean air outlet 112.

As exemplified in FIG. 4, in the illustrated embodiment the main body 102 may include a pre-motor filter 142 positioned within a pre-motor filter housing 144. The pre-motor filter housing 144 may be of any suitable configuration, including any of those exemplified herein. The pre-motor filter 142 may be any suitable filter, including any suitable porous media filter (i.e. foam and/or felt and the like) and may have any suitable shape that is consistent with the configuration of the pre-motor filter housing 144.

Figure 5:
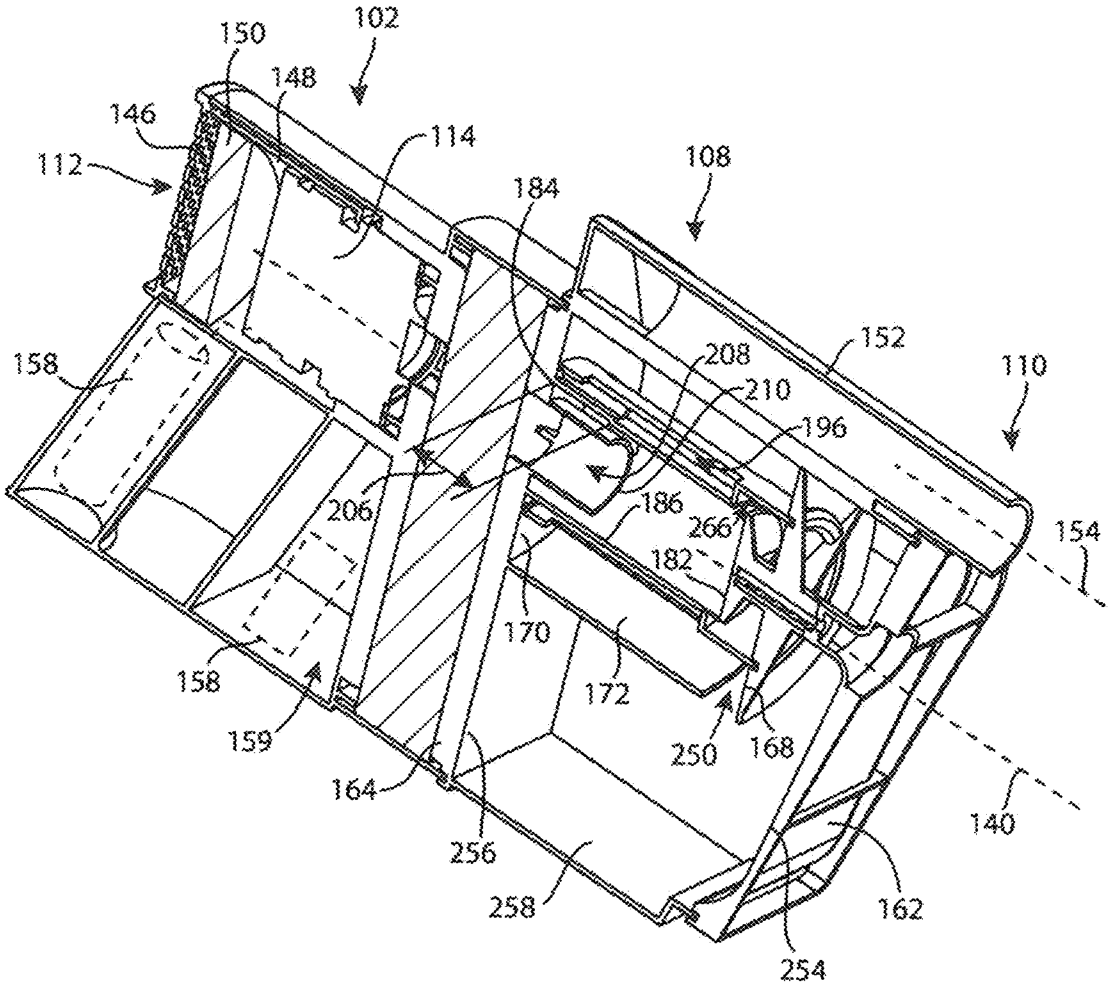
FIG. 5 is a perspective view of the cross-section of FIG. 4.

In the embodiment of FIGS. 4 and 5, the clean air outlet 112 is provided as part of the main body 102, and includes a grill 146. In this example, the grill 146 is oriented such that air exiting the clean air outlet 112 travels generally rearwardly from the rear end 120 of the hand vacuum 100 (in a direction parallel to the cyclone axes 138 and 140), and it forms part of an optional post-motor filter housing 148. In the illustrated embodiment, a post-motor filter 150 is provided within the housing 148 to help further treat the air passing through the hand vacuum 100. The illustrated post-motor filter 150 is a physical foam media filter, but optionally the post-motor filters may be any suitable type of filter and may include one or more foam filter, felt filter, HEPA filter, other physical filter media, an electrostatic filter and the like. It will be appreciated that any post motor air flow path may be used.

In the embodiment of FIGS. 4 and 5, the dirty air inlet 110 of the hand vacuum cleaner 100 is the inlet end of an inlet conduit 152. Dirty air inlet 110 may be positioned forward of the air treatment member 108 as shown. Optionally, the inlet end of the conduit 152 may be used as a nozzle to directly clean a surface and may have any configuration. The air inlet conduit 152 is, in this example, a generally linear member that extends along a conduit axis 154 that is oriented in a longitudinal forward/backward direction and is generally horizontal when the hand vacuum cleaner 100 is oriented with the upper end 122 above the lower end 124. Alternatively, or in addition to functioning as a nozzle, the inlet conduit 152 may be connected or directly connected to the downstream end of any suitable accessory tool such as a rigid air flow conduit (e.g., an above floor cleaning wand), a flexible air flow conduit such as a hose, a crevice tool, a mini brush or the like.

In the illustrated embodiment, the air inlet conduit 152 is located above (e.g., closer to the upper end 122 than) the cyclone axes 138 and 140, and is spaced from the axes 138 and 140 by a distance 156 (FIG. 4). The distance 156 may be selected to be large enough that the air inlet conduit 152 is above the air treatment member 108, and is therefore above the first stage cyclone 130, the second stage cyclone 132 and their respective axes 138, 140 and other features. This may help facilitate using a generally linear air flow conduit 152, which may help facilitate air flow through the apparatus 100. Alternatively, the distance 156 may be selected so that the inlet conduit 152 is above the cyclone axes 138 and 140, but at least partially overlaps (i.e., an projection of part or all of the conduit may pass through one or both of the first and second stage cyclone) the first stage cyclone 130 and/or the second stage cyclone 132 in the up/down direction. This may help reduce the overall height of the apparatus 100.

Optionally, power can be supplied to the surface cleaning apparatus 100 by an electrical cord connected to the hand vacuum that may be connected to a standard wall electrical outlet. The cord may optionally be detachable from the hand vacuum 100. Alternatively, or in addition, the power source for the surface cleaning apparatus 100 may be or comprise an onboard energy storage device which may include, for example, one or more batteries. In the embodiment of FIG. 5, the hand vacuum 100 includes on board power sources in the form of a schematically illustrated battery pack 158 that is provided in the handle 106, and in particular within a hand grip portion 160 of the handle 106. In other embodiments, one or more battery packs 158 may be provided in other portions of the main body 102 to provide power to the suction motor 114, such as, for example, a compartment 159 positioned on a front side of the handle 106. Optionally, the inlet conduit 152, or other portion of the apparatus 100, may be provided with any suitable electrical connector that can establish an electrical connection between the apparatus 100 and any accessory tool, cleaning head and the like that is connected to the inlet conduit 152. In such a configuration, the hand vacuum 100 may be used to power a surface cleaning head having a rotating brush, or other tools of that nature, using either the power supplied by the wall outlet and/or the onboard battery pack 158.

General Description of a Dual Stage Cyclonic Cleaning Unit

The following is a general description of a dual stage cyclonic cleaning unit that may be used with any one or more of the features set out herein.

As exemplified in FIGS. 4-8, cyclone assembly 108 includes a front wall 162, an opposing rear wall 164 and a side wall 166 extending therebetween. The cyclone assembly 108 may be formed from any suitable material, including plastic, metal and composite materials, and optionally at least a portion of the cyclone assembly may be transparent to allow a user to see the interior of the cyclone assembly while the hand vacuum 100 is in use.

The first stage cyclone may be of various configurations. The first stage cyclone 130 is positioned within the cyclone assembly 108 and includes a first cyclone chamber that is generally bounded by a front end wall 168, a rear end wall 170 and a first cyclone sidewall 172 extending along a first cyclone length 180 (FIG. 4) therebetween. As exemplified, the front end wall 168 may be provided as the rear surface of a plate that is connected to, and is offset from, the front end wall 162 of the cyclone assembly 108. In other embodiments, the front end wall 168 may be generally coincident with the front wall 162. It will be appreciated that the first stage cyclone may comprise part or all of the outer wall of cyclone assembly 108.

The first cyclone length 180 may be any suitable length, and may be between about 4 cm and 20 cm, and optionally may be between about 5 cm and about 15 cm, 6 cm and about 10 cm, and preferably in some embodiments may between about 7 cm and about 9 cm.

The first stage cyclone 130 also includes an air inlet port 174 (FIG. 4) through which air enters the first stage cyclone 130 from the air inlet conduit 152. In the embodiment illustrated, the air inlet port 174 is provided in an upper portion of the first cyclone sidewall 172 toward the rear end of the first stage cyclone 130 (i.e. proximate the rear end wall 170), but in other embodiments may be provided in other locations (toward the front end wall 168, in a side portion or lower portion of the first cyclone sidewall 172 and the like).

Figure 10:
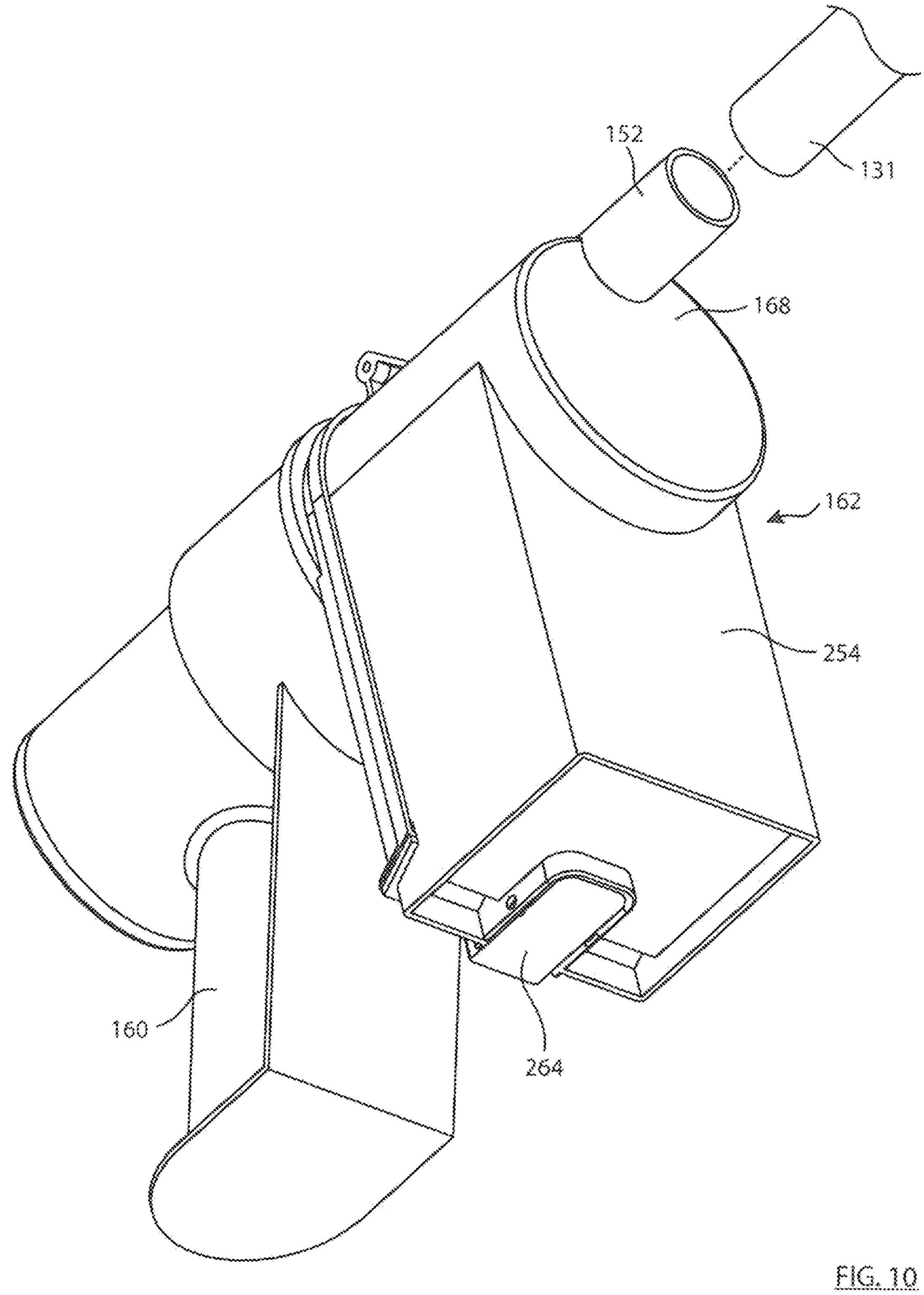
FIG. 10 is a bottom perspective view of the hand vacuum cleaner of FIG. 9.
Figure 11:
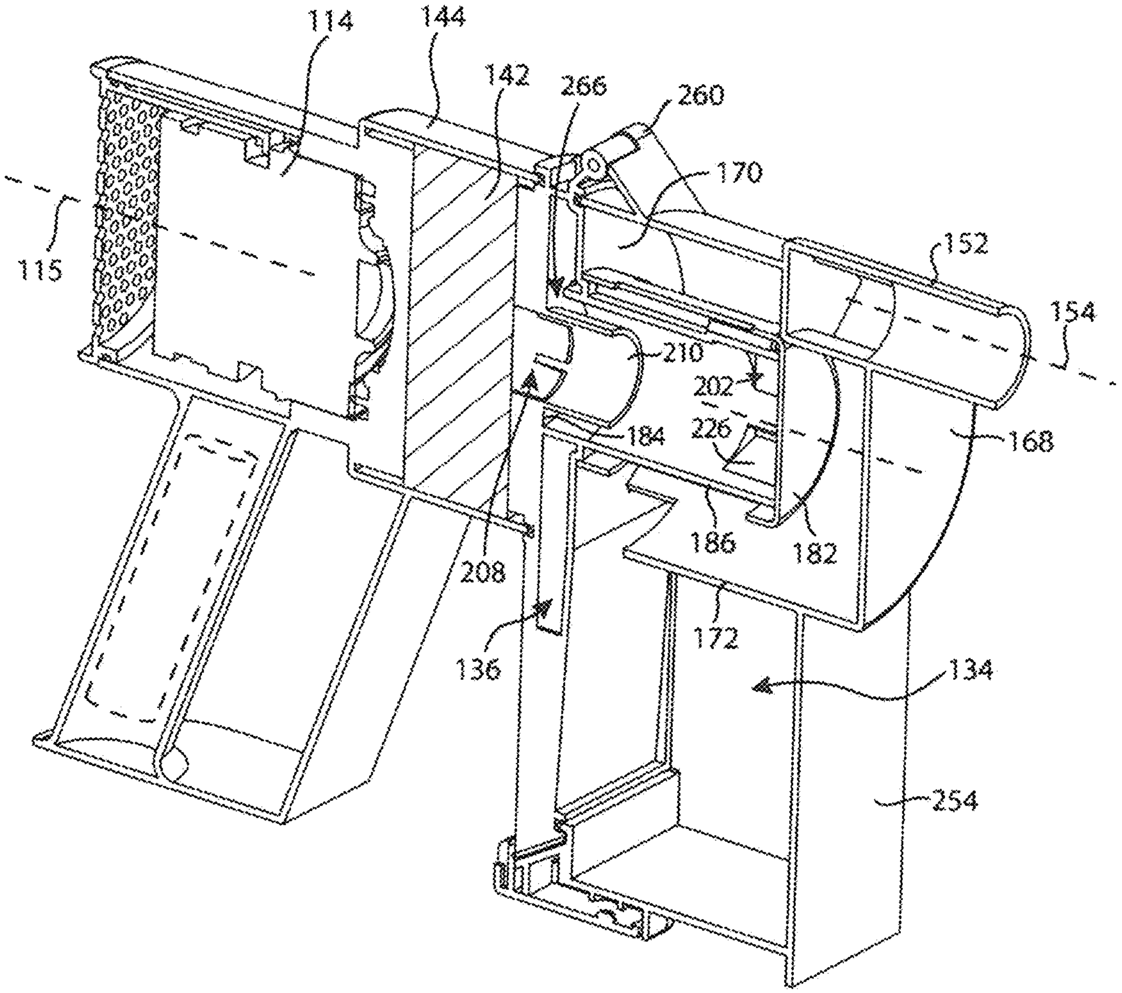
FIG. 11 is a cross-sectional perspective view of the hand vacuum cleaner of FIG. 9, taken along line 11-11

As exemplified in FIG. 4, the air inlet conduit 152 may be configured so that it has an inlet/upstream end 280 that is positioned forward of the forward most end wall of at least one of the first and second dirt collection chamber 134 and 136. This may help facilitate using the inlet send 280 as a nozzle to directly clean a surface, and/or attaching a wand (such as wand 131 shown in FIG. 10), hose or other accessory cleaning tool. In the embodiments illustrated, the inlet end 280 extends forwardly of the entire cyclone assembly 108, and is forward of the front end wall 168 of the first stage cyclone 130, the front end wall 254 of the first dirt collection chamber 136 and the front end wall 182 of the second stage cyclone 132.

Figure 12:
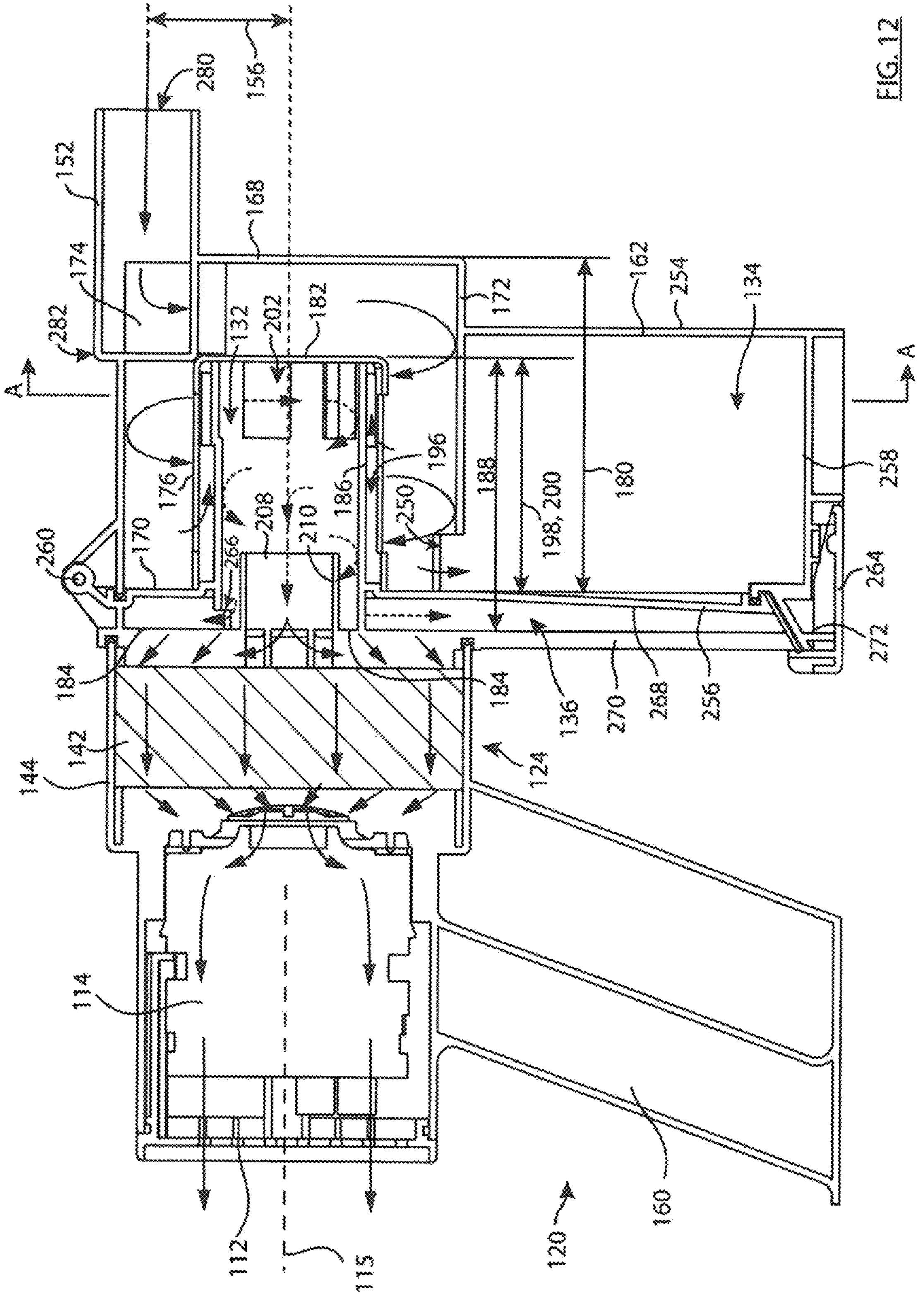
FIG. 12 is cross-sectional side view of the hand vacuum cleaner of FIG. 9, taken along line 11-11.

In the embodiments of FIGS. 4 and 12, a rear/outlet end 282 of the inlet conduit 152 is positioned rearward of the inlet end 280 and is rearward of the forward most end wall of at least one of the first and second dirt collection chamber 134 and 136. As shown in these embodiments, the inlet conduit 152 at least partially overlaps the first stage cyclone 130 in the axial direction, and the outlet end 282 is positioned rearward of the front end wall 168 of the first stage cyclone 130 and is in communication with the air inlet port 174.

Air may exit the first stage cyclone 130 by flowing radially inwardly through a screen 176 (FIGS. 2, 3 and 4) that forms part of, or defines, a first stage air outlet.

The second stage cyclone 132 may be positioned in any suitable location in the air flow path, downstream from the first stage cyclone 130. Preferably, the second stage cyclone 132 may be at least partially nested within the first stage cyclone 130 (i.e., at least partially surrounded by the first stage cyclone 130). Nesting the second stage cyclone 132 within the first stage cyclone 130 may help reduce the overall length of the cyclone assembly 108 and the hand vacuum 100. In some embodiments, the second stage cyclone 132 may be oriented generally parallel or parallel to the first stage cyclone 130, and may be at least partially nested along the length 180 of the first stage cyclone 130 and may be generally co-axial or co-axial to the first stage cyclone. Optionally, the second stage cyclone 132 may be at least 50%, at least 60%, at least 70%, at least 80%, at least 90% and/or fully nested (i.e. 100% nested) within the first stage cyclone 130. If the second stage cyclone 132 is fully nested within the first stage cyclone 130, the overall length of the first and second stage cyclones 130 and 132 in the axial direction may be equal to the first cyclone length 180. As exemplified in FIGS. 4 and 5, the second stage cyclone 132 is oriented parallel to the first stage cyclone 130 and is positioned entirely within the first stage cyclone 130 and is co-axial therewith.

The second stage cyclone may be of various configurations. As exemplified in FIGS. 4 and 5, the second stage cyclone includes a second cyclone chamber that is generally bounded by a front end wall 182 (FIG. 5), an opposing rear end wall 184 and a second cyclone sidewall 186 that extends axially along a second cyclone length 188 (FIG. 4) therebetween. The second cyclone length 188 may be any suitable length, and if the second stage cyclone 132 is to be nested within the first stage cyclone 130, then the second cyclone length 188 may be selected so that it is equal to or less than the first cyclone length 180. Optionally, the second cyclone length 188 may be between about 2 cm and about 15 cm (or more), and may be between about 4 cm and about 10 cm, and may be between about 5 cm and 7 cm.

The second stage cyclone 132 includes at least one air inlet port 202 through which air enters the second stage cyclone 132, and at least one air outlet through which air exits the second stage cyclone. Optionally, as discussed subsequently, the second stage cyclone 132 may include two or more air inlet ports that are spaced apart from each other around the perimeter of the second stage cyclone 132, preferably generally equally. The air inlet ports of the second stage cyclone 132 are in communication downstream from the air outlet of the first stage cyclone 130, and the air outlet of the second stage cyclone 132 is in communication with, and upstream from, the optional pre-motor filter housing 144. The air inlet ports and air outlet of the second stage cyclone 132 may be of any suitable configuration.

Optionally, the air inlet ports 202 and air outlet 208 of the second stage cyclone 132 may be provided toward the same end of the second stage cyclone 132 or at opposing ends of the second stage cyclone 132. As shown in FIG. 4, the air inlet ports 202 and air outlet 208 are both provided toward the rear end of the second stage cyclone 132, proximate the rear end wall 184. Alternatively, the air outlet 208 may be provided in the rear end wall 184 (which may help provide air flow communication with the pre-motor filter housing 144) and the air inlet ports 202 may be provided proximate the front end wall 182.

Optionally, the cyclone assembly 108 may be arranged so that the air inlet port 174 of the first stage cyclone 130 is provided at the same end of the cyclone assembly 108 as the air inlet ports 202 and/or air outlet 208 of the second stage cyclone 132. Alternatively, the air inlet port 174 may be at the opposite end from at least one of the air inlet ports 202 and/or air outlet 208. For example, in the embodiment of FIG. 4, the air inlet port 174 is provided proximate the rear end wall 170, and is at the same end of the cyclone assembly 108 as both the air inlet ports 202 and the air outlet 208. Alternatively, as illustrated in the embodiment of FIG. 12, the air inlet ports 202 are located toward the front end of the second stage cyclone 132, proximate the front end wall 182, and the air outlet 208 is located toward the rear end of the second stage cyclone 132, proximate the rear end wall 184. In this embodiment, the air inlet port 174 is provided toward the front end wall 168 of the first stage cyclone 130, and generally toward the front end of the apparatus 100. In other embodiments, the air inlet 174 may be provided toward the front of the first stage cyclone 130 and the air inlet ports 202 may be provided toward the rear end of the second stage cyclone 132, or vice versa.

Passage from a First Stage Cyclone to a Second Stage Cyclone

The following is a description of a cyclone assembly with the passage from a first stage cyclone to a second stage cyclone that may be used by itself in any surface cleaning apparatus or in any combination or sub-combination with any other feature or features described herein. For example, any cyclone assembly with the passage from a first stage cyclone to a second stage cyclone described herein may be used with any one or more of the multiple second stage cyclone air inlet ports, flow directing members, concurrently openable dirt collection chambers, an openeable end which includes the inlet conduit and radial sealing member features described herein.

In accordance with this feature, a screen is provided that extends along a substantial portion, and may extend along all or substantially all of the axial length of a cyclone, which may be a nested inner second stage cyclone.

Accordingly, a screen 176 surrounds a cyclone and is spaced therefrom to define an air flow passage between the screen and the cyclone. The screen may be positioned so as to define an annular region having a constant width in the radial direction around the perimeter of the cyclone. As exemplified in FIGS. 1-8, the screen 176 is generally cylindrical, is positioned spaced from the second stage cyclone, extends along the first cyclone axis 138 and may be supported on a plurality of spaced apart struts 178. The screen 176 may be any suitable mesh or screen material, and the openings in the screen may be sized to help inhibit or prevent hair, lint and other elongate material and larger particulate matter from exiting the first stage cyclone as air exits the first stage cyclone 130. The screen 176 may be formed from any suitable material, and preferably is formed from metal or plastic.

Optionally, the openings in the screen may be directional, such that the holes formed in the screen substrate are not strictly radially oriented, and instead are angled so as to at least slightly direct the air as it flows through the screen. For example, the holes in the screen may be oriented such that they tend to impart rotation to, or assist in maintaining the rotation of, the air flow and preferably are oriented so that the air passing through the screen is urged to rotate in a desired direction (such as, for example, the direction of rotation of air within the second stage cyclone 132). This may help facilitate air flow and may help reduce back pressure in the air flow path. It will be appreciated that the holes or openings in the screen may be oriented in the same direction as the air rotating within the first stage cyclone. Accordingly, the screen may be configured so as to not impair the rotation of the air as it passes through the screen or to impair to a lesser degree of interference with the rotation of air as it passes through the screen. An identical or similar screen may optionally be provided at the air outlet of the second stage cyclone 132, such that the cyclone assembly 108 includes two screens arranged in series.

As exemplified in FIGS. 2, 3 and 7, the second stage cyclone is positioned radially inwardly from the screen and, in some embodiments, the second cyclone sidewall 186 may be positioned inside and is at least partially laterally surrounded by the screen 176. In this configuration, a generally annular region is defined between an inner side 192 of the screen 176 and an outer side 214 (FIGS. 2 and 3) of the second cyclone sidewall 186. This region forms an air flow passage 196, extending generally in the axial direction of the second stage cyclone, which provides at least part, and preferably essentially all and most preferably all, of the air flow path way between the first stage cyclone 130 and the second stage cyclone 132. In this embodiment, the screen 176 and the second cyclone sidewall 186 form the inner and outer passage walls, respectively (and the outer passage wall is therefore at least partially porous).

Air may enter the passage 196 by flowing generally radially inwardly through the screen 176, and may therefore entre the passage 196 at multiple locations along its axial length 198 (FIG. 4). Once in the passage 196, the air may travel generally longitudinally (i.e. in a direction parallel to the cyclone axis 138) along the axial length of the screen 176 and along the outer surface of the second cyclone sidewall 186. Further, the air may be rotating in the passage as it travels axially to the second stage cyclone air inlet or inlets.

In the illustrated embodiment (see for example FIG. 4), the axial length 198 of the passage is at least partially defined by the axial length 200 of the screen 176. Preferably, the passage length 198 and the screen length 200 may each be at least 50% of the second cyclone length 188, and optionally may be at least 55%, at least 60%, at least 65%, at least 70%, at least 75%, at least 80%, at least 85%, at least 90%, at least 95% and in some embodiments may be about 100% of the second cyclone length 188. Extending the length 200 of the screen 176, and thereby also extending the length 198 of the passage 196, may help facilitate air flow through the cyclone assembly 108, and may help reduce the backpressure in the air flow path.

In some embodiments, the passage extends to the inlet end of the second stage cyclone. Accordingly, air may travel directly from the passage 196 into the second stage air inlet or inlets and described subsequently herein.

Optionally, the screen 176 may be configured such that the flow area of the screen 176, i.e. the cross-sectional area of the openings of the screen measured in the direction that is orthogonal to the direction that air flows through the screen, may be generally equal to or greater than flow area of the air inlet port 174 of the first stage cyclone 130 and/or the flow area of the inlet conduit 152 and/or the flow area of the second stage inlet port or ports 202. Alternatively, the flow area of the screen 176 may be less than the flow area of the inlet port 174 and/or the inlet conduit 152 and/or the second stage inlet port or ports 202. The flow area of the screen may be ±15%, ±10% or ±5% the flow area of the inlet port 174 and/or the inlet conduit 152 and/or the second stage inlet port or ports 202. Increasing the length 198 of the screen 176 may help increase the flow area of the screen 176 (all dimensions being the same), without increasing the radial width of the annular passage 196. Accordingly, the overall radial width of a cyclone assembly may be reduced without increasing backpressure through the cyclone assembly by increasing the length of the screen.

Alternately, or in addition, the flow area of the passage 196 may be selected so that it is generally equal to or greater than flow area of the air inlet port 174 of the first stage cyclone 130 and/or the flow area of the inlet conduit 152 and/or the flow area of the second stage inlet port or ports 202. Alternatively, the flow area of the passage 196 may be less than the flow area of the inlet port 174 and/or the inlet conduit 152 and/or the second stage inlet port or ports 202. The flow area of the passage 196 may be ±15%, ±10% or ±5% of the flow area of the inlet port 174 and/or the inlet conduit 152 and/or the second stage inlet port or ports 202. Selecting a radial width of the screen 176 to provide a flow area proximate that of the inlet port 174 and/or the inlet conduit 152 and/or the second stage inlet port or ports 202 may help reduce back pressure and/or help facilitate air flow and/or reduce the likelihood of blockages developing along the air flow path.

Figure 23:
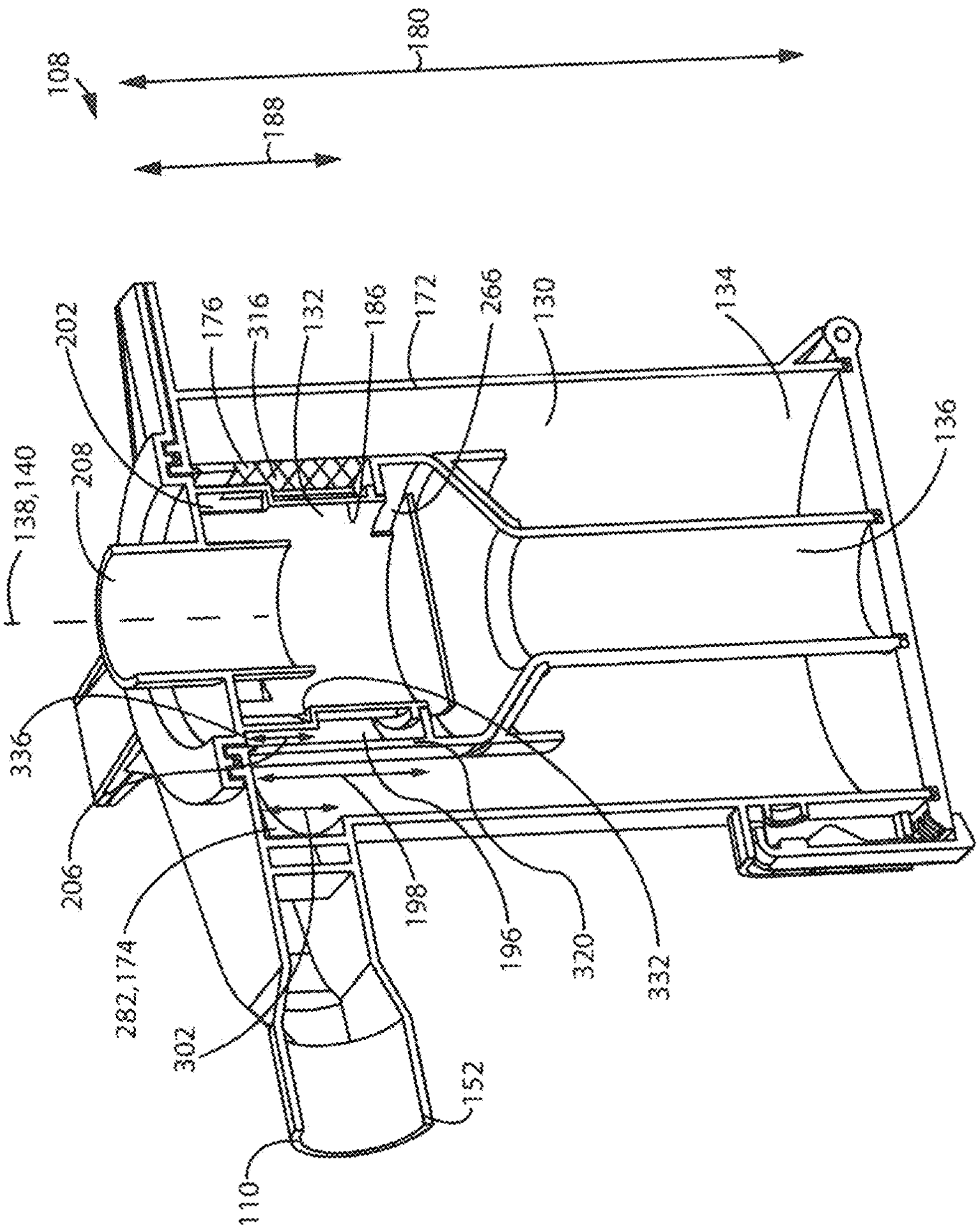
FIG. 23 is a cross-sectional view of an air treatment member in accordance with another embodiment.
Figure 24:
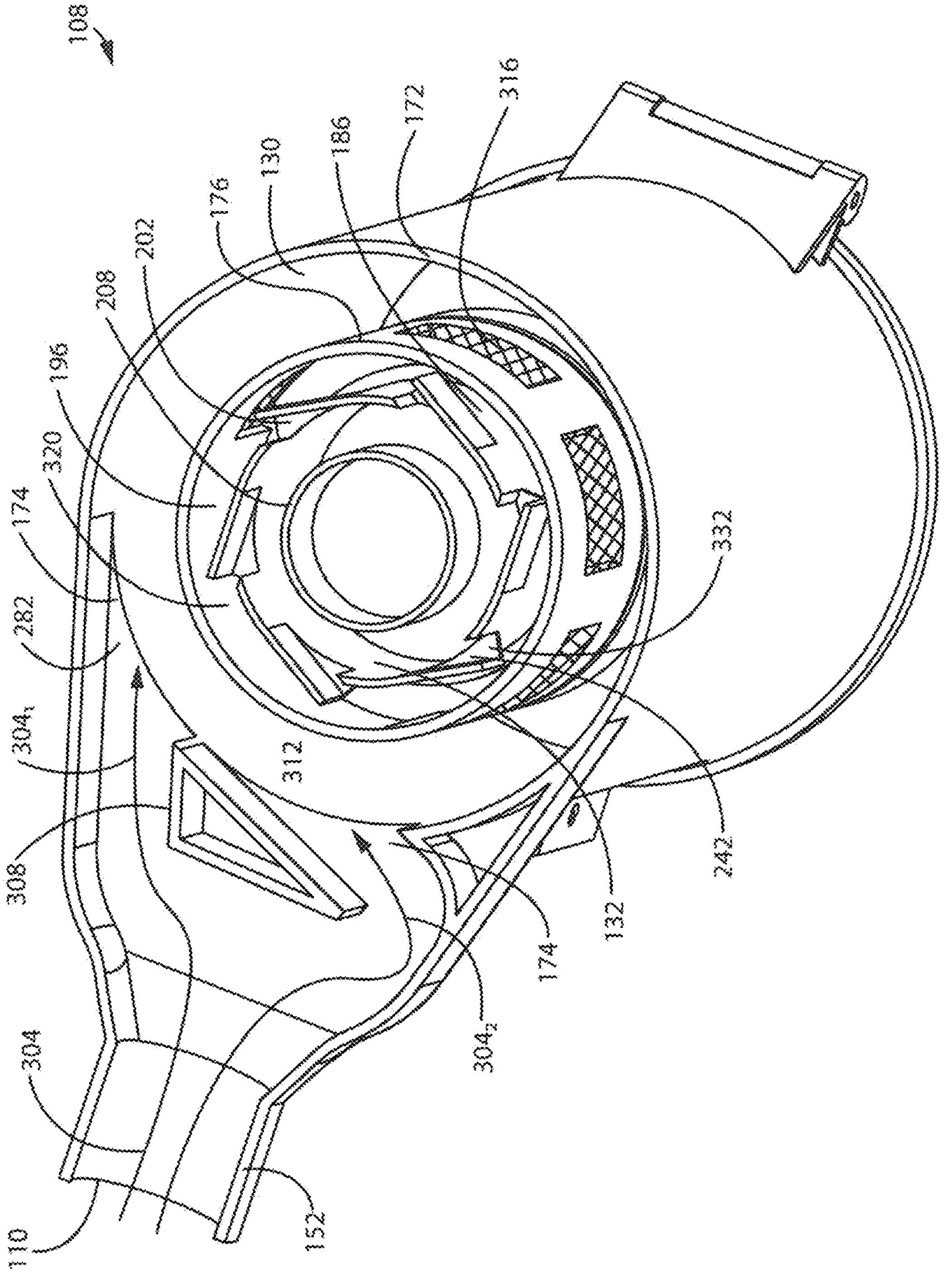
FIG. 24 is a perspective cross-sectional view of the air treatment member of FIG. 23.
Figure 25:
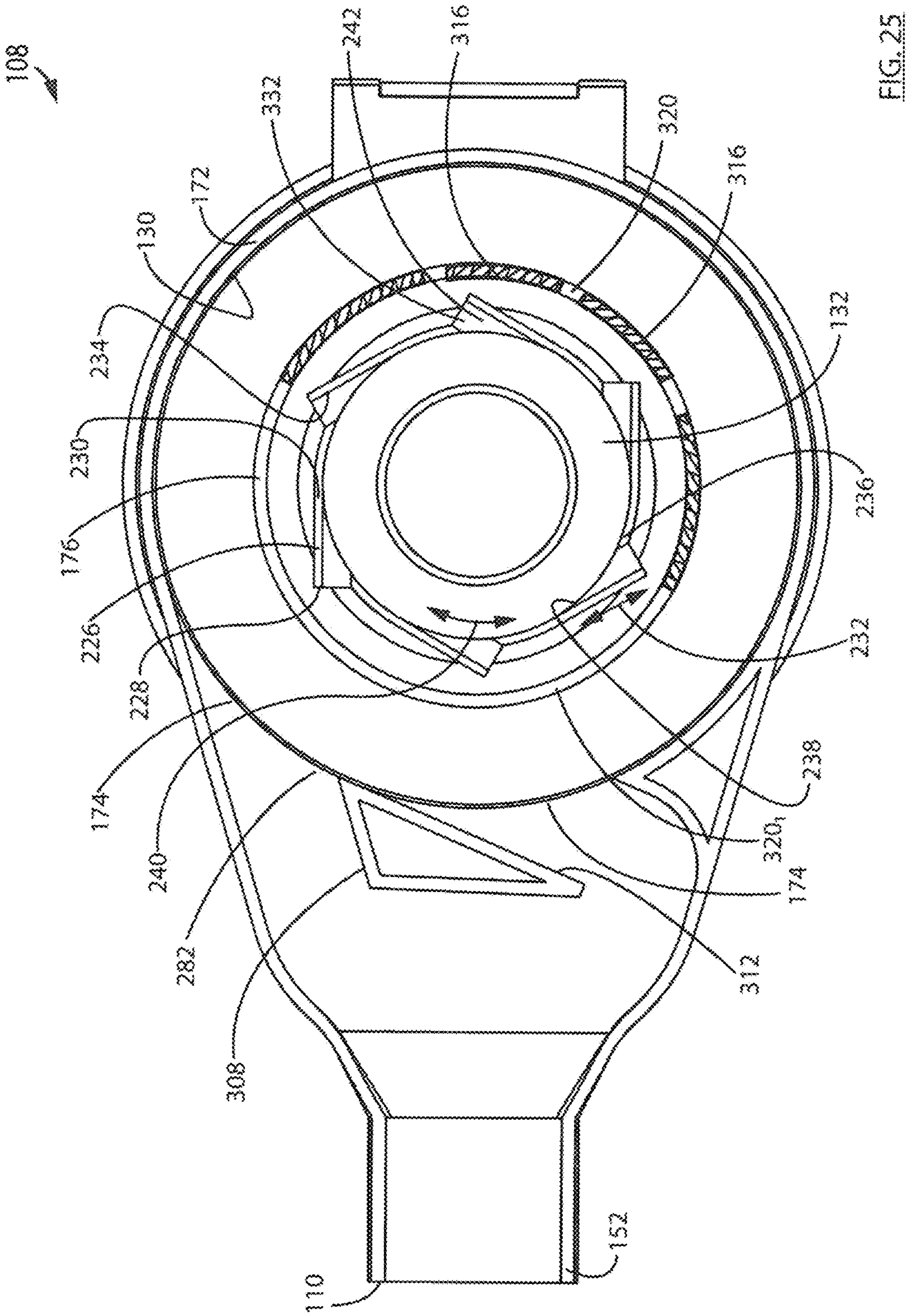
FIG. 25 is a top plan cross-sectional view of the air treatment member of FIG. 23.

Referring to FIGS. 23-25, first stage cyclone 130 may include two or more air inlet ports 174. This may better distribute the air entering the first stage cyclone 130. Further, the plurality of air inlet ports 174 may provide, in combination, a greater overall cross-sectional flow area, which may mitigate backpressure and thereby contribute to greater overall flow efficiency for air treatment member 108. Alternatively, or in addition, the plurality of air inlet ports 174 may provide the same or greater overall cross-sectional flow area with a shorter air inlet port height 302. This may provide the cyclonic air flow path through the first stage cyclone 130 with a greater number of rotations for the same cyclone length 180, or the same number of rotations for a shorter cyclone length 180. In the former case, the separation efficiency of the first stage cyclone 130 may be improved, and in the latter case, the same separation efficiency may be provided in a more compact first stage cyclone 130.

In the illustrated example, each first stage air inlet port 174 is located at a downstream end 282 of air inlet conduit 152. As shown, the air flow path 304 through air inlet conduit 152 may diverge into a plurality of discrete air flow paths 304, each air flow path 304 terminating in a different one of air inlet ports 174. In the illustrated example, air flow path 3041 directs a portion of the air entering air inlet conduit 152 to air inlet port 1741, and air flow path 3042 directs a portion of air entering air inlet conduit 152 to air inlet port 1742. In other embodiments, there may be a greater number of air inlet ports 174 and a corresponding number of air flow paths 304. For example, air inlet conduit 152 may define three discrete air flow paths 304 each of which guide a different portion of the air flow to a different one of three discrete air inlet ports 174.

First stage air inlet ports 174 may be located anywhere on first stage cyclone sidewall 172. In the illustrated example, air inlet ports 174 are located at the same axial elevation. This may provide the air inlet ports 174 with a compact configuration having a short collective axial length 302. In alternative embodiments, an air inlet port 174 may be located at a different axial elevation, such as for example axially above or below another of the air inlet ports 174. In the example shown, air inlet ports 174 are located adjacent to each other about a perimeter of first stage cyclone sidewall 172. Each air inlet port 174 may be oriented to direct air to enter first stage cyclone 130 in a tangential direction. As exemplified, first air inlet port 1741 may be separated from second air inlet port 1742 by a partition 308. Partition 308 may have flow contacting surfaces 312 that guide air entering one or both of air inlet ports 174 in a tangential direction relative to first stage cyclone 130. In alternative embodiments, air inlet ports 174 may be spaced apart around the perimeter of first stage cyclone sidewall 172. For example, air inlet ports 174 may be spaced apart by at least ⅛, at least ¼, or at least ½ of the perimeter of first stage cyclone sidewall 172. This may help mitigate turbulence that may be created by interactions between the air flows entering the different air inlet ports 174.

Still referring to FIGS. 23-25, air may exit first stage cyclone 130 through an air permeable member such as screen 176. Screen 176 may include air permeable portions 316 and air impermeable portions 320. Air permeable portion 316 may include for example suitable mesh or screen material, and the openings in the screen may be sized to help inhibit or prevent hair, lint and other elongate material and larger particulate matter from exiting the first stage cyclone 130 as air exits the first stage cyclone 130. Air impermeable portions 320 may include for example lengths of solid wall, through which air cannot pass. As shown, screen 176 may include one or more air impermeable portions $\mathbf{320_1}$ sized and positioned to face air inlet ports 174. Air impermeable portion $\mathbf{320_1}$ may mitigate air entering through air inlet port 174 from immediately exiting through screen 176, thereby bypassing the cyclonic air flow path within first stage cyclone 130 which is responsible for separating fine particles from the air flow.

Air impermeable portion $\mathbf{320_1}$ may have any size and shape suitable to mitigate air flow bypass from air inlet ports 174 through screen 176. For example, air impermeable portion $\mathbf{320_1}$ may include at least all portions of screen 176 that faces air inlet ports 174. In the illustrated example, air impermeable portion $\mathbf{320_1}$ extends at least ¼ around a perimeter of screen 176. Across this at least ¼ of the perimeter of screen 176 there may be no air permeable portions 316. Alternatively, at a location along the perimeter of screen 176 where air impermeable portion 320 faces an air inlet port 174, screen 176 may also include an air permeable portion 316 at an axial location below the air impermeable portion 320 and the air inlet port 174.

Cyclone Assembly with Multiple Second Stage Cyclone Air Inlet Ports

The following is a description of multiple second stage cyclone air inlet ports that may be used by itself in any surface cleaning apparatus or in any combination or sub-combination with any other feature or features described herein. For example, any multiple second stage cyclone air inlet ports described herein may be used with any one or more of the cyclone assembly with the passage from a first stage cyclone to a second stage cyclone, flow directing members, concurrently openable dirt collection chambers, an openeable end which includes the inlet conduit and radial sealing member features described herein.

In accordance with this feature, a cyclone assembly may utilize a second stage cyclone having multiple air inlets. The second stage cyclone is at least partially nested in the first stage cyclone and the first stage cyclone may be of various constructions known in the art. The air flow channel from the first stage cyclone to the second stage cyclone air inlets may consist of, or comprise, an interior space between a screen surrounding the second stage cyclone and the second stage cyclone.

As exemplified in FIGS. 4-8, annular passage 196 terminates at the end of the second stage cyclone which contains the second stage air inlet ports 202. The air accordingly travels through passage 196 and then directly enters the air inlet ports 202. Accordingly the terminal end of passage 196 at the location of air inlet ports 202 essentially may function as a header 400 (see FIG. 45) to provide a generally equal flow of air into each of the air inlet ports 202.

As exemplified in FIGS. 2 and 7, the air inlet of the second stage cyclone 132 includes five air inlet ports 202 that are formed as openings in the second cyclone sidewall 186 and are spaced apart, preferably equally spaced apart, from each other around the perimeter of second cyclone sidewall 186. The air inlet ports 202 are in communication with the passage 196. Positioning the air inlet ports 202 in this location may help facilitate air flow from the passage 196 directly to the second stage cyclone 132 without flowing through a separate, intermediary inlet conduit and/or without being subjected to significant bends or other such changes in the air flow path direction. Such a configuration may help reduce back pressure in the air flow path. It will be appreciated that if air is rotating in passage 196 in the direction of travel through air inlet ports 202, then the passage of air into the second stage cyclone may occur with less energy input required.

Each air inlet port 202 has a width 240 that is measured in the air flow direction (counter-clockwise and circumferentially around the second sidewall 186 as illustrated in FIG. 7) between respective upstream and downstream edges 236 and 238. The width 240 may be any suitable distance, and may be sized so that the cumulative widths of the air inlet ports 202 (i.e. the sum of widths 240) is between about 30% and about 80% (or more) of the perimeter distance of the second cyclone sidewall 186, and optionally may between about 40% and about 70% and/or between about 50% and about 60% in some embodiments.

The inlet ports 202 also have respective heights 206 (FIGS. 4 and 5) in the axial direction. The heights 206 may be between about 5% and about 40% of the second cyclone length 188, and optionally may be between about 10% and about 35% and/or between about 20% and about 30% of the cyclone length 188.

The combination of the widths 240 and heights 206 may be selected so that the total flow area of the air inlet ports 202 (in the direction orthogonal to the direction air flows through the inlet ports 202) may be generally equal to or greater than flow area of the air inlet port(s) 174 of the first stage cyclone 130 and optionally may be equal to or greater than the flow area of the inlet conduit 152 and/or the screen 176, and/or the passage 196 and/or air outlet 208 (described further herein). Alternatively, the total flow area of the inlet ports 202 may be less than the flow air inlet port(s) 174, the inlet conduit 152 and/or the screen 176, and/or the passage 196 and/or air outlet 208, but may be may be ±15%, ±10% or ±5% of one or more of these flow areas.

Having entered the second stage cyclone 132 via the air inlet ports 202, air may circulate within the second stage cyclone 132 and may exit the second stage cyclone via the second air outlet and continue through the air flow path. The second air outlet may be of any suitable configuration and may be provided in any suitable location. In the illustrated embodiment (see FIG. 4 for example), a second cyclone air outlet 208 is provided in the rear end wall 184 of the second stage cyclone 132, and includes an axially extending outlet conduit 210 (also referred to as a vortex finder). The flow area of the outlet conduit 210 may be generally equal to or greater than flow area of the air inlet port(s) 174 of the first stage cyclone 130 and optionally may be equal to or greater than the flow area of the inlet conduit 152, passage 196 and/or air inlet ports 202. Alternatively, the total flow area of the inlet ports 202 may be less than the flow area of the inlet port 174, inlet conduit 152, passage 196 and/or air inlet ports 202, and may be may be ±15%, ±10% or ±5% of one or more of these flow areas.

Figure 26:
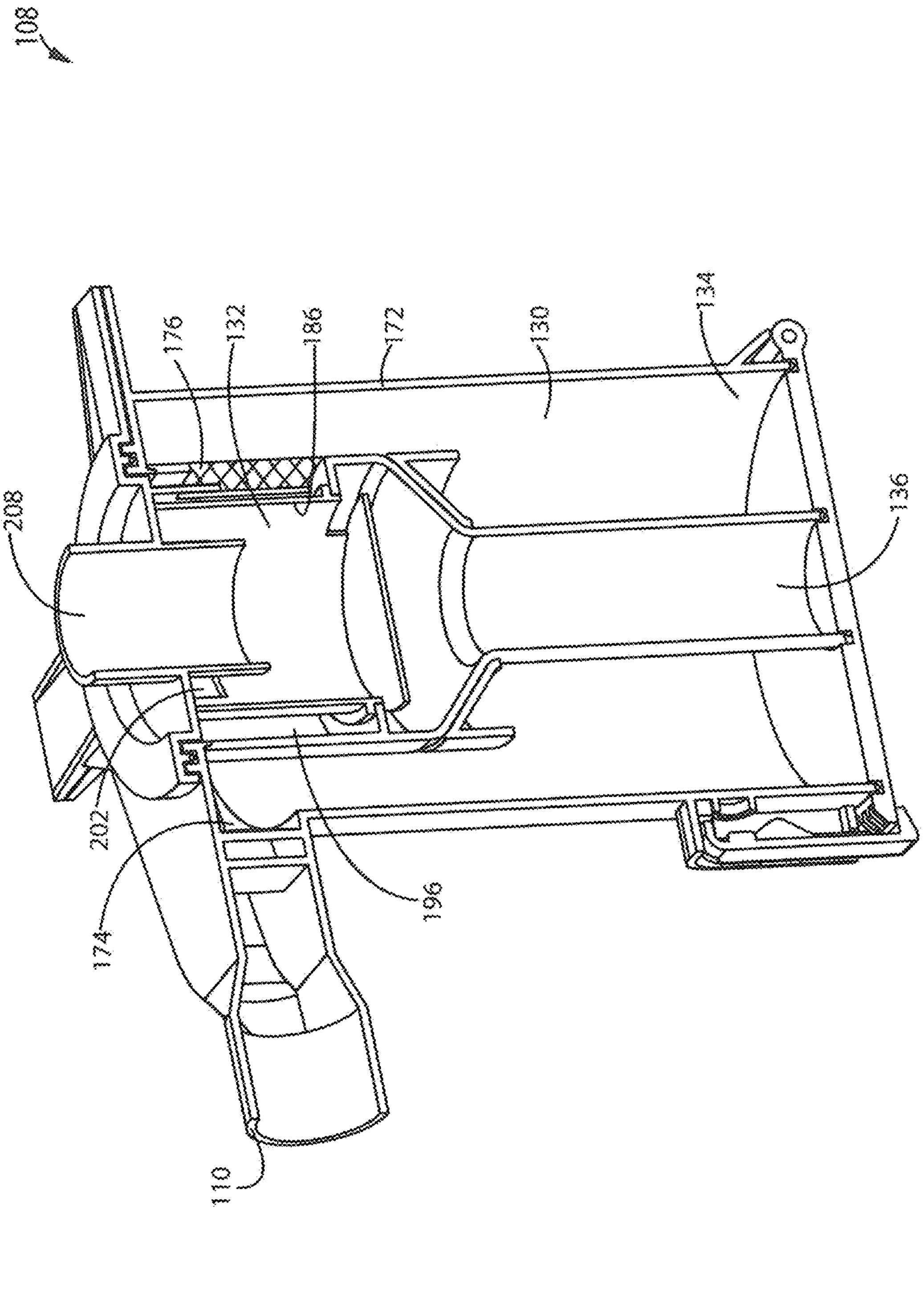
FIG. 26 is a cross-sectional view of an air treatment member in accordance with another embodiment.
Figure 27:
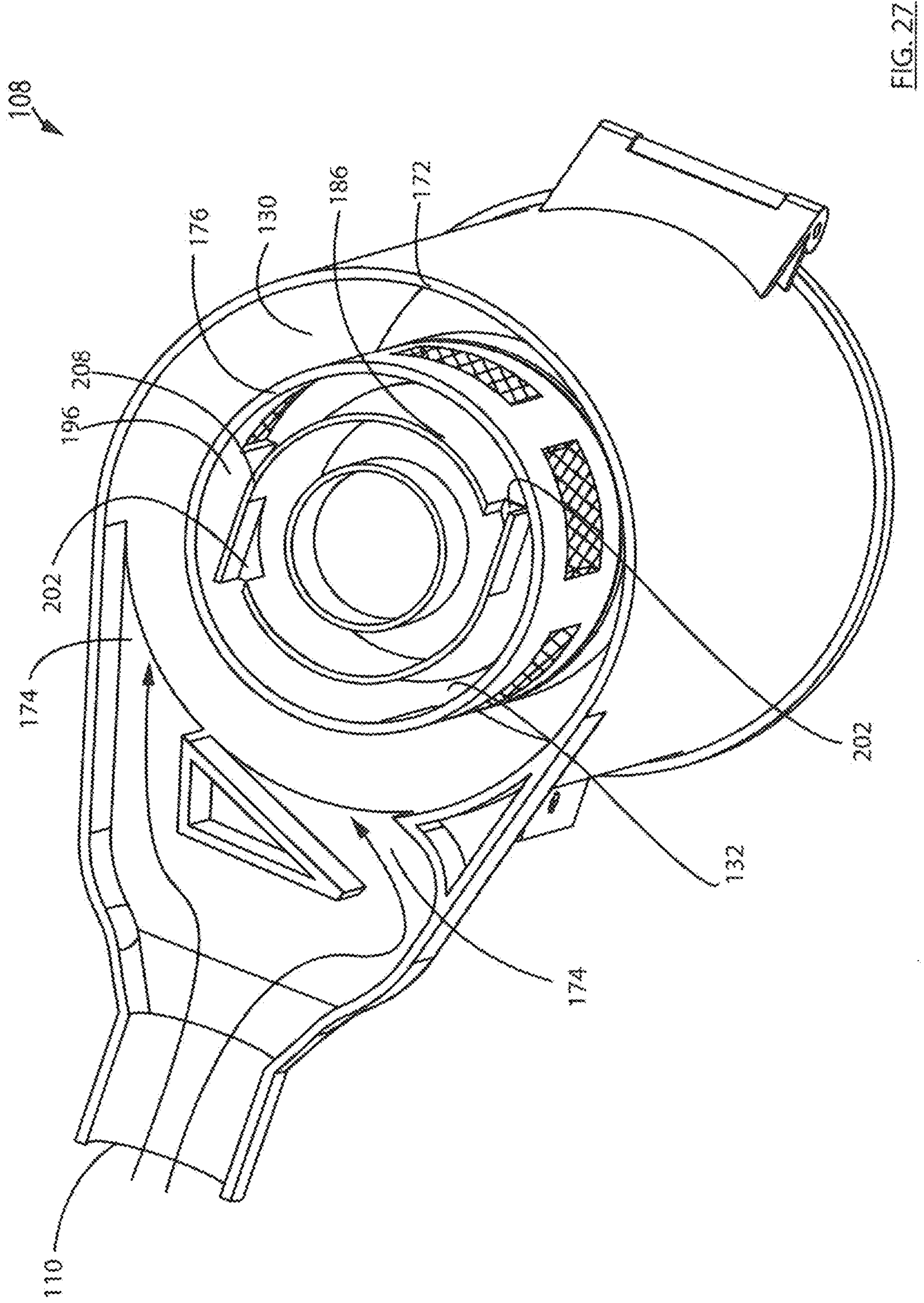
FIG. 27 is a perspective cross-sectional view of the air treatment member of FIG. 26.
Figure 28:
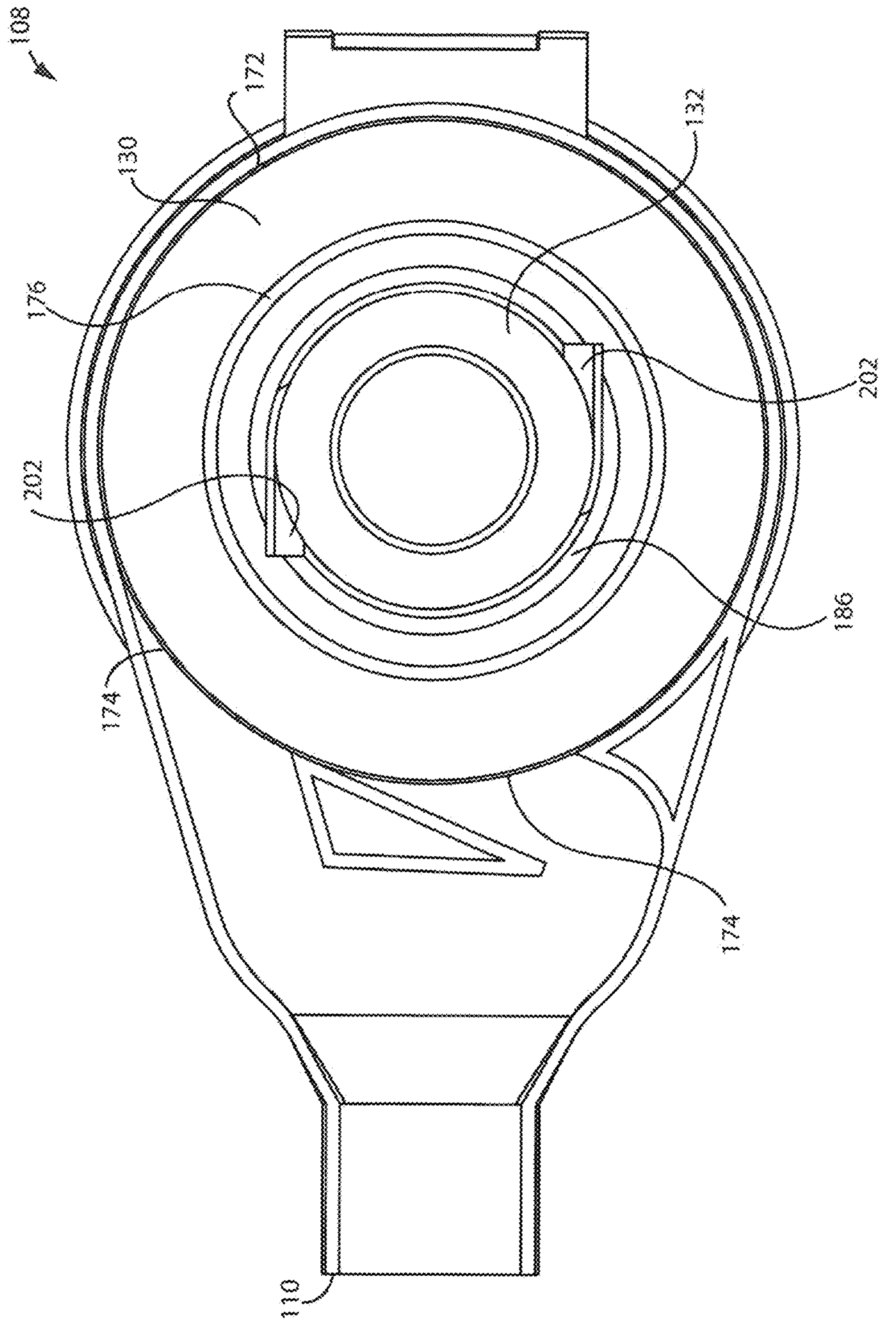
FIG. 28 is a top plan cross-sectional view of the air treatment member of FIG. 26.

While illustrated with five air inlet ports 202, in accordance with this feature, the second stage cyclone may be configured with as few as two air inlet ports 202 as illustrated by example in FIGS. 26-28. Preferably the second stage cyclone may include between two and twelve inlet portions, and more preferably may include between four and eight inlet ports, and in some embodiments may include up to 24 or more inlet ports.

Figure 29:
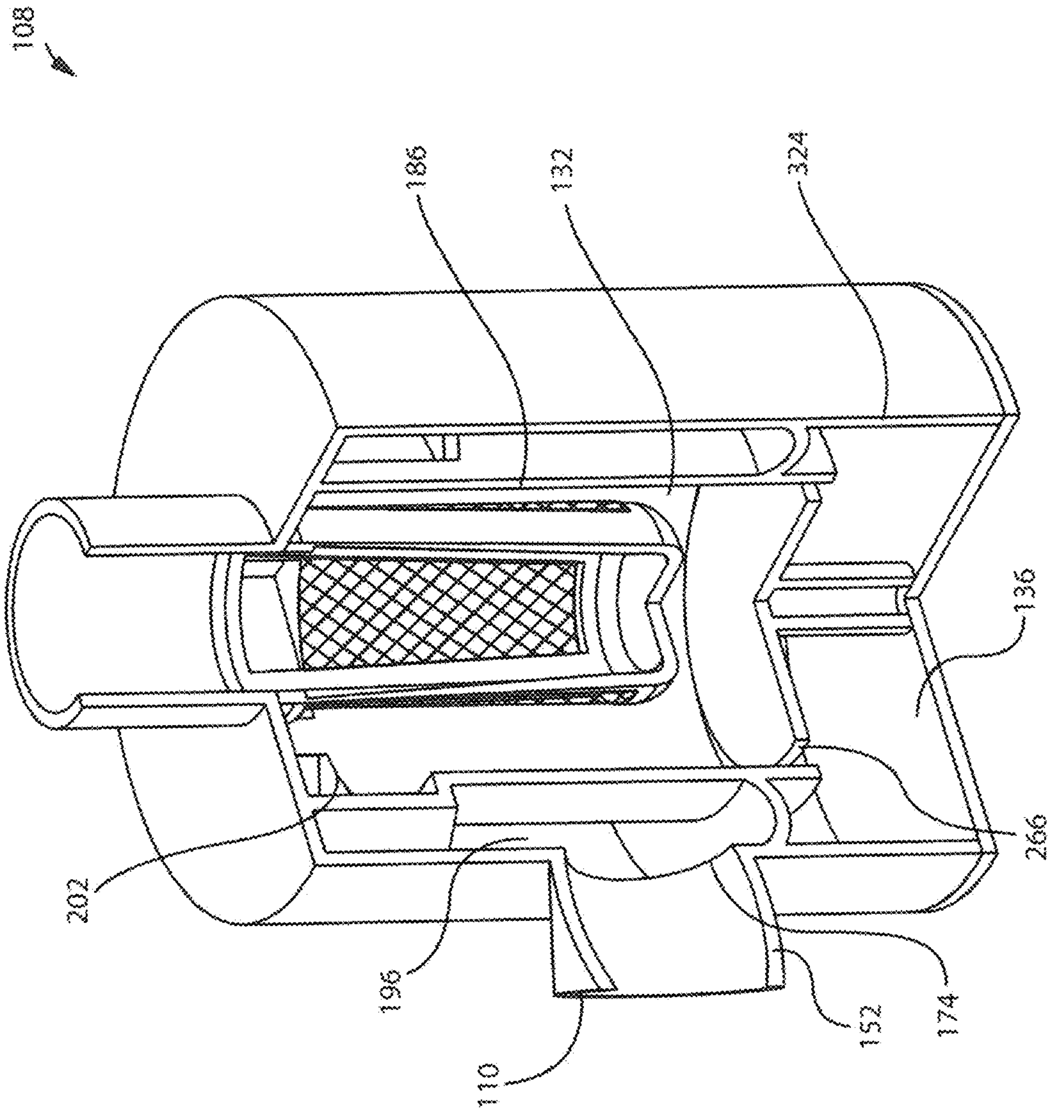
FIG. 29 is a cut-away view of an air treatment member in accordance with another embodiment.
Figure 30:
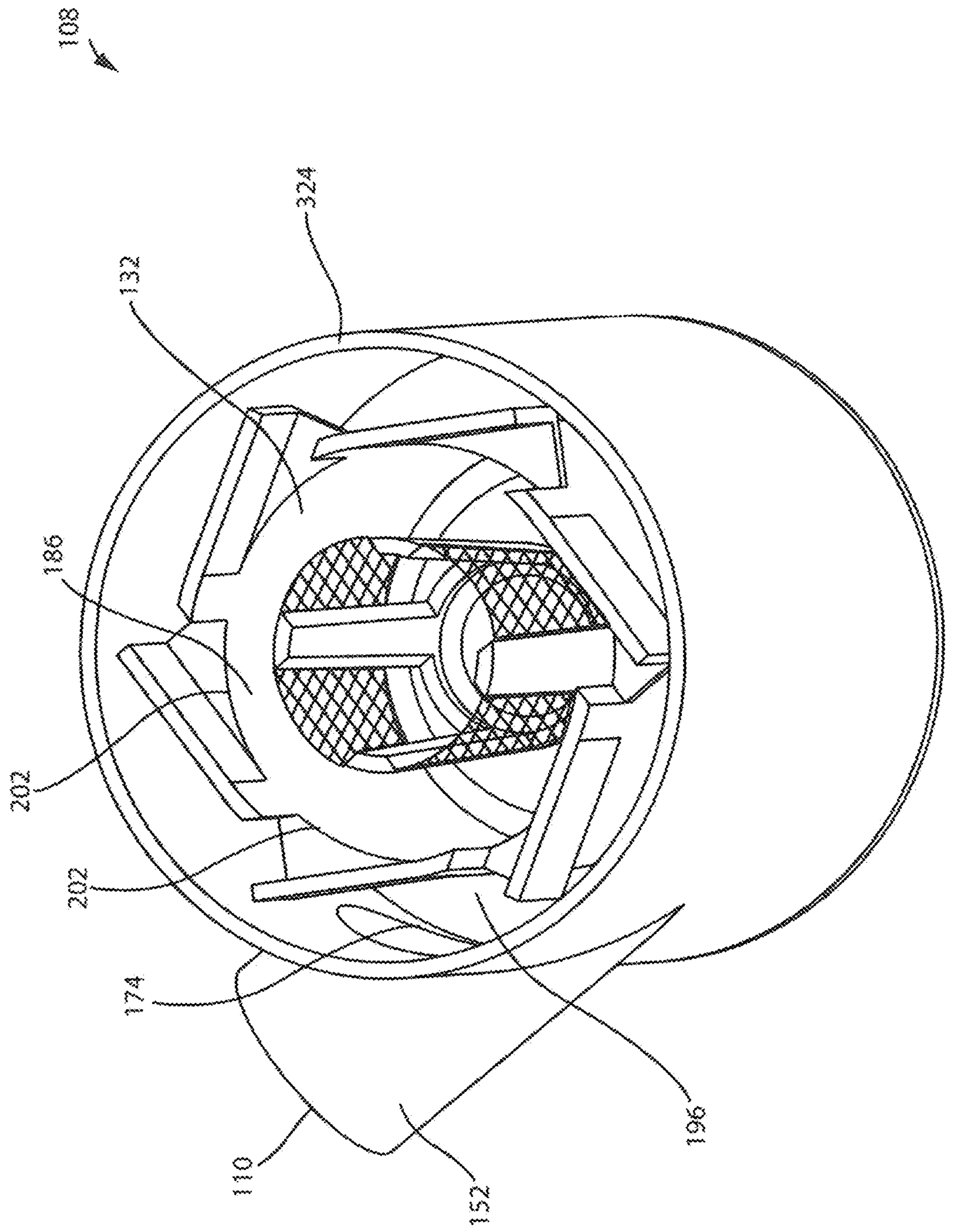
FIG. 30 is a perspective cross-sectional view of the air treatment member of FIG. 29.
Figure 31:
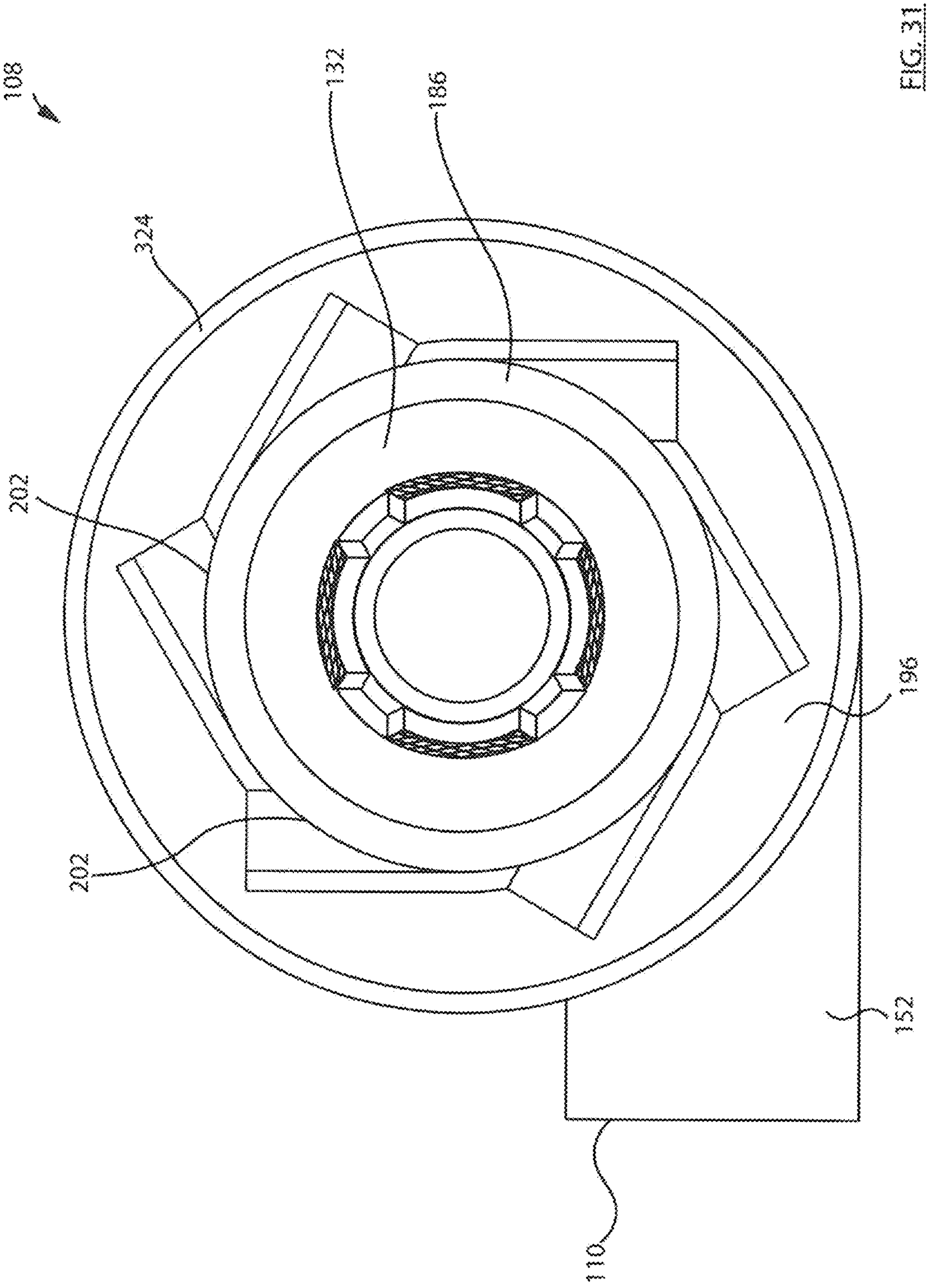
FIG. 31 is a top plan cross-sectional view of the air treatment member of FIG. 29.

It will be appreciated that a cyclone having multiple air inlets in accordance with this aspect need not be a second cyclonic stage. For example FIGS. 29-31 exemplify an air treatment member 108 having a single cyclonic cleaning stage. As shown, air flow passage 196 may be positioned in the air flow path between air inlet conduit 152 and cyclone 132. For example, air flow passage 196 may be defined between an exterior wall 324 of air treatment member 108, and cyclone chamber sidewall 186. As shown, air flow passage 196 may extend a extend all the way around cyclone 132 so as to have an annular cross-section that surrounds cyclone 132. It will be appreciated that the air flow passage may extend only part way around cyclone 132. As compared with a cyclonic cleaning stage, air flow passage 196 is not bordered by an air permeable screen since it does not define the outlet from an upstream cyclone, and has no dirt outlet to a dirt collection chamber. In the illustrated example, air treatment member 108 has only one dirt collection chamber 136. Dirt separated from the air flow within cyclone 132 exits cyclone 132 through dirt outlet 266 into dirt collection chamber 136 where the dirt collects until the dirt collection chamber 136 is emptied.

Passage 196 extends from air inlet port 174 to the end of cyclone 132 which contains air inlet ports 202. The air accordingly travels through passage 196 and then directly enters the air inlet ports 202. Accordingly, as discussed with respect to other embodiments, the terminal end of passage 196 at the location of air inlet ports 202 essentially may function as a header to provide a generally equal flow of air into each of the air inlet ports 202.

In the illustrated embodiment, air inlet port 174 into passage 196 may be axially spaced from air inlet ports 202 into cyclone 132. For example, air inlet port 174 may be positioned above or below air inlet ports 202. This may permit the air entering passage 196 from air inlet port 174 to distribute around cyclone 132 before entering air inlet ports 202. This may help prevent the air inlet ports 202 positioned closest to air inlet port 174 from admitting substantially more air than the other air inlet ports 202, which may occur if air inlet port 174 was located at the same axial elevation as air inlet ports 202. In the illustrated example, air inlet port 174 is spaced axially below air inlet ports 202.

Reference is now made to FIGS. 32-34, which show an air treatment member 108 having two cyclones 132*a* and 132*b* in series, each of which has a plurality of air inlet ports 174. Similar to the embodiment of FIGS. 29-31 described above, an air flow passage 196*a* is located upstream of the upstream cyclone 132*a*, and defined between cyclone sidewall 186*a* and an exterior wall 324 of air treatment member 108. After flowing cyclonically within upstream cyclone 132*a*, the air flow may exit upstream cyclone 132*a* through screen 176 into a downstream air flow passage 196*b*.

Downstream air flow passage 196*b* may be the same as previous embodiments that have been discussed and may have an annular cross-sectional shape that surrounds downstream cyclone 132*b*. As shown, downstream air flow passage 196*b* may be defined between screen 176 and downstream cyclone sidewall 186. Passage 196*b* extends to the end of downstream cyclone 132*b* which contains air inlet ports 202*b*. The air accordingly travels through passage 196*b* and then directly enters the air inlet ports 202*b*. Accordingly the terminal end of passage 196*b* at the location of air inlet ports 202*b* essentially may function as a header to provide a generally equal flow of air into each of the air inlet ports 202*b*.

In some embodiments, screen 176 may include air permeable portion(s) 316 and air impermeable portion(s) 320. The air permeable portion(s) 316 provide an air inlet from upstream cyclone 132*a* to downstream air flow passage 196*b*. As exemplified, screen 176 may have air permeable portions 316 that are all located axially spaced below and angularly spaced around the cyclone 132*b* from air inlet ports 202*b*. This may help prevent air entering air flow passage 196*b* through screen 176 from travelling axially through passage 196*b* and then exiting through air inlet ports 202*b* without first distributing around annular air flow passage 196*b*. Alternatively, air permeable portion(s) 316 may be axially aligned with air inlet ports 202*b*. In this case, a substantially even distribution of air into air flow passage 196*b* may be provided by extending or distributing air permeable portion(s) 316 around substantially the entire periphery of screen 176.

Still referring to FIGS. 32-34, air treatment member 108 may include any dirt collection chamber(s) such as a dirt collection chamber 136*a* that receives and collects dirt separated by upstream cyclone 132*a*, and a dirt collection chamber 136*b* that receives and collects dirt separated by downstream cyclone 136*b*.

In some embodiments, air is introduced into the cyclone chamber so as not to face the outlet end of another air inlet. In accordance with such embodiments, a projection of an inlet port may intersect an opposed wall portion of a cyclone chamber (the portion of the opposed wall which the projection intersects defines an opposed wall section), and the opposed wall section may continue in the direction of rotation of air in the cyclone chamber from a downstream edge of the opposed wall section to a second inlet port. A continuation of an opposed wall portion between the downstream edge of the opposed wall section and the second inlet port may serve to direct air entering through the first inlet port and to improve efficiency. For example, referring to FIG. 7, a projection 344 of a first inlet port 340 of inlet ports 202 may intersect an opposed wall portion 348 of the cyclone chamber to define an opposed wall section 352. The opposed wall section has a downstream edge 356, and the opposed wall portion 348 continues in the direction of rotation from the downstream edge of the opposed wall section 352 to a second inlet port 360.

Accordingly, at the location at which air enters the cyclone chamber through a first tangential air inlet, the air will not face an outlet end of another tangential air inlet. An advantage of this design is that if, at the location at which air enters the cyclone chamber through a first tangential air inlet, the air faces an outlet end of a second tangential air inlet, then some of the air entering through the first tangential air inlet may have a tendency to exit the cyclone chamber through the second tangential air inlet.

A further advantage of this design is that the continuation of opposed wall portion 348 from downstream edge 356 of opposed wall section 352 to second inlet port 346 may assist in creating a cyclonic flow in the cyclone chamber and thereby reduce interference between air that has entered the first inlet port 340 and air that is entering the second inlet port 360.

In accordance with such embodiments, projection 344 extends generally parallel to a direction of air at the location of first inlet port 340. For example, projection 344 may be a projection parallel to a flow directing member that is directing air flow, such as a flow directing member that is defining or adjacent first inlet port 340 (directing surface 234 of vane 226 as exemplified). For example, a flow directing member at a downstream edge 238 of first inlet port 340 may be shaped and positioned to direct a flow of air through and/or adjacent port 340.

In the embodiment illustrated in FIG. 7, projection 344 is a projection of first inlet port 340 in a direction parallel to a generally linear vane 226 provided at the downstream edge 238 of the first inlet port 340. FIG. 7 illustrates the projection 344 of first inlet port 340 in a direction parallel to a directing surface 234 of the vane 226 that is provided at the downstream edge 238 of the first inlet port 340.

In the example of FIG. 7, vane 226 extends from downstream edge 238 into a header portion of passage 196 to direct air flow towards port 340, and vane 226 cooperates with a portion of cyclone sidewall 186 to direct airflow to form a rotating flow. However, other positions or shapes of a flow directing member may also be possible. For example, as exemplified in FIG. 37 wall portions between inlet ports 202 of the example embodiment of FIG. 37 are generally linear along their entire length unlike the example of FIG. 7, and projection 344 extends between first inlet port 340 and opposed wall section 352 without intersecting any other wall portions.

Second inlet port 360 may be located a separation width 364 from the downstream edge 356 of opposed wall section 352. Separation width 364 may be large enough to reduce interference between an air flow thought first inlet port 340 and an air flow through second inlet port 360. Separation width 364 may be small enough to allow a compact construction. Separation width 364 may be at least 0.05 times the width 240 of first inlet port 340, such as between 0.05 and 2, or 0.25 and 1, times the width 240.

Flow Directing Members

The following is a description of flow directing members that may be used by itself in any surface cleaning apparatus or in any combination or sub-combination with any other feature or features described herein. For example, any flow directing member described herein may be used with any one or more of the cyclone assembly with the passage from a first stage cyclone to a second stage cyclone, the multiple second stage cyclone air inlet ports, concurrently openable dirt collection chambers, an openeable end which includes the inlet conduit and radial sealing member features described herein.

In accordance with this feature, an air or flow directing member is provided which extends into an air flow passage conveying air to a cyclone inlet end. The flow directing member extends in the direction of flow and may be generally linear or linear. Optionally, a cyclone air inlet passage may have spaced apart generally linear or linear walls. The flow directing members may comprise the air inlets 174 and 202 to the first and/or second stage cyclones 130 and 132.

The flow directing members are configured to help direct the air as it enters the air inlet ports 174 and 202, and preferably are configured to help induce a desired rotational air flow within the respective cyclones 130 and 132. The flow directing member extends between opposing upstream and downstream ends (as determined by the direction that air flows across/past the directing member), and has a directing surface that generally faces and is exposed to the air flow. The directing surface may help direct the air flow into the air inlet ports of the respective cyclone stages.

Optionally, in embodiments where the apparatus 100 includes a first stage cyclone 130 and a second stage cyclone 132, at least a portion of the flow directing members may be provided in the air flow passage that extends between the cyclone stages 130 and 132 (such as passage 196 for example). In such embodiments, at least the upstream end of the directing member (and at least a portion of the directing surface) may be positioned in the passage, and the downstream end of the directing member may be positioned proximate the respective air inlet port (such as an inlet port 202). This configuration may help direct air from the passage into the second stage cyclone 132, and may help to impart a desired rotational air flow within the second stage cyclone 132.

As exemplified in FIGS. 2, 3 and 7, flow directing members are in the form of vanes 226 that are provided in the passage 196 formed between the screen 176 and the second cyclone sidewall 186. In this embodiment, the vanes 226 are positioned at the downstream end of the passage 196, proximate the air inlet ports 202. The vanes 226 have respective upstream and downstream ends 228 and 230 that are separated from each other by a directing member length 232. Each vane 226 also includes a directing surface 234 that faces toward the flow of air within the passage 196. The directing surface 234 may be generally linear and, preferably, are essentially linear or linear. Such a configuration helps facilitate air flow and/or a reduction in back pressure in the air flow path.

In the embodiment of FIG. 7, the directing surface 234 is positioned and oriented such that it is substantially tangential to the inner surface of the second cyclone sidewall 186. This may help direct the incoming air in a generally tangential manner, and may help facilitate a desired circulation within the second stage cyclone 132.

In this embodiment, each air inlet port 202 has an upstream edge 236 and a downstream edge 238 that is spaced from the upstream edge 236 around the periphery of the second stage cyclone 132 an inlet port width 240. The inlet port width 240 may be any suitable width, and in the embodiment illustrated is selected so that it is less than directing surface length 232. This may help facilitate air flow and reduce back pressure in the air flow path.

In the illustrated embodiment, the downstream edges 238 of the air inlet ports 202 are proximate, and generally coincident with the downstream end 230 of their respective vane 226, and the upstream edges 236 extend generally linearly and generally oppose a portion of the directing surface 234 (are generally parallel or parallel to the directing surface 234). Together, the directing surface 234 and upstream edges 236 may help to define inlet flow passages 242 connecting the passage 196 with the air inlet ports 202.

As exemplified, the inlet flow passages 242 are generally linear and may be linear, and extend along respective passage axes 244. The distance 246 between the upstream edge 236 and the directing surface 234, in a direction orthogonal to the passage axis 244, may define a passage width.

Optionally, as exemplified in FIG. 7, the passage width 246 may be selected to be equal to or less than the radial distance 218 between an outer surface 214 of the outlet conduit 210 and the inner surface of the second cyclone sidewall 186, such that radial distance 218 is the combination of the passage width 246 and the radial thickness 224 of an inner flow region 220 that is defined proximate the outer surface 214 of the outlet conduit 210 (i.e., distance 218 is the sum of width 246 and thickness 224). In this arrangement, an interface between the inner flow region 220 and the radially outer flow region 225 of the interior of the second stage cyclone 132 in which air can circulate and that is aligned with the inlet passage width 246 is illustrated using a dashed line 222. Providing an inner flow region 220 in this manner may help facilitate axial air flow along the outer surface 214 of the outlet conduit 210 while air circulates within an outer flow region that is aligned with the inlet ports 202. This may help reduce back pressure in the air flow path. The thickness 224 of the inner flow region 220 may be between about 5% and about 30%, and between about 15% and about 25% of the distance 218, and in some embodiments may be between about 0.050" and about 0.5", and may be between about 0.150" and about 0.300".

In the embodiment of FIG. 7, the upstream edges 236 are positioned such that they are substantially tangential to the interface 222 between the inner flow region 220 and the outer flow region 225. In this arrangement, an extension of the surface of the upstream edge 236 in a direction parallel to the passage axis 244 is generally tangential to the interface 222, and extends through the second stage cyclone 132 without intersecting the air outlet conduit 210. Instead, the projection of the surface of the upstream edge 236 will intersect the directing surface 234 of a vane 226 that is associated with a different one of the air inlet ports 202. In some configurations, as illustrated in FIG. 7, the extension of the upstream edge 236 of a given air inlet port 202 and the extension of the directing surface 234 adjacent that air inlet port 202 may intersect the directing surface 234 of another one of the vanes 226 without intersecting the air outlet conduit 210. This may help induce a favourable air flow within the second stage cyclone 132 and/or may help reduce back pressure in the air flow path. Alternatively, in other embodiments, the upstream edge 236 may be positioned such that it is tangential to the outer surface 214 of the outlet conduit 210 (i.e. there is no inner flow region 220) or is offset such that its projection is radially outwardly offset from the interface 222. Accordingly, air entering the second stage cyclone may be directed into outer flow region or the outer flow region and the inner flow region. If the width of the air inlet passage is equal to or less than the radial distance between the cyclone sidewall and the air outlet conduit, and if the air inlet passage is oriented as set out herein, then the air may enter the second stage cyclone without contacting the air outlet conduit. Accordingly, rotational momentum may not be reduced upon entering the second stage cyclone and/or the air entering the second stage cyclone may cyclone without mixing with the air exiting the second stage cyclone.

Figure 14:
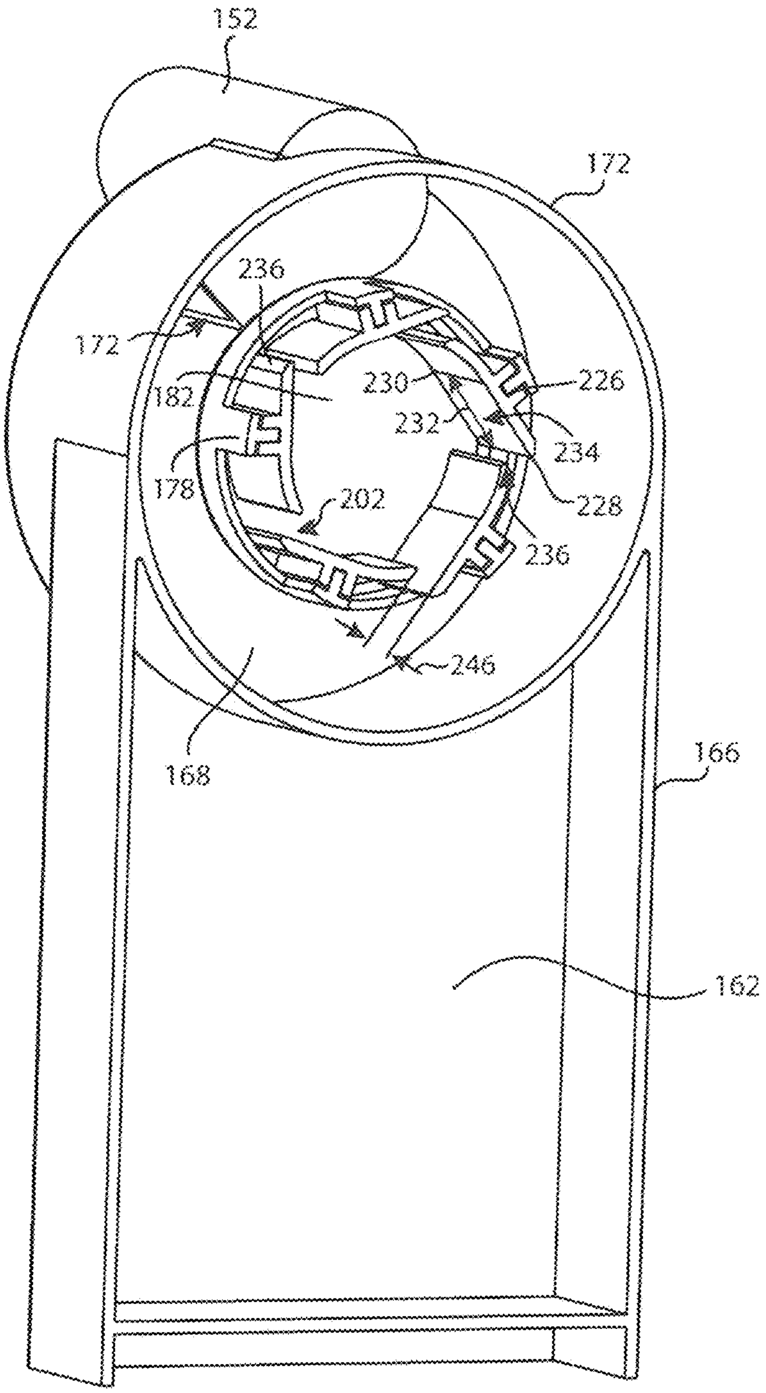
FIG. 14 is a cross-sectional perspective view of the hand vacuum cleaner of FIG. 9, taken along line 14-14.
Figure 15:
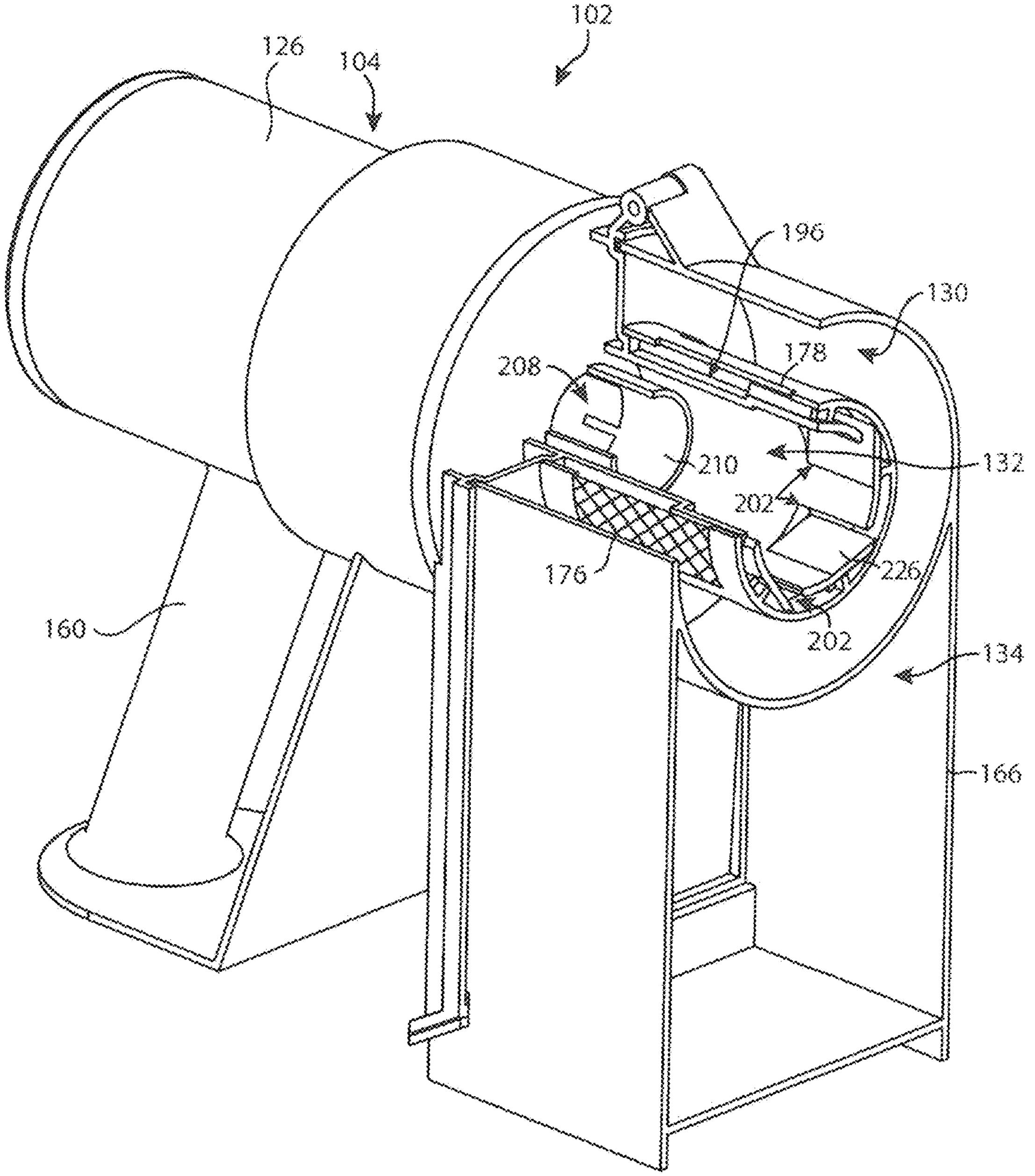
FIG. 15 is a cross-sectional perspective view of the hand vacuum cleaner of FIG. 9, taken along line 15-15, with a portion of the cyclone assembly cut away.
Figure 16:
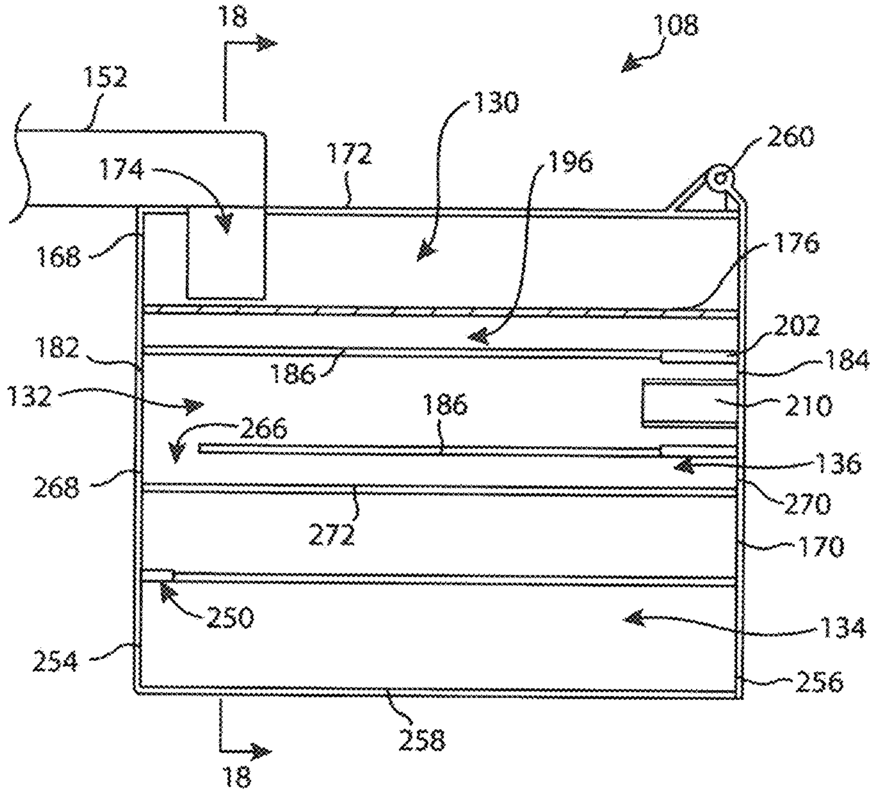
FIG. 16 is a schematic representation of another embodiment of a cyclone assembly that is usable with a vacuum cleaner.
Figure 17:
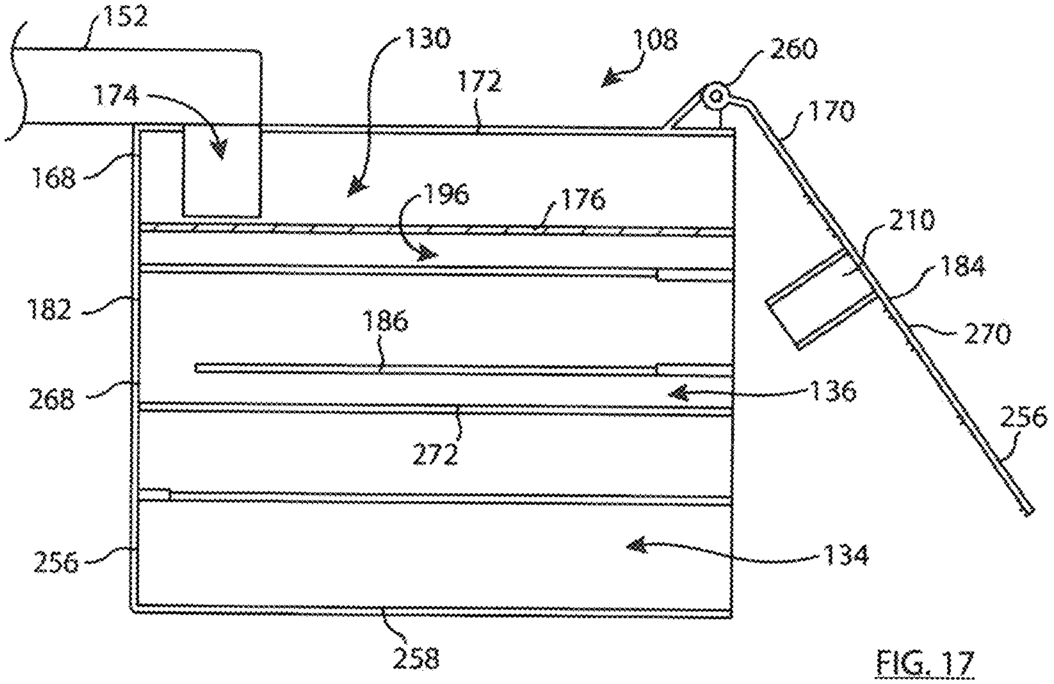
FIG. 17 is a schematic representation of the cyclone assembly of FIG. 16, with a rear door in an open position.
Figure 18:
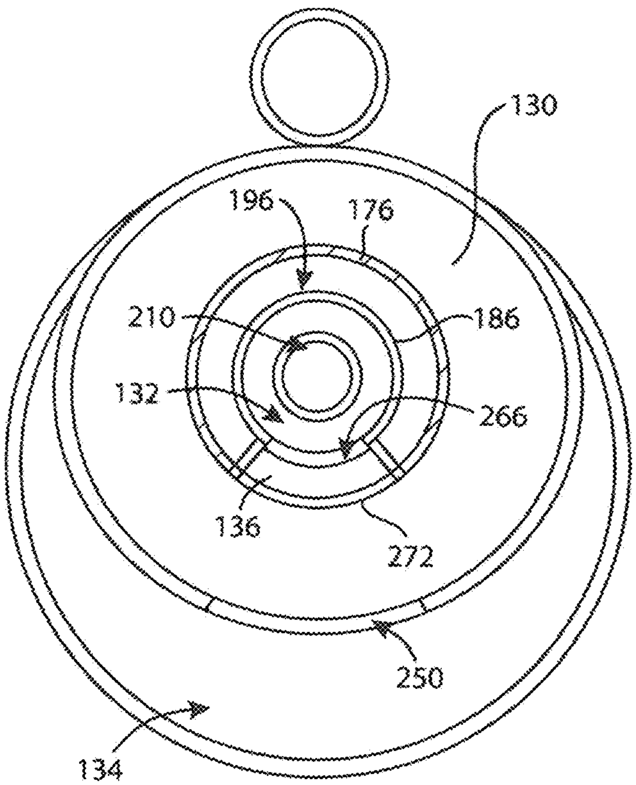
FIG. 18 is a cross-sectional end view of the cyclone assembly of FIG. 16, taken along line 18-18.

In the illustrated embodiment, the inlet passages 242 are sized such that their flow area (i.e. their cross-sectional area in a plane orthogonal to the passage axis 244) is less than the flow area of the outer flow region 225 (i.e. the area taken in the radial direction that is orthogonal to the direct of the air circulating within the second stage cyclone 132). The embodiment of FIG. 14 includes analogous air directing vanes 226.

The vanes 226, or at least portions thereof, including the upstream and downstream ends 228 and 230 and directing surface 234, may optionally be integrally formed with second cyclone sidewall 186 and/or an end wall of the second stage cyclone 132. Alternatively, at least a portion of the vanes 226, and optionally the entire vane structure, may be formed from a separate member that is positioned adjacent a suitable opening in the second cyclone sidewall 186 or other suitable location.

Optionally, the vanes 226 may be sized to fit entirely within the passage 196, such that the vanes 226 do not extend into the interior of the first stage cyclone 130 or the second stage cyclone 132. In other embodiments, they may extend part way to the radial outer side of the passage 196. In the illustrated embodiments, the upstream ends 228 of the vanes 226 are positioned within the interior of the passage 196 proximate the screen 176, but remain spaced apart from the screen 176. This may help facilitate air circulation within the passage 196. Alternatively, the upstream ends 228 may be positioned proximate the outer sidewall of the passage 196 (i.e. the screen 176), and may in some embodiments contact the outer sidewall of the passage 196 (as shown using dashed lines in FIG. 7). FIGS. 35-36 show an example in which upstream ends 228 of vanes 226 contact (e.g. are joined to or are integrally formed with or abut) the outer sidewall of passage 196. In this example, upstream ends 228 are connected to screen 176.

Reference is now made to FIGS. 23-25. In some embodiments, an air inlet port 202 may include a terminal end wall 332 that extends away from second stage cyclone 132 (e.g. in a radially outward direction) into passage 196. As shown, terminal end wall 332 may extend from downstream port edge 238 to upstream port edge 236 and between vane downstream end 230 and vane upstream end 228. Vane 226 may extend tangentially (i.e. longitudinally) from terminal end wall 332. In the example shown, a vane 226, a terminal end wall 332, and a passage end wall 336 border each inlet flow passage 242. An advantage of this design is that it may provide a more constrained inlet flow passage 242 that may be more effective at directing air flow to enter second stage cyclone 132 in a tangential direction.

It will be appreciated that vane 226 need not be linear and that vanes of other configurations, e.g., arcuate vanes and/or vanes that may direct the air partially towards the outlet conduit may be used in conjunction with other features of this disclosure.

Flow Straighteners

The following is a description of flow straighteners that may be used by themselves in any surface cleaning apparatus or in any combination or sub-combination with any other feature or features described herein. For example, any flow straightener described herein may be used with any one or more of the cyclone assembly with the passage from a first stage cyclone to a second stage cyclone, the multiple second stage cyclone air inlet ports, concurrently openable dirt collection chambers, an openable end which includes the inlet conduit, radial sealing member, and flow directing member features described herein.

In accordance with this feature, an air or flow straightener is provided which is an extension of a wall defining a tangential air inlet of a cyclone chamber. The flow straightener may extend in the direction of air flow through the tangential air inlet and may be provided to assist the air inlet in directing the flow of air into the cyclone chamber. Accordingly the flow straighteners may assist in reducing turbulence adjacent an air inlet.

The flow straightener may be on the inlet side of a cyclone air inlet and may extend into, or further into, a header upstream of the cyclone air inlet. Alternately, or in addition, the flow straightener may be on the outlet side of a cyclone air inlet and may extend into, or further into, the cyclone chamber. As exemplified in FIGS. 35, 36 and 38-43, the flow straightener may be an extension of a flow directing member (e.g., vane 226) and therefore be an extension of a sidewall of the cyclone air inlet. Alternatively, the flow straightener may be an extension of an inlet end wall 388. A flow straightener may be provided on the radial outer end and/or the radial inner end of the flow directing member or the end wall.

The flow straightener is configured to assist in directing air into the cyclone chamber. The flow straightener may extend in the same direction as the flow directing member and/or an inlet end wall. For example, if the flow directing member and/or an inlet end wall are generally linear, then the flow directing member may be a generally linear extension thereof.

The exemplary embodiment of FIGS. 35 and 36 illustrates a flow straightener 380 extending linearly from a radial outer edge of a flow directing member (vane 226), wherein the flow directing member is positioned at the upstream end of tangential air inlet port 202. As exemplified, each vane 226 is provided with a flow straightener 380. Flow straighteners 380 form an extension of the vane 226 and extend beyond terminal end wall 332 into the header portion of passage 196. Flow straighteners 380 of the embodiment of FIGS. 35 and 36 are provided on the radial outer ends 384 of vanes 226. The flow straighteners 380 may extend in the direction of air flow through the tangential inlet ports 202. Illustrated vanes 226 extend generally linearly, and flow straighteners 380 comprise generally linear extensions of vanes 226.

FIGS. 44 and 45 exemplify a cyclone assembly 108 wherein a cyclone is formed using an inlet body 392 provided at the inlet end of second cyclone sidewall 186. Inlet body 392 comprises the inlet end wall 388 and the flow directing members (vanes 226) and therefore, when mounted to the inlet end of sidewall 186, defines tangential air inlets 202.

As exemplified in FIGS. 44 and 45, cyclone assembly 108 has an upstream or first stage cyclone 130 having an upstream or first stage cyclone chamber 412 with an inlet 416 (which terminates at inlet port 174) and an outlet port 420 (at the outlet end of screen 176). Face 390 of inlet body 392 faces air outlet port 420. A header 400 is formed between outlet port 420 and tangential air inlet ports 202. The header comprises the volume between outlet port 420 and face 390 on inlet body 392 as well as the annular region between tangential inlet ports 202 and radial outer wall 402. A header end wall 404 is spaced from and faces rear end wall 170 of the first stage cyclone. Header 400 receives an air flow from outlet 420. Cyclone assembly 108 also includes a downstream or second stage cyclone 132 a downstream or second stage cyclone chamber 424 with inlets 202 and outlet 210. As illustrated in FIG. 45, inlet body 392 of the example embodiment is mounted in slots 406 of header end wall 404 to define tangential air inlets 202.

It will be appreciated that tangential air inlets may be formed and configured in different ways. In the exemplary embodiments of FIGS. 38 to 45 tangential air inlets 202 are defined by wall portions of an inlet body 392.

FIGS. 38 to 43 illustrate embodiments of an inlet body 392,

As exemplified, inlet body 392 comprises an inlet end wall 388 and a plurality of flow directing members. As discussed previously, flow directing members may be in the form of vanes 226. Tangential air inlets 202 may be defined by inlet end wall 388 and the flow directing members and header end wall 404, and flow straighteners may extend from one or more inlet end wall 388 and/or one or more flow directing members. Optionally each inlet 202 is provided with a flow straightener 380.

For example, the embodiment of an inlet body 392 illustrated in FIGS. 38 and 39 includes flow straighteners 380 extending from inlet end wall 388. When the inlet body 392 of FIGS. 38 and 39 is installed in a cyclone assembly 108 such as the cyclone assembly of FIGS. 44 and 45, the flow straighteners 380 extend from end wall 388 beyond vanes 226 and into header 400. As illustrated, the flow directing members may be generally linear and the flow straighteners 380 may comprise generally linear extensions of the end wall 388.

The embodiment inlet body 392 of FIGS. 40 and 41 includes flow straighteners 380 extending from flow directing members that are provided at the downstream edges 238 of the tangential inlet ports 202. Vanes 226 each a flow straightener that extends outwardly beyond end wall 388 into header 400. In the embodiment of FIGS. 40 and 41 the flow straighteners 380 are provided at the radial outer end 384 of the flow directing members.

The embodiment inlet body 392 of FIGS. 42 and 43 also includes flow straighteners 380 extending from flow directing members. In the embodiment of FIGS. 42 and 43 the flow straighteners 380 are provided at radial inner ends 396 of the flow directing members and at upstream edges 236 of the tangential air inlet ports 202. The flow straighteners 380 extend generally parallel to the flow directing member that is provided at the downstream edge 238 of the tangential inlet port 202 having the flow straightener 380.

In some embodiments, more than one flow straightener extends from the walls defining a single tangential air inlet. For example, a tangential air inlet 202 may include a flow straightener extending from a radial outer end 384 of a flow directing member as in the example embodiment of FIGS. 40 and 41 and another flow straighter extending from a radial inner end of a flow directing member as in the example embodiment of FIGS. 42 and 43. As another example, a tangential air inlet 202 may also include a flow straightener 380 extending from an end wall as in the example of embodiment of FIGS. 38 and 39 and one or more flow straighter extending from a flow directing member as in the example embodiment of FIGS. 40 and 41 and/or the example embodiment of FIGS. 42 and 43.

Concurrently Openable Dirt Collection Chambers

The following is a description of concurrently openable dirt collection chambers that may be used by itself in any surface cleaning apparatus or in any combination or sub-combination with any other feature or features described herein. For example, any concurrently openable dirt collection chambers described herein may be used with any one or more of the cyclone assembly with the passage from a first stage cyclone to a second stage cyclone, the multiple second stage cyclone air inlet ports, flow directing members, an openable end which includes the inlet conduit and radial sealing member features described herein.

Dirt and debris that is separated from the air flowing through cyclone assembly 108 (or other suitable air treatment members) may be collected in suitable dirt collection regions. If the air treatment member includes two or more air treatment stages, the dirt from the stages may be collected in a common dirt collection region, or alternatively may be collected in two or more dirt collection regions. The dirt collection regions may be positioned in any suitable location and may be of any suitable configuration. Preferably, each of the dirt collection regions may be openable or otherwise accessibly to help facilitate emptying the collected dirt and/or debris into a garbage can or other receptacle. If more than one dirt collection region is provided, the apparatus 100 may be configured such that all, or at least two or more, of the dirt collection regions can be opened concurrently. This may help facilitate the simultaneous opening and emptying of the dirt collection regions.

In accordance with this feature, a cyclone assembly has an openable end, which may be a front end or a rear end. When the end is opened, the cyclone assembly may be opened. For example, if a cyclone assembly comprises a first stage cyclone and a second stage cyclone, then the first and second stage cyclones may be opened concurrently. Further, if one or both of the first and second stage cyclones has a dirt collection chamber external to the cyclone chamber, then one or both of the dirt collection chambers may be opened concurrently with the cyclone chambers.

If the front end or the rear end is openable, then the front or rear end may be removably mounted or pivotally mounted to the cyclone assembly. If the rear end is openable, then the cyclone assembly may be removed from the main body of the surface cleaning apparatus in order to enable the rear end to be opened. Alternately, the cyclone assembly may be moveably mounted to (e.g., pivotally mounted to) the main body. The rear end may then be opened when the cyclone assembly has been moved (pivoted) to a rear end opening position (see for example FIG. 13).

In the cyclone assembly 108, the first and second stage cyclones 130 and 132 may be configured such that some or all of the dirt that is separated from the air flow is retained within the cyclones 130 and 132 themselves. For example, debris may settle on the lower surfaces of the cyclones 130 and 132 via gravity. In such configurations, the cyclones 130 and 132 may form the dirt collection regions for the apparatus 100.

Optionally, the cyclone assembly may also include at least one dirt collection chamber that is external the first and second stage cyclones 130 and 132, for collecting and containing the separated dirt. The dirt collection chamber can be positioned adjacent the first and/or second stage cyclones 130 and 132 and may be in communication with respective dirt outlets on the cyclones 130 and 132. Preferably, a separate dirt collection chamber may be provided for each cyclone in the cyclone assembly, and the dirt collection chambers may be optionally be isolated from each other. Each dirt collection chamber may then be in communication with a dirt outlet of its respective cyclone. If external dirt collection chambers of this type are provided, they may be configured such that the dirt collection chambers are openable concurrently with each other and/or concurrently with one or more of the cyclones. For example, a cyclone assembly with two cyclone stages and two dirt collection chambers may be configured so that both dirt collection chambers are openable concurrently, two dirt collection chambers and one cyclone are openable concurrently (a total of three regions) and/or so that both dirt collection chambers and both cyclones are openable concurrently (a total of four regions). This may be achieved in any suitable manner, including, for example using a common door to enclose some or all of the openable regions, and/or connecting the openable portions of each of the regions together, such that opening one openable portion will in turn cause the other openable portions to open without further intervention from the user.

In the embodiment of FIG. 4, the first stage cyclone 130 includes a dirt outlet 250 through which dirt can exit the first stage cyclone 130 and the first dirt collection chamber 134 is external the first stage cyclone 130 and in communication with the first dirt outlet 250.

In this embodiment the dirt outlet 250 is provided in the form of a slot that extends around a portion of the perimeter of the cyclone sidewall 172, and is located toward the front end of the first stage cyclone 130 proximate the front end wall 168. Optionally, as illustrated in this embodiment, at least most of the first dirt collection chamber 134 is positioned beneath the first stage cyclone 130, and the first dirt outlet 250 is provided in the bottom portion of the cyclone sidewall 172.

The first dirt collection chamber 134 may be of any suitable configuration and may be in any suitable position relative to the first stage cyclone 130 and may have any dirt inlet. In the embodiment of FIG. 4, the first dirt collection chamber 134 includes a front end wall 254, an opposed rear end wall 256 and a first dirt collection chamber sidewall 258 extending axially therebetween. In this embodiment, the front end wall 254 of the first dirt collection chamber 134 is generally coincident with the front wall 162 of the cyclone assembly 108. In other embodiments, the front end wall 254 may be separate from the front wall 162.

To open the first dirt collection chamber 134 for emptying, preferably one of the front end wall 254, rear end wall 256 and sidewall 258 are openable. In the embodiment of FIGS. 4-6, the front end wall 162 of the cyclone assembly 108 is configured as an openable door and is pivotally connected to the sidewall 166 by a hinge 260 such that the front end wall 162 is pivotal about a lateral pivot axis 262. The front end wall 162 may be held in its closed position using any suitable mechanism, including a friction fit with the sidewall 166 and/or by using a latch, such as the latch 264 used in the embodiment of FIG. 13. Alternatively, instead of being pivotally connected, the front end wall 162, and/or front end wall 254 may be detachable (removable) from the sidewall 166 or otherwise openable.

In the embodiment of FIGS. 4 and 5, the second stage cyclone 132 includes a dirt outlet 266 through which dirt can exit the second stage cyclone 132 and the second dirt collection chamber 136 is external the second stage cyclone 132 and in communication with the dirt outlet 266.

In the embodiment of FIGS. 4-6, the second dirt collection chamber 136 includes a front end wall 268, a rear end wall 270 and a second dirt collection chamber sidewall 272 extending therebetween. In this embodiment, the dirt outlet 266 is provided in the form of a slot that extends around a portion of the perimeter of the cyclone sidewall 186, and is located toward the front end of the second stage cyclone 132 proximate the front end wall 182, although the dirt outlet may be of different configurations and in different locations. Optionally, as illustrated in this embodiment, at least most of the second dirt collection chamber 136 is positioned forward of the second stage cyclone 132, and the dirt outlet 266 is provided in the upper portion of the cyclone sidewall 186. In this configuration, the second dirt collection chamber 136 is spaced axially forward of the second stage cyclone 132, is separated by the second stage cyclone 132 by the movable front end wall 182 and is nested within the first stage cyclone 130 (in the axial and radial directions). That is, the front end wall 268 of the second dirt collection chamber 136 may be substantially co-planar with the front end wall 168 of the first stage cyclone 130. Optionally, as illustrated in this embodiment (FIG. 6), the front end wall 168 of the first stage cyclone 130 and the front end wall 268 of the second dirt collection chamber 136 may be integrally formed as part of a common plate or wall member. The front end wall 182 of the second stage cyclone 132 may be offset axially from the front end walls 168 and 268.

To open the second dirt collection chamber 136 for emptying, preferably one of the front end wall 268, rear end wall 270 and sidewall 275 are openable. In the embodiment of FIGS. 4-6, the front end wall 268 of the second dirt collection chamber 136 is mounted to and is movable with the front end wall 162 of the cyclone assembly 108, such opening the front wall 162 moves the front end wall 268 and opens the second dirt collection chamber 136 for emptying.

In this embodiment, the front end wall 182 is also mounted to and is movable with the front end wall 162 of the cyclone assembly 108, such that opening the front wall 162 moves the front end wall 182 and opens the second stage cyclone 132 for emptying.

In this embodiment, the second dirt collection chamber 268 is entirely nested within, and laterally surrounded by, the first stage cyclone 130. In other embodiments, the second dirt collection chamber 268 may only be partially nested within the first stage cyclone 130, and at least a portion of the second dirt collection chamber 268 may be external the first stage cyclone 130.

Figure 13:
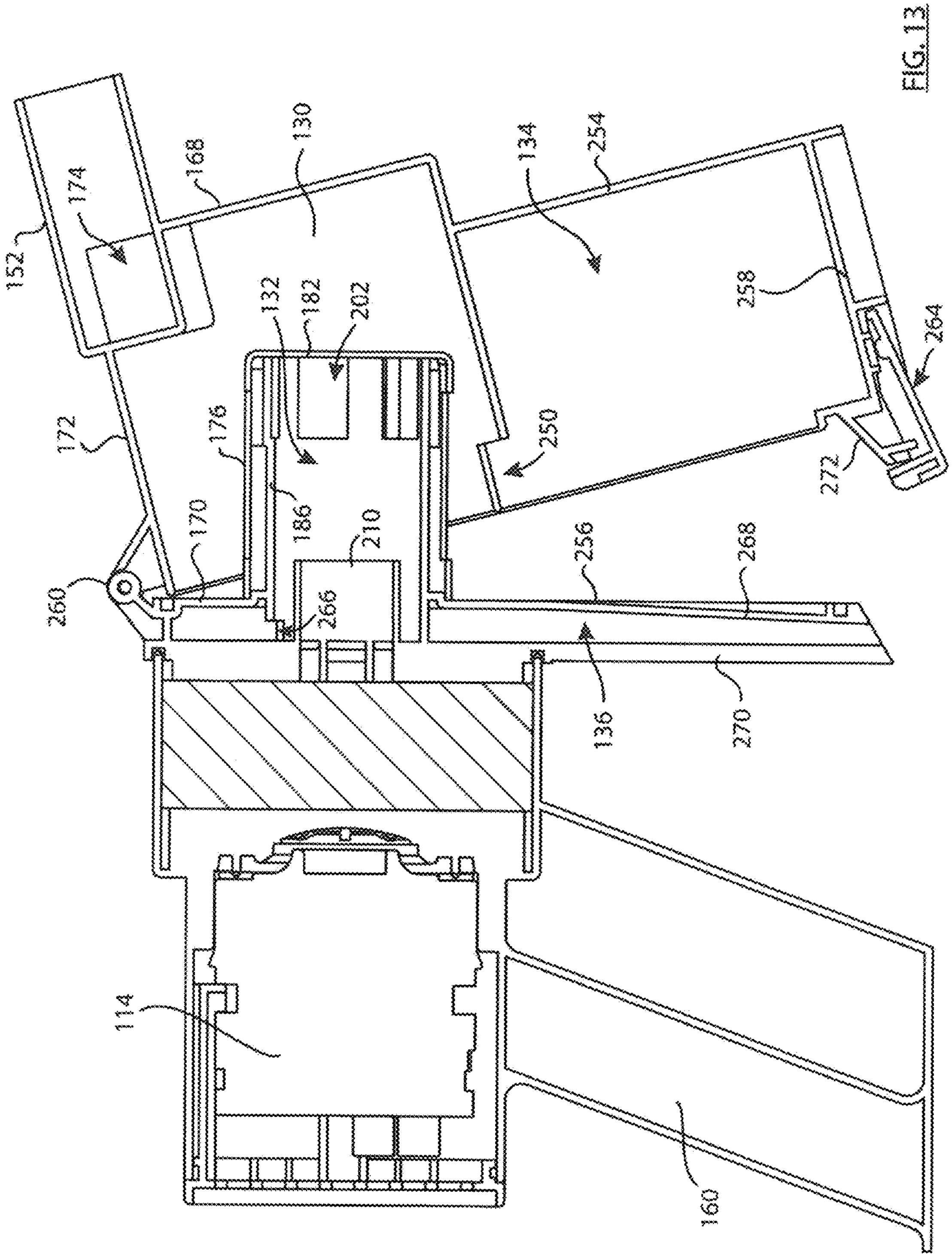
FIG. 13 is the cross-sectional side view of FIG. 12, with a front end of the cyclone assembly in an open position.

For example, as illustrated in the embodiment of FIGS. 12 and 13, the second stage cyclone 132 may be oriented so that the dirt outlet 266 is provided toward the rear end wall 184 of the second stage cyclone 132 (i.e. at the same end as the air outlet 208), and the second dirt collection chamber 136 may positioned rearward of the first stage cyclone 130 and the first dirt collection chamber 134. In this embodiment, the rear wall 184 of the second stage cyclone 132 is axially offset rearwardly from the rear end wall 170 of the first stage cyclone 130, and the second stage cyclone 132 is only partially nested within the first stage cyclone 130.

Also in this embodiment, at least a portion of the second dirt collection chamber 136 is shown in an optional arrangement in which it is positioned axially between the first stage cyclone 130 and the pre-motor filter housing 144 (and filter 142 therein). In this arrangement the second dirt collection chamber 136 is also rearward of the first dirt collection chamber 134, such that the rear wall 256 of the first dirt collection chamber 134 is at least partially coincident with portions of the front end wall 268 of the second dirt collection chamber 136.

Optionally, instead of or in addition to opening the front end walls 168, 182 and 254 and/or 268 of the compartments in the cyclone assembly 108, one or more of the sidewalls 172, 186, 258 and 272 may be openable and/or one or more of the rear end walls 170, 184, 256 and 270 may be openable. For example, in the embodiment of FIGS. 12 and 13 the second dirt collection chamber 136 is positioned such that it may be more convenient to empty by opening at least a portion of the sidewall 272 and/or at least a portion of the rear end wall 270.

For example, in this embodiment the hinge 260 is provided toward the rear end of the cyclone assembly 108 and at the upper side, whereby the rear portions of the cyclone assembly 108 is openable (i.e. the front wall 162 and at least a portion of the sidewall 166 are movable together relative to the rear end of the cyclone assembly). In this configuration, the movable portions of the cyclone assembly 108 (as discussed below) are pivoted generally forwardly and upwardly, which creates a generally lower facing opening through which the dirt and debris is emptied. This may help reduce the likelihood of debris contacting or becoming stuck on portions of the first stage cyclone 130, first dirt collection chamber 134, second stage cyclone 132 and second stage dirt collection chamber 136. Alternatively, as shown in the embodiment of FIG. 6, the hinge 260 may be provided at the bottom, and the openable door 162 may pivot generally forwardly and downwardly.

In the embodiment of FIG. 12, the rear wall 256 of the first dirt collection chamber 134 is separated from the sidewall 258, which opens the rear end of the first dirt collection chamber 134 for emptying. In this embodiment, the rear end wall 170 of the first stage cyclone 130 is coincident with the rear end wall 256 of the first dirt collection chamber 134, and opening the cyclone assembly 108 as illustrated also separates the rear end wall 170 from the sidewall 172 of the first stage cyclone 130, thereby opening the first stage cyclone 130 for emptying.

Referring to the embodiment of FIGS. 12 and 13, to empty the second dirt collection chamber 136 in this embodiment the lower portion of the sidewall 272 is openable, while the front and rear end walls 268 and 270 remain substantially fixed. In this embodiment, the lower portion of the sidewall 272 is attached to and moves with front end of the cyclone assembly 108 (i.e. with the first dirt collection chamber 134 and the first stage cyclone 130) when it is moved between closed (FIG. 12) and open (FIG. 13) configurations. Moving the sidewall 272 in this manner may allow dirt and debris to exit via the bottom of the second dirt collection chamber 136. The opening revealed by the sidewall 272 is substantially smaller than the opening provided for the first dirt collection chamber 134 when rear end wall 256 is opened. This may help reduce the overall size of the apparatus 100 and may be usable in most circumstances as debris separated by the second stage cyclone 132 is likely to be smaller (having passed through the screen 176 and inlet ports 202) than the debris collected in the first dirt collection chamber 134.

Referring to the embodiment of FIGS. 17-22, the cyclone assembly 108 may be configured so that the second dirt collection chamber 136 is positioned radially (or at least partially radially) between the first stage cyclone 130 and the second stage cyclone 132 chambers. In this embodiment, the second stage dirt collection chamber 136 is located below the second stage cyclone 132, between the outer surface of the cyclone sidewall 186 and the dirt collection chamber sidewall 272. To help accommodate this placement of the second dirt collection chamber 136, the cyclone assembly 108 is modified so that the screen 176 and passage 196 do not extend continuously around the perimeter of the second stage cyclone 132. Instead, the second dirt collection chamber 136 interrupts the passage 196, such that the passage 196 only partially surrounds the second stage cyclone 132 (see FIG. 18). In this configuration, the second dirt outlet 266 is formed as a slot-type outlet in the lower portion of the second cyclone sidewall 186, toward the front end wall 182.

To empty this cyclone assembly 108, one of the front or rear end walls may be opened. In the illustrated example, the rear end of the cyclone assembly 108 includes an openable door that includes the rear end wall 170 of the first stage cyclone 130, the rear end wall 184 of the second stage cyclone 132, the rear end wall 256 of the first dirt collection chamber 134 and the rear end wall 270 of the second dirt collection chamber 136. In this example, the air outlet conduit 210 is also mounted on, and moves with the openable door.

Openeable End which Includes the Inlet Conduit

The following is a description of an openeable end which includes the inlet conduit that may be used by itself in any surface cleaning apparatus or in any combination or sub-combination with any other feature or features described herein. For example, any openeable end which includes the inlet conduit described herein may be used with any one or more of the cyclone assembly with the passage from a first stage cyclone to a second stage cyclone, the multiple second stage cyclone air inlet ports, flow directing members, concurrently openable dirt collection chambers and radial sealing member features described herein.

In accordance with this embodiment, a cyclone assembly, which may be a dual stage cyclone assembly, has a front openable end, which may be a moveably, e.g., pivotally, connected to the cyclone assembly. The front openable end may be a door and may open one or more of a first stage cyclone, a first stage dirt collection region, a second stage cyclone and a second stage dirt collection chamber. The door or openable end is provided with the air inlet conduit. Accordingly, when the front end is opened, a rearward portion of the inlet conduit (e.g., the first stage cyclone tangential air inlet, pivotally may be opened.

Figure 20:
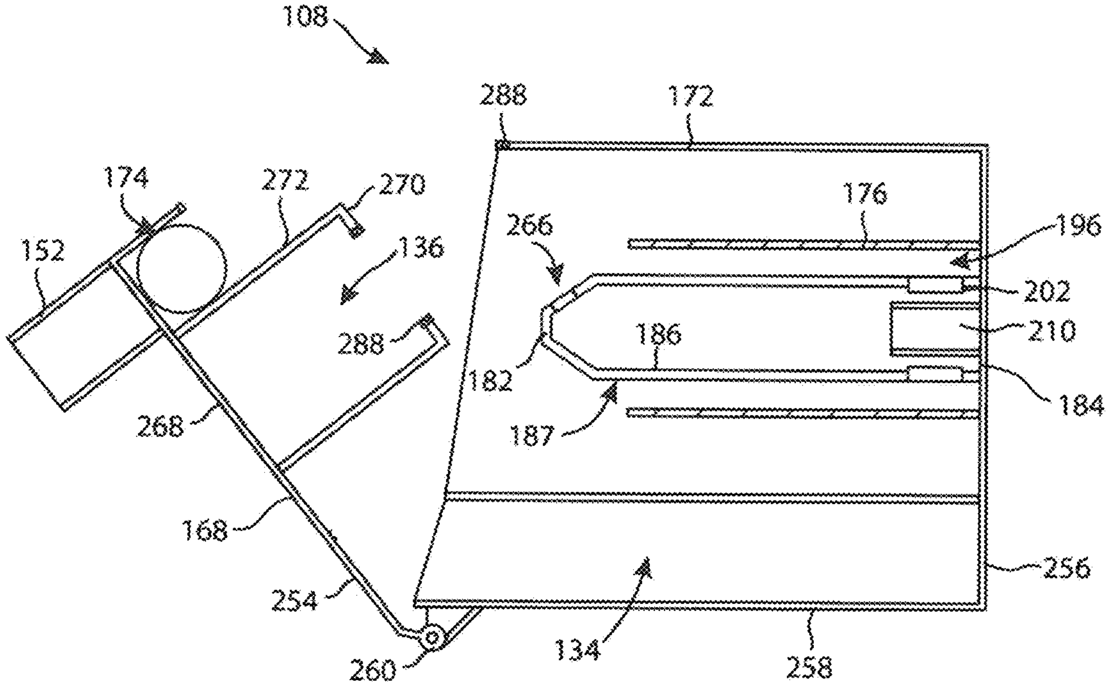
FIG. 20 is a schematic representation of the cyclone assembly of FIG. 19, with an openable portion in an open position.
Figure 22:
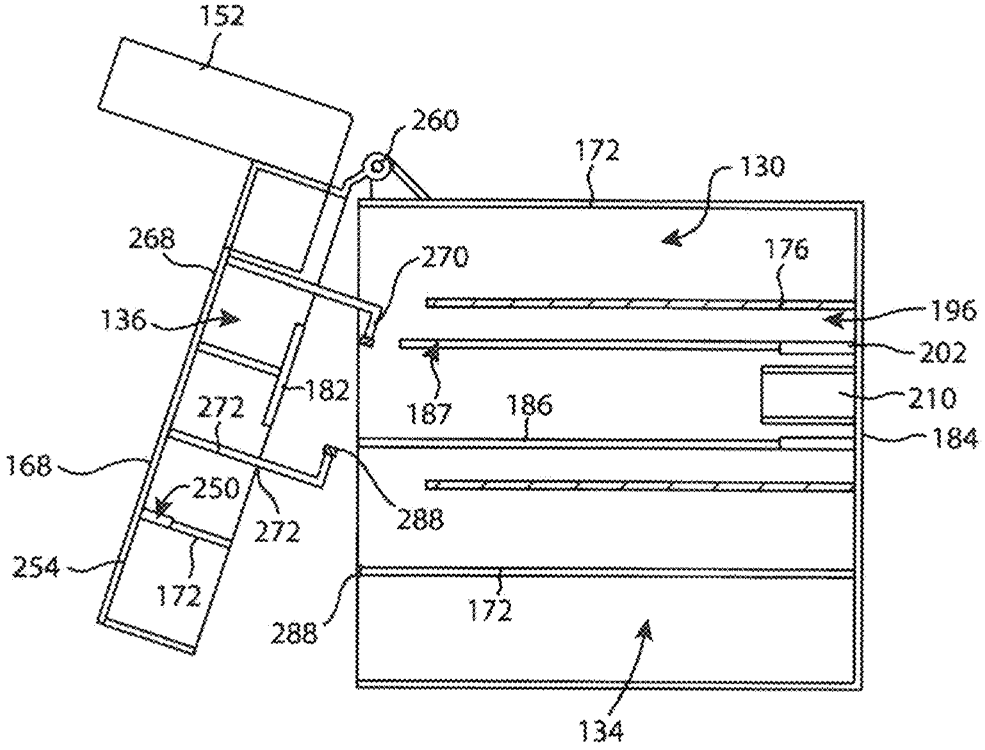
FIG. 22 is a schematic representation of the cyclone assembly of FIG. 21, with an openable portion in an open position.

For example, as exemplified in FIGS. 20 and 22, the air inlet conduit 152 is provided on and is movable with the front end of the cyclone assembly 108. In this configuration, opening the first dirt collection chamber 134 and/or first stage cyclone 130 also moves the inlet conduit 152. This may help provide access to the air inlet port 174 and portions of the inlet conduit 152 when the air treatment member is opened.

Radial Sealing Members

The following is a description of a radial sealing member that may be used by itself in any surface cleaning apparatus or in any combination or sub-combination with any other feature or features described herein. For example, any radial sealing member described herein may be used with any one or more of the cyclone assembly with the passage from a first stage cyclone to a second stage cyclone, the multiple second stage cyclone air inlet ports, flow directing members, concurrently openable dirt collection chambers and an openeable end which includes the inlet conduit features described herein.

In accordance with this feature, a sealing interface is provided on a sidewall of a cyclone and/or dirt collection chamber. Accordingly, part or all of a dirt collection chamber of a cyclone may be formed by one or more walls on an openable end of a cyclone assembly. An advantage of this feature is that a more compact construction may be utilized with a pivotally mounted openable end wall.

In the embodiments of FIGS. 4-6, the first stage cyclone 130 and second stage cyclone 132 are openable by moving the their respective front end walls 168 and 182 (i.e., moving the front end of the cyclone assembly). In this embodiment, the front end walls 168 and 182 are used to cover the front ends of the first and second stage cyclones 130 and 132. In this arrangement, the front end walls 168 and 182 tend to engage the end faces of the sidewalls 172 and 186, such that the engagement between the front end walls 168 and 182 and the end faces of the sidewalls 172 may separate the different regions/compartments within the cyclone assembly 108 (sealing members like gaskets may be provided, or sufficient sealing may be achieved by contact between the abutting members). Similar end sealing configurations may be seen in the embodiments of FIGS. 9-15 and 16-18. In other embodiments, sealing of the cyclone stages and/or dirt collection chambers may be achieved using a different sealing configuration. For example, instead of engaging and sealing against the end faces of the sidewalls 172 and 186 (and analogously the end walls of the dirt collection chambers 134 and 136), the cyclone assembly 108 may be arranged so that at least some of the engaging/sealing occurs on a radial, side surface of one or more sidewalls (such as sidewall 186, sidewall 172, sidewall 258 and/or sidewall 272). That is, radial sealing members may be positioned to engage, and preferably seal against, the surfaces of the sidewalls.

Figure 19:
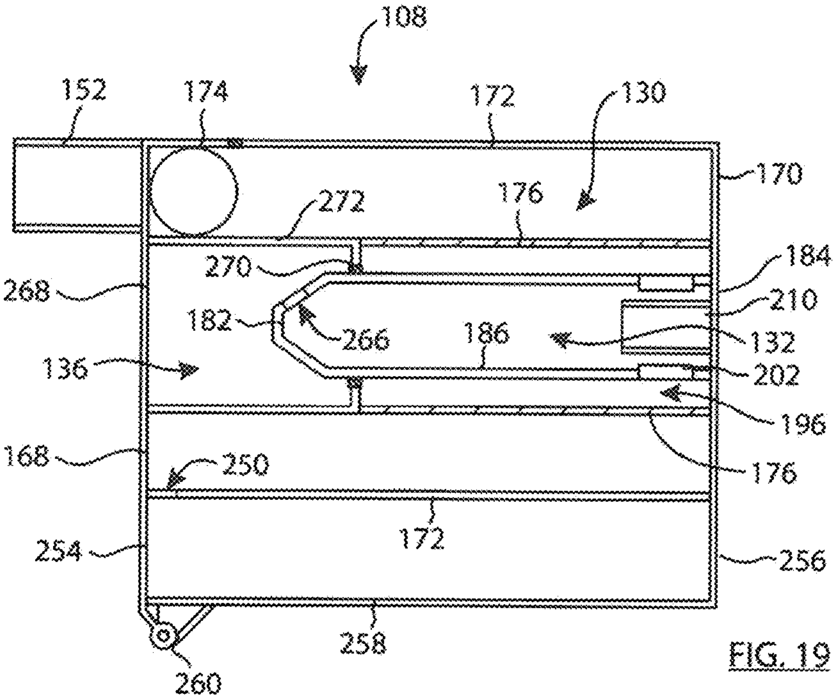
FIG. 19 is a schematic representation of another embodiment of a cyclone assembly that is usable with a vacuum cleaner.

Referring to FIGS. 19-20, another embodiment of a cyclone assembly 108 that is usable with a hand vacuum cleaner (including the hand vacuum cleaners 100 described herein), includes a front end that be pivoted about a hinge 260 and can be moved between closed (FIG. 19) and open (FIG. 20) positions. In this example, the openable front end includes the front end wall 168 of the first stage cyclone 130, the front end wall 254 of the first dirt collection chamber 134, the front end wall 168 of the second stage cyclone 132 and the front end wall 268 of the second dirt collection chamber 136.

As exemplified, in addition to the end walls 168, 254, 168 and 268, the front end of the cyclone assembly also includes one or more inwardly extending wall portions. In the illustrated example, the second dirt collection chamber 136 is round so has a circular sidewall 272 (in a direction transverse to the front/rearward direction) that is also mounted to, and movable with the openable front end. The sidewall 272 may optionally be configured so that when the front end is closed (FIG. 19—i.e. the in use position), the sidewall 272 at least partially axially overlap the sidewall 186 of the second stage cyclone 132. In this configuration, portions of the second dirt collection chamber rear end walls 270 may be positioned radially between the sidewall 186 of the second stage cyclone 132 and the sidewall 272 of the second dirt collection chamber 136. The assembly may be configured such that the radially inwardly extending portions of the rear end walls 270 engage, and optionally seal against, the outer surface 187 of the second cyclone sidewall 186 when the front end is closed (FIG. 19).

Pivoting the front end to the open position may move the sidewall 272 and separate the inwardly extending portions of the rear end walls 270 from the sidewall 186, such that the walls 272, 270 and 268 co-operate to for an open volume that forms the second dirt collection chamber 136 when sealed against the second stage cyclone 132. When the front end is open in this manner, the first dirt collection chamber 134, first stage cyclone 130 and second dirt collection chamber 136 are open and accessible for emptying. The second stage cyclone 132 may also be openable for emptying, for example by opening the end wall 184 and/or by opening some or all of the front end wall 182. This may be done while the front end is open, but need not occur concurrently with the opening of the front end.

To help provide a satisfactory seal, an optional sealing member 288 (such as a gasket and the like) may be positioned between the inwardly extending read end wall portions 270 and the outer surface 187 of the second cyclone sidewall 186 and may be provided on one or both of these.

Optionally, as illustrated in the embodiment of FIGS. 19 and 20, the second stage cyclone 132 need not be cylindrical along its entire length. Instead, a portion of the cyclone, preferably an end portion that is positioned toward the openable portion of the cyclone assembly 108, may have a different configuration. In the illustrated embodiment, the front portion of the second stage cyclone 132 has a generally frusto-conical configuration, in which portions of the sidewall 186 taper toward the front end of the second stage cyclone 132. In this embodiment, the sidewall 186 tapers toward the front end wall 182, which has a smaller diameter than the opposing rear end wall 184. The dirt outlet 266 may be provided in any suitable portion of the second stage cyclone 132, and in this embodiment is positioned in a tapered portion of the sidewall 186, in the upper portion of the second stage cyclone 132. It will be appreciated that the cyclone may be tapered in another manner.

Tapering the front end of the second stage cyclone 132 may help provide additional clearance between the second stage cyclone 132 and the movable sidewalls 272 and end walls 270, and may help facilitate the opening and closing of the front end.

Optionally, the front end wall 182 of the second stage cyclone 132 may also be openable in embodiments of the cyclone assembly 108 that utilize the radial, sidewall sealing as shown in the embodiment of FIGS. 19 and 20. For example, referring to FIGS. 21 and 22, another embodiment of a cyclone assembly 108 includes a front end that is pivotal about hinge 260. It will be appreciated that, in embodiments that utilize this feature, the pivotal end may be pivotally mounted to a lower end of the cyclone assembly (see for example FIG. 20) or it may be pivotally mounted to an upper end of the cyclone assembly (as exemplified in FIG. 22).

Figure 21:
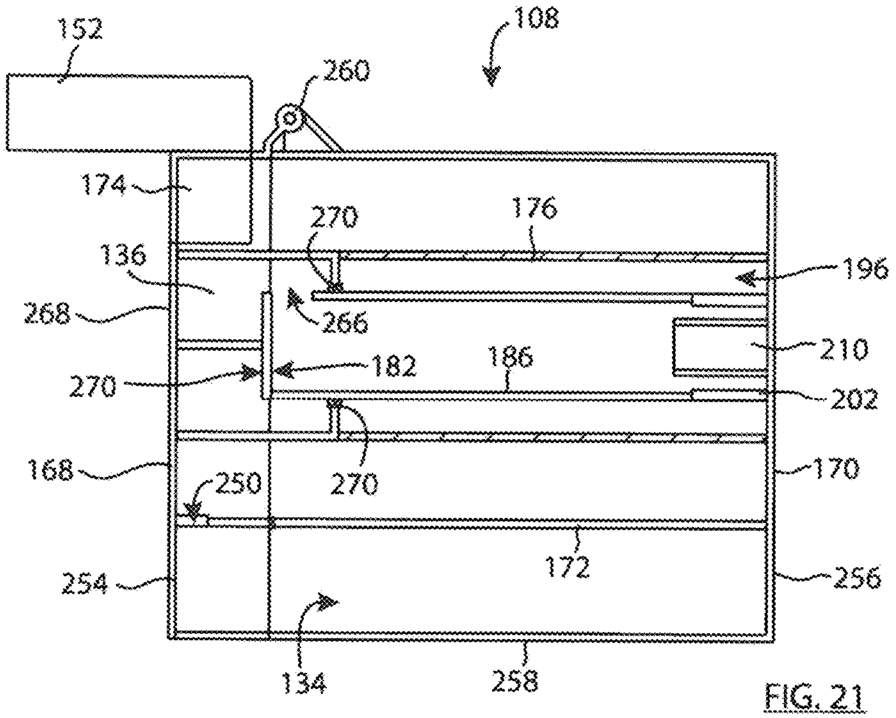
FIG. 21 is a schematic representation of another embodiment of a cyclone assembly that is usable with a vacuum cleaner.

It will be appreciated, that this feature may be combined with other features of an openable end wall as disclosed herein. For example, in this embodiment, the front end wall 168 of the first stage cyclone 130, the front end wall 254 of the first dirt collection chamber 134 and the front end wall 268 of the second dirt collection chamber 136 are all mounted on the front end and movable in unison with each other. In addition, the front end wall 182 of the second stage cyclone 132 may be provided by a plate member that is also mounted to the openable front end of the cyclone assembly 108. In this embodiment, the plate that provides the front end wall 182 is offset forwardly from the front end walls 168, 254 and 268 in the axial direction. This may help position the front end wall 182 in its desired position when the front end is closed (FIG. 21). Mounted in this way, the front end wall 182 is also movable in unison with the front end walls 168, 254 and 268, while facilitates concurrent opening of the first stage cyclone 130, second stage cyclone 132, first dirt collection chamber 134 and second dirt collection chamber 136.

As with the embodiment of FIGS. 19-20, in this embodiment the sidewall 272 of the second dirt collection chamber 136 extend axially inwardly from the front end wall 268, and is sized so that when the cyclone assembly 108 is closed the distal end of the sidewall 272 axially overlap with the second cyclone sidewall 186. Radially inwardly extending portions of the rear end wall 270 extend inwardly from the distal end of the sidewall 272 and can seal against the outer surface 187 of the second cyclone sidewall 186. Gaskets 288 can be provided to help provide a generally airtight seal, which can help separate the second dirt collection chamber 136 from the passage 196.

Optionally, as shown in FIG. 22, the openable portion of the front end of the cyclone assembly 108 may also include portions of the first cyclone sidewall 172, including a portion that includes the dirt outlet 250. In this arrangement, the two portions of the sidewall 172 may seal against each other when the cyclone assembly 108 is in use. Alternatively, the first cyclone sidewall 172 may remain in a single piece, and the end wall 168 may be separated from the end face of the sidewall 172.

In this embodiment, the hinge 260 is provided on the upper portion of the cyclone assembly 108, and the front end pivots upwardly and forwardly. Positioning the hinge 260 in this manner reduces the vertical distance between the hinge 260 and the second stage cyclone 132 (as opposed to having the hinge 260 on the far side of the first dirt collection chamber 134 and at the bottom of the cyclone assembly 108 as shown in FIG. 19). This may help facilitate the pivoting of the front end while reducing and/or eliminating interference between the inwardly extending portions of the rear end wall 270 and the second cyclone sidewall 186. In some configurations, positioning the components in this manner may reduce and/or eliminate the need to provide a frusto-conical portion on the second stage cyclone 132.

In accordance with one or more of the features set out herein, a cyclone assembly may have two or more regions that open concurrently. Preferably, at least two regions in the air treatment member may be openable concurrently, for example for emptying and/or cleaning. Preferably, the at least two regions can be opened concurrently using a single hand. This may allow a user to hold the apparatus 100 by the handle 106 using one hand, and empty the air treatment member with the other. For example, in at least some of the embodiments described herein, at least two of the first stage cyclone, the second stage cyclone, the first stage dirt collection region and the second stage dirt collection region can be openable concurrently. More preferably, at least three of the of the first stage cyclone, the second stage cyclone, the first stage dirt collection chamber, the second stage dirt collection chamber and the passage 196 may be openable concurrently. In some embodiments, all four of the of the first stage cyclone, the second stage cyclone, the first stage dirt collection chamber and the second stage dirt collection chamber may be openable concurrently. This may help facilitate emptying of the cyclone assembly. For example, opening all four regions of the cyclone assembly concurrently may reduce the time required to open and empty the cyclone assembly. If the four regions may be opened concurrently with a single hand, for example by opening a single door, it may help facilitate one-handed opening and emptying of the cyclone assembly. This may help a user empty the cyclone assembly without having to release the hand grip portion 160 or otherwise reconfigure his/her grasp on the hand vacuum 100.

In the embodiment of FIGS. 4-6, the apparatus is configured so that the front end walls 168, 182, 254 and 268 are all mounted to or form part of the openable front door 162, and are movable in unison with each other and with the front door 162. In this embodiment, the first stage cyclone 130, the second stage cyclone 132, the first dirt collection chamber 134 and the second dirt collection chamber 136 are all concurrently openable with each other. The embodiments of FIGS. 16-17 and 21-22 are also configured so that the first stage cyclone 130, the second stage cyclone 132, the first dirt collection chamber 134 and the second dirt collection chamber 136 are all concurrently openable with each other.

In the embodiment of FIGS. 12-13, moving the front end of the cyclone assembly 108 opens the rear end walls 170 and 256, and a portion of the sidewall 272 in unison with each other. In this embodiment, the first stage cyclone 130, the first dirt collection chamber 134 and the second dirt collection chamber 136 are all concurrently openable with each other. Optionally, the second stage cyclone 132 may also be opened for emptying, for example by removing the front end wall 182 (optionally in combination with the screen 176) while the other regions are open. In this embodiment, the second stage cyclone 132 may be opened for cleaning at the same time as the first stage cyclone 130, the first dirt collection chamber 134 and the second dirt collection chamber 136, but may require a two-step opening process. Removing the front end wall 182 in the embodiment of FIGS. 12-13 may also open the front end of the passage 196. The embodiment of FIGS. 19-20 is also configured such that the first stage cyclone 130, the first dirt collection chamber 134 and the second dirt collection chamber 136 are all concurrently openable with each other, while the second stage cyclone 132 may be opened in a subsequent step.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having a front end, a rear end, an upper end and a lower end, the hand vacuum cleaner comprising:

(a) an air flow path extending from a dirty air inlet provided at a front end of the hand vacuum cleaner to a clean air outlet provided rearward of the dirty air inlet;

(b) a cyclone assembly comprising a cyclone, a dirt collection chamber external to the cyclone and a cyclone assembly axis extending centrally between a front end of the cyclone assembly and a rear end of the cyclone assembly, the cyclone comprising a cyclone chamber, a cyclone air inlet, a cyclone air outlet and a dirt outlet, wherein when the upper end of the hand vacuum cleaner is positioned above the lower end of the hand vacuum cleaner the cyclone assembly axis of rotation is oriented horizontal;

(c) a pre-motor filter positioned rearward of the cyclone chamber;

(d) a suction motor positioned in the air flow path downstream of the pre-motor filter, the suction motor having an inlet end that is located at a rear side of the pre-motor filter, the suction motor having a motor axis of rotation; and, (e) a housing positioned rearward of the cyclone assembly wherein a handle extends downwardly from a lower surface of the housing and, when the upper end of the hand vacuum cleaner is positioned above the lower end of the hand vacuum cleaner, the housing has a rearward facing wall which remains in position when the cyclone assembly is opened, wherein, when the hand vacuum cleaner is oriented with the cyclone axis extending horizontally and the handle is at the lower end of the hand vacuum cleaner, the dirt collection chamber has a lower end which is at a lower elevation than a lower end of the cyclone chamber and the pre-motor filter has a lower end, and wherein an interrupted open volume is positioned between the rearward facing wall and an upper end of the handle, and wherein, when the hand vacuum cleaner is oriented with the cyclone axis extending horizontally and the handle is at the lower end of the hand vacuum cleaner, a first line that extends in a common direction with the cyclone assembly axis and that is below the cyclone chamber intersects the dirt collection chamber, the pre-motor filter, the rearward facing wall and the handle.

2. The hand vacuum cleaner of claim 1 wherein, in operation, the hand vacuum cleaner further comprises an energy storage member housing wherein, when the hand vacuum cleaner is oriented with the cyclone axis extending horizontally and the handle is at the lower end of the hand vacuum cleaner, a second line that extends in a common direction with the cyclone assembly axis intersects the dirt collection chamber at an elevation below the cyclone chamber, the pre-motor filter and the energy storage member housing.

3. The hand vacuum cleaner of claim 1 wherein the cyclone assembly axis intersects the pre-motor filter.

4. The hand vacuum cleaner of claim 1 wherein the handle comprises a pistol grip handle.

5. The hand vacuum cleaner of claim 4 wherein, in operation, the hand vacuum cleaner further comprises an energy storage member, the pistol grip handle has a lower end and a handle axis that extends through the pistol grip handle from the lower end of the pistol grip handle to the upper end of the pistol grip handle, and the handle axis intersects the energy storage member.

6. The hand vacuum cleaner of claim 1 wherein the cyclone chamber and the dirt collection chamber are concurrently openable.

7. The hand vacuum cleaner of claim 1 wherein a front portion of the cyclone assembly is moveable between a closed position, in which the hand vacuum cleaner is operable to clean a surface, and an open position in which the cyclone chamber and the dirt collection chamber opened and movement of the front portion of the cyclone assembly concurrently opens the cyclone chamber and the dirt collection chamber.

8. The hand vacuum cleaner of claim 1 wherein the motor axis of rotation intersects the pre-motor filter.

9. A hand vacuum cleaner having a front end, a rear end, an upper end and a lower end, the hand vacuum cleaner comprising:

(a) an air flow path extending from a dirty air inlet provided at a front end of the hand vacuum cleaner to a clean air outlet provided rearward of the dirty air inlet;

(b) a cyclone assembly comprising a cyclone, a dirt collection chamber external to the cyclone and a cyclone assembly axis extending centrally between a front end of the cyclone assembly and a rear end of the cyclone assembly, the cyclone comprising a cyclone chamber, a cyclone air inlet, a cyclone air outlet and a dirt outlet, wherein when the upper end of the hand vacuum cleaner is positioned above the lower end of the hand vacuum cleaner the cyclone assembly axis of rotation is oriented horizontal;

(c) a pre-motor filter positioned rearward of the cyclone chamber;

(d) a suction motor positioned in the air flow path downstream of the pre-motor filter, the suction motor having an inlet end that is located at a rear side of the pre-motor filter, the suction motor having a motor axis of rotation; and, (e) a housing positioned rearward of the cyclone assembly wherein a handle extends downwardly from a lower surface of the housing, wherein, when the hand vacuum cleaner is oriented with the cyclone axis extending horizontally and the handle is at the lower end of the hand vacuum cleaner, the dirt collection chamber has a lower end which is at a lower elevation than a lower end of the cyclone chamber and the pre-motor filter has a lower end, and wherein, when the hand vacuum cleaner is oriented with the cyclone axis extending horizontally and the handle is at the lower end of the hand vacuum cleaner, a line that extends in a common direction with the cyclone assembly axis and that is below the cyclone chamber intersects the dirt collection chamber and the pre-motor filter, and wherein a pivot is provided at a rear end of the cyclone chamber whereby a rearward portion of the cyclone assembly is pivotally openable.

10. The hand vacuum cleaner of claim 9 wherein the cyclone assembly axis intersects the pre-motor filter.

11. The hand vacuum cleaner of claim 9 wherein the handle comprises a pistol grip handle.

12. The hand vacuum cleaner of claim 11 wherein the pistol grip handle extends downwardly from a housing of the hand vacuum cleaner.

13. The hand vacuum cleaner of claim 12 wherein the pistol grip handle has a lower end and a handle axis that intersects the pistol grip handle from the lower end of the pistol grip handle to the upper end of the pistol grip handle, and the handle axis intersects the suction motor.

14. The hand vacuum cleaner of claim 13 wherein the motor axis of rotation intersects the pre-motor filter.

15. The hand vacuum cleaner of claim 9 wherein the handle has a grip portion having an upper end and a spaced apart lower end and a handle axis that extends through the grip portion from the lower end of the grip portion to the upper end of the grip portion, and the handle axis intersects the suction motor.

16. The hand vacuum cleaner of claim 15 wherein the motor axis of rotation intersects the pre-motor filter.

17. The hand vacuum cleaner of claim 9 wherein the cyclone chamber and the dirt collection chamber are concurrently openable.

18. The hand vacuum cleaner of claim 9 wherein the cyclone chamber and the dirt collection chamber are concurrently openable.

19. The hand vacuum cleaner of claim 9 wherein the motor axis of rotation intersects the pre-motor filter.

* * * * *